US007735005B2

(12) United States Patent
Holder et al.

(10) Patent No.: US 7,735,005 B2
(45) Date of Patent: Jun. 8, 2010

(54) STYLE GUIDE AND FORMATTING METHODS FOR PILOT QUICK REFERENCE HANDBOOKS

(75) Inventors: Barbara E. Holder, Seattle, WA (US); William A. McKenzie, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1238 days.

(21) Appl. No.: 11/242,679

(22) Filed: Oct. 4, 2005

(65) Prior Publication Data

US 2006/0028012 A1 Feb. 9, 2006

Related U.S. Application Data

(63) Continuation-in-part of application No. 10/938,393, filed on Sep. 10, 2004, now abandoned.

(60) Provisional application No. 60/502,135, filed on Sep. 11, 2003.

(51) Int. Cl.
*G06N 3/00* (2006.01)

(52) U.S. Cl. ............................ 715/243; 701/33; 701/3; 281/15.1; 281/36; 281/37; 281/38

(58) Field of Classification Search ................. 715/234, 715/243, 254; 281/2, 3.1, 5, 15.1, 36, 37, 281/38; 701/33

See application file for complete search history.

(56) References Cited

U.S. PATENT DOCUMENTS 5,626,365 A 5/1997 Petteway et al.

OTHER PUBLICATIONS

Flight Crew Performance and Checklist Design, Boeing Commercial Airplanes, Sep. 29, 2004, Barbara Holder and Bill McKenzie, 37 pages.

Flight Crew Performance and Non-Normal Checklist Design, Barbara E. Holder and William A. McKenzie, 6 pages, Sep. 29, 2004.

Boeing 757 Operations Manual, D632N001-07DL, May 2003, 342 pages.

On the Design of Flight-Deck Procedures, A. Degani and E.L. Wiener, NASA Contractor Report 177642, Contract NCC2-327 and NCC2-581, Jun. 1994, 74 pages.

(Continued)

*Primary Examiner*—Kyle R Stork
(74) *Attorney, Agent, or Firm*—Harness, Dickey & Pierce, P.L.C.

(57) ABSTRACT

Aspects of the present invention provide a style guide, formatting methods, and electronic/digital versions for quick reference handbooks (QRH) for mobile platforms. Using one or more of the style guide and formatting methods to create quick reference handbooks can provide improvements in safety through error and workload reduction during non-normal situations, improvements in operator understanding of checklists and information contained in the checklists, reduced customer changes needed to create an airline quick reference handbook, reduced documentation maintenance costs, and/or reduced training costs through standardized format and content.

31 Claims, 49 Drawing Sheets

OTHER PUBLICATIONS

Human Performance Considerations in the Use and Design of Aircraft Checklists, U.S. Dept. of Transportation, Federal Aviation Administration, Jan. 1995, 51 pages.

Guidelines for the Design and Presentation of Emergency and Abnormal Checklists, Civil Aviation Authority, CAP 676, Sep. 1997, www.caa.co.uk, 17 pages.

Immediate Action Items Information from Order 8400.10—Air Transportation Operations Inspector's Handbook, vol. 3, Chapter 15, Section 1, 2079. Definition, 1 page.

Volume 3. Air Operator Technical Administration, Chapter 15. Manuals, Procedures and Checklists, Section 5, Aircraft Checklists, vol. 3, Dec. 20, 1994, 7 pages.

Immediate Action Items Information from Order 8400.10—Air Transportation Operations Inspector's Handbook, vol. 3, Chapter 15, Section 4, 2177. Immediate Actions., 1 page.

777 Flight Crew Operations Manual, D632W001-TBC, 7.1, Dec. 13, 2004, 1 page.

Studies Suggest Methods for Optimizing Checklist Design and Crew Performance, Flight Safety Digest, Flight Safety Foundation, vol. 14, No. 5, May 1995, 12 pages.

767-300

Quick Action Index

Aborted Engine Start.......................................7.1

Airspeed Unreliable.......................................10.2

APU Fire.......................................8.6

Cabin Altitude.......................................2.1

Dual Engine Failure.......................................7.8

Engine Fire.......................................8.4

Engine Limit/Surge/Stall.......................................7.3

Engine Severe Damage.......................................7.6

Engine Tailpipe Fire.......................................8.7

Evacuation.......................................Back Cover

Rapid Depressurization.......................................2.1

Smoke / Fumes.......................................8.2

Unscheduled Stabilizer Trim.......................................9.7

BOEING

Quick Reference Handbook

FIG. 1B

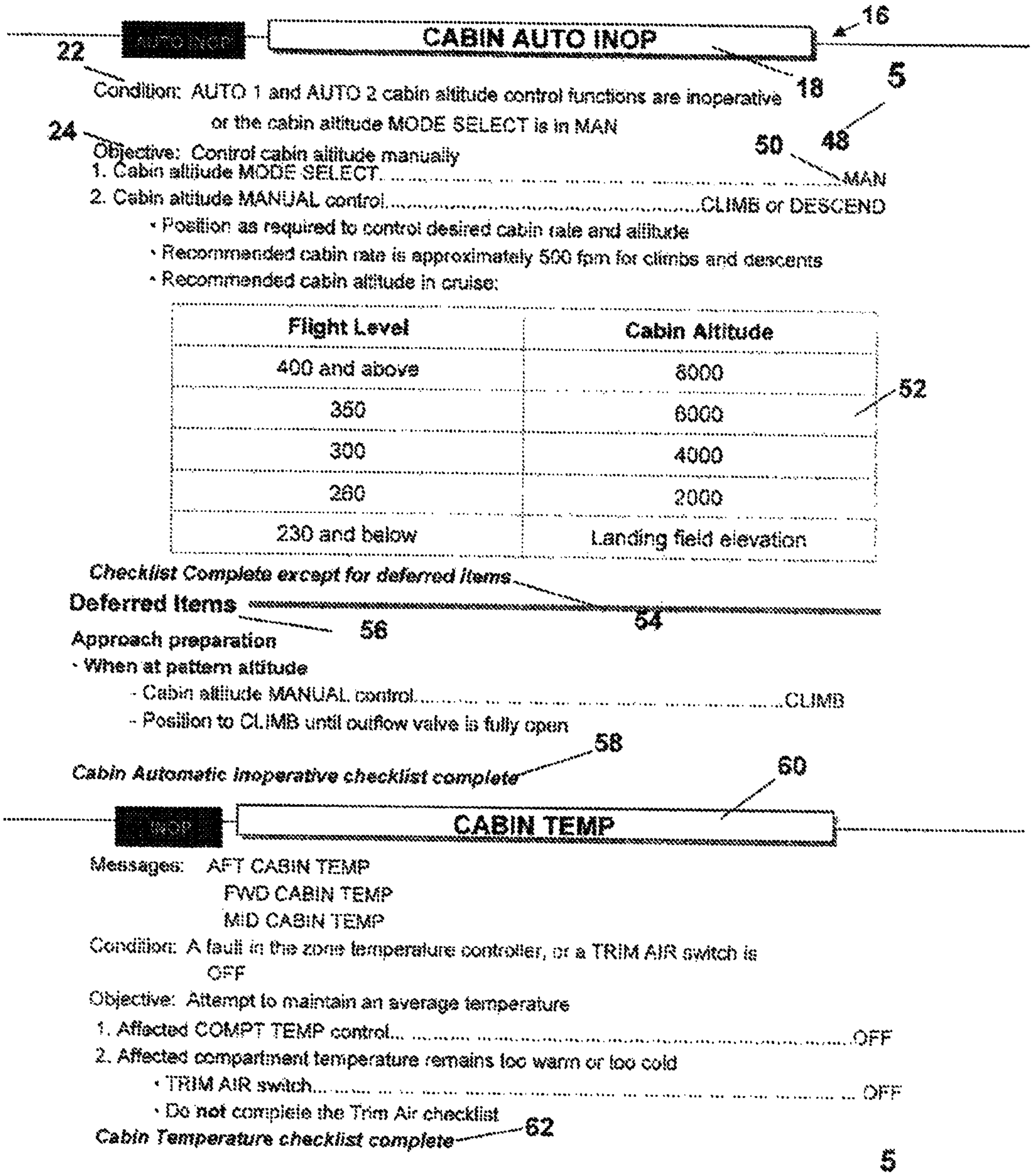

AUTO INOP — CABIN AUTO INOP

Condition: AUTO 1 and AUTO 2 cabin altitude control functions are inoperative or the cabin altitude MODE SELECT is in MAN Objective: Control cabin altitude manually 1. Cabin altitude MODE SELECT.......................................................MAN
2. Cabin altitude MANUAL control....................................................CLIMB or DESCEND
   - Position as required to control desired cabin rate and altitude
   - Recommended cabin rate is approximately 500 fpm for climbs and descents
   - Recommended cabin altitude in cruise:

| Flight Level | Cabin Altitude |
|---|---|
| 400 and above | 8000 |
| 350 | 6000 |
| 300 | 4000 |
| 260 | 2000 |
| 230 and below | Landing field elevation |

*Checklist Complete except for deferred items*

Deferred Items

Approach preparation

- When at pattern altitude
  - Cabin altitude MANUAL control.......................................CLIMB
  - Position to CLIMB until outflow valve is fully open

*Cabin Automatic inoperative checklist complete*

INOP — CABIN TEMP

Messages: AFT CABIN TEMP
FWD CABIN TEMP
MID CABIN TEMP

Condition: A fault in the zone temperature controller, or a TRIM AIR switch is OFF Objective: Attempt to maintain an average temperature 1. Affected COMPT TEMP control.......................................................OFF
2. Affected compartment temperature remains too warm or too cold
   - TRIM AIR switch.......................................................OFF
   - Do not complete the Trim Air checklist

*Cabin Temperature checklist complete*

FIG. 4

One AC Bus Off

11

Messages: L AC BUS OFF
R AC BUS OFF

Condition: One AC bus is unpowered
If both AC BUS OFF messages are displayed, refer to the Both AC Buses Off checklist on page 12

Objective: Attempt to restore electrical power and configure the airplane with available power

64

1. GEN CONT switch (affected side)....................................OFF then ON
Attempt only one reset 2. APU (If available)....................................Start

After APU is running

- BUS TIE switch (affected side)....................................OFF then AUTO
Attempt only one reset

66

3. AC BUS OFF light

Extinguishes

- *Checklist Complete*

Left light remains illuminated

- Captain's FLT DIR SOURCE selector....................................R

Right light remains illuminated

- First Officer's FLT DIR SOURCE selector....................................C

4. Plan to land at nearest suitable airport
5. Review inoperative systems and consequences below

68

| | Inoperative systems | Consequences |
|---|---|---|
| **Right** Bus Off | **Right** autopilot | Use left or center autopilot |
| | **Right** flight director | Use left or center flight director |
| | Probe heat | Avoid icing conditions, which may result in erroneous flight instrument indications |
| Left Bus Off | All autopilots | Fly the airplane manually |
| | **Left and center** flight directors | Use right flight director |
| | Flap indicator | Refer to flap lever position |
| | Probe heat | Avoid icing conditions, which may result in erroneous flight instrument indications |

70

*One AC Bus Off checklist complete*

11

FIG. 5

BUS OFF BUS OFF Both AC Buses Off

12

Messages: L AC BUS OFF
R AC BUS OFF

Condition: Both AC buses are unpowered

Objective: Attempt to restore electrical power and configure the airplane with available power 1. GEN CONT switches (both)..........................................OFF then ON
Attempt only one reset 2. APU (If available)..........................................Start

After APU is running

- Left BUS TIE switch..........................................OFF then AUTO
Attempt only one reset
- Right BUS TIE switch..........................................OFF then AUTO
Attempt only one reset 3. AC BUS OFF lights

- Both extinguish and power is restored
  - Reactivate flight plan
  - Reload FMC performance data via the PERF INIT and CRZ pages
  - Any IRS ALIGN lights illuminate
    - ! Affected IRS mode selectors..........................................ATT 46
      Action is irreversible
    - 44 - Enter heading on IRS control panel or FMC POS INIT page
  - *Checklist Complete*

- Both remain illuminated
  - Plan to land at the nearest suitable airport
  - Any ELEC ENG CONT ALTN lights illuminate
    - Thrust levers..........................................Retard to mid position
    - Left ELEC ENG CONT switch..........................................ALTN
    - Right ELEC ENG CONT switch..........................................ALTN
    - Do not accomplish the Engine EEC Mode checklist
  - EQUIP COOLING selector..........................................OVRD
  - Review inoperative systems and consequences on page 12a 72
  - Complete the Cabin Automatic Inoperative checklist on page 5
  - *Checklist Complete*

- One remains illuminated

12

FIG. 6

Both AC Buses Off

74

12a

4. AC BUS OFF lights
   - Left light remains illuminated
     - Captain's FLT DIR SOURCE selector........................................R
   - Right light remains illuminated
     - First officer's FLT DIR SOURCE selector........................................C
5. Plan to land at nearest suitable airport
6. Review inoperative systems and consequences below

| | Inoperative systems | Consequences |
|---|---|---|
| **Right** Bus Off | **Right** autopilot | Use left or center autopilot |
| | **Right** flight director | Use left or center flight director |
| | Probe heat | Avoid icing conditions, which may result in erroneous flight instrument indications |
| **Left** Bus Off | **All** autopilots | Fly the airplane manually |
| | **Left** and **center** flight directors | Use right flight director |
| | Flap indicator | Refer to flap lever position |
| | Probe heat | Avoid icing conditions, which may result in erroneous flight instrument indications |
| **Both** Buses Off | **All** autopilots | Fly the airplane manually |
| | **All** flight directors | Steering cues not available |
| | Flap indicator | Refer to flap lever position |
| | Auto speedbrake | Deploy speedbrake manually after landing |
| | Antiskid for outboard wheels | Use minimum braking consistent with runway conditions to reduce possibility of tire blowout |
| | Wing and engine anti-ice | Avoid icing conditions |
| | Thrust reversers | Landing distance may be increased |
| | Master caution | Caution alerts are not available |
| | Probe heat | Avoid icing conditions, which may result in erroneous flight instrument indications |

*Both AC Buses Off checklist complete*

Considerations 76

Continued flight with only one operative AC generator (Engine or APU) is not recommended.

12a

FIG. 7A

GEN OFF

14

Messages: L GEN OFF
R GEN OFF

Condition: The generator control breaker is open

78 — If one AC BUS OFF message is displayed, refer to the One AC Bus Off checklist on page 11
If both AC BUS OFF messages are displayed, refer to the Both AC Buses Off checklist on page 12

Objective: Attempt to restore electrical power

1. GEN CONT switches (affected switches).......................................OFF then ON
Attempt only one reset
2. Any GEN CONT OFF light remains illuminated
   • APU (if available)..........................................................Start

*Generator Off checklist complete*

MAIN BATTERY DISCHARGE

Condition: The DISCH light illuminated indicates the main battery is discharging.

STANDBY BUS OFF

Condition: The standby power bus OFF light illuminated indicates the standby AC or DC bus is unpowered.

STANDBY POWER SELECTOR . . . . . . . . . . . . . . . . . . . . . . BAT

The battery will provide standby bus power for approximately 30 minutes.

*If the standby power bus OFF light remains illuminated and right AC power is available:*

STANDBY POWER SELECTOR . . . . . . . . . . . . . . . . AUTO

(Restores the battery charger.)

UTILITY BUS OFF

Condition: The utility bus OFF light illuminated indicates the galley and utility busses are unpowered.

*If two generator sources available:*

UTILITY BUS SWITCH . . . . . . . . . . . . . . . . . OFF, THEN ON

14

FIG. 7B

Aborted Engine Start

15

Condition: No oil pressure upon reaching stabilized idle
No EGT rise within 25 seconds after selecting RUN
There is no N1 indication within 30 seconds after N2 is stabilized at idle
EGT rising rapidly toward or approaching limit Objective: Terminate engine start 1. FUEL CONTROL switch.......................................................CUT OFF 2. ENG START selector
- in GND
  - Motor engine for a minimum of 30 seconds
- in AUTO

80

After N2 decreases to 20%
- ENG START selector...........................................................GND
  - Motor engine for a minimum of 30 seconds 3. ENG START selector.............................................................AUTO

*Aborted Engine Start checklist complete*

Considerations
- Perform engine start with IGNITION selector in the BOTH position if engine parameters remain within limits and restart is desired.

15

FIG. 8

Engine Limit, Surge, or Stall

Condition: Engine EGT or RPM are abnormal, or are approaching or exceeding limits 16
Abnormal engine noises are heard
There is no response to thrust lever movement Objective. Restore normal engine operation and keep within engine limits 1. Autothrottle..........Disconnect
2. Thrust Lever..........confirm..........Retard
   - Retard until indications remain within normal limits or the thrust lever is closed 3. Engine indications
   - Abnormal or EGT increasing 84
     - Accomplish the Engine Failure or Shutdown checklist on page 22
     - The engine may be restarted if engine indications appear normal after shutdown
     - *Checklist complete*
   - Stable and EGT stable or decreasing 86
     - Monitor RPM and EGT
     - Thrust lever..........Slowly advance
     - Ensure engine acceleration follows thrust lever movement 4. Engine acceleration and EGT
   - Engine acceleration is normal
     - Operate engine normally or at a reduced thrust level that does not result in surge or stall
     - *Checklist complete*
   - Engine does not accelerate and EGT is normal
     - ENG bleed air switch..........OFF 5. Engine acceleration and EGT
   - Engine responds
     - ENG bleed air switch..........ON
     - *Checklist complete*
   - Engine does not respond
     - Continue engine operation at idle
     - ENG bleed air switch..........ON

*Engine Limit, Surge, Stall checklist complete*

Considerations

- Engine operation at idle may require a descent to a lower altitude
- Land at the nearest suitable airport if engine does not recover to normal operation 16

FIG. 9

OVHT — ENG BLD OVHT

25

Messages: L ENG BLD OVHT
R ENG BLD OVHT

Condition: Engine bleed air temperature is excessive

Objective: Eliminate overheat and configure for single bleed source operation

1. ENG bleed air switch (affected side)....................OFF

After thrust reduced for cruise

• ENG bleed air switch (affected side)....................ON

2. OVHT light

Extinguishes

• *Checklist Complete*

Remains illuminated or illuminates again

• ENG bleed air switch (affected side)....................OFF

3. Do not accomplish the Engine Bleed Off checklist — 88

4. Wing anti-ice (if required)

• Pack control selector (affected side)....................OFF

• ISLN switch (affected side)....................ON

90 • When wing anti-ice no longer required

- ISLN switches (both).................... 92 ....OFF

| **Inoperative systems** | **Consequences** |
|---|---|
| Thrust reverser on the affected side | Use of thrust reverser during landing will result in asymmetric thrust |

*Engine Bleed Overheat checklist complete*

BLEED — ENG HPSOV

Messages: L ENG HPSOV
R ENG HPSOV

Condition: The high pressure bleed air valve is open when commanded closed

Objective: Configure for single bleed source operation

1. ENG bleed air switch (affected side)....................OFF

2. Wing anti-ice (if required)

• Pack control selector (affected side)....................OFF

• ISLN switch (affected side)....................ON

• When wing anti-ice no longer required

- ISLN switches (both)....................OFF

3. Do not accomplish the Engine Bleed Off checklist

*Engine HPSOV checklist complete* 25

FIG. 10

VALVE ENG STARTER 27

Messages: L ENG STARTER
R ENG STARTER
Condition: The engine start valve failed to open
Objective: Discontinue start sequence if on the ground, or allow for windmill start if airborne

Note: Ground or in-flight start using a bleed air source may be unsuccessful

94

1. Phase of flight
   - On the ground
     - FUEL CONTROL switch (affected side).......................................CUT OFF
     - ENG START selector (affected side)..............................................AUTO
   - In flight
     - Increase airspeed until X-BLD no longer indicated on secondary engine display

*Engine Starter checklist complete*

VALVE STARTER CUTOUT

Messages: L STARTER CUTOUT
R STARTER CUTOUT
Condition: The engine start valve failed to close after engine start
Objective: Disengage the starter and prevent asymmetric ice buildup 1. ENG START selector.............................................................................AUTO
2. VALVE light
   - Extinguishes
     - *Checklist Complete*
   - Remains illuminated
     - ENG bleed air switch (affected side)..................................................OFF
     - ISLN switch (affected side)...............................................................OFF
3. Phase of flight
   - On the ground
     - Ground air source (if in use)..............................................Disconnect
   - In flight
4. WING ANTI-ICE switch...............................................................................OFF
5. Avoid icing conditions
6. Do not accomplish the Engine Bleed Off checklist

*Starter Cutout checklist complete*

27

FIG. 11

ENGINE FIRE

36

Messages: L ENGINE FIRE
R ENGINE FIRE

Condition: Fire is detected in the engine

96

1. Autothrottle........................................Disconnect
2. Thrust lever........................confirm........................Close
3. Fuel control switch........................confirm........................CUT OFF
4. Engine fire switch........................confirm........................Pull
5. Engine fire lights
   - Any remain illuminated
     - • Engine fire switch........................Rotate
     - • Rotate to stop and hold for one second
     - • Wait 30 seconds, if any engine fire light remains illuminated
       - Engine fire switch........................Rotate to other bottle
       - Rotate to stop and hold for one second
   - Extinguished
6. After engine shutdown, high airframe vibration
   - Occurs
     - • Without delay, reduce airspeed and descend to a safe altitude to minimize vibration. If vibration returns at minimum airspeed and altitude, increasing airspeed may reduce vibration
   - Does not occur
7. APU (if available)........................Start
8. GND PROX FLAP OVRD switch........................OVRD
9. Transponder ALT RPTG selector........................TA ONLY
10. Wing anti-ice (if required)
    - • Pack control selector (affected side)........................OFF
    - • ISLN switch (affected side)........................ON
    - • When anti-ice no longer required
      - ISLN switches (both)........................OFF
11. Do not accomplish the following checklists
    - • Engine Bottle
    - • Engine Shutdown
12. Plan to land at nearest suitable airport

98

*Checklist Complete except for deferred items on page 36a*

Continued

36

FIG. 12

Airspeed Unreliable

48

Messages: AILERON LOCKOUT
ALT DISAGREE
CAPT PITOT
F/O PITOT
IAS/ALT DIFF
IAS DISAGREE
L AUX AUTOPILOT
R AUX AUTOPILOT
OVERSPEED
PROBE HEAT
RUDDER RATIO Condition: Airspeed / Mach indication is suspected to be unreliable Objective: Set appropriate thrust and pitch for phase of flight 1. Pitch attitude and thrust.....Check
2. Pitch attitude or thrust is not normal for phase of flight
   - Autopilot.....Off
   - Autothrottle.....Disconnect
   - Flight directors.....Off

| | |
|---|---|
| **Initial climb** | Set maximum climb thrust and 10 degrees pitch |
| **Low-altitude level-off** | Set 70% N1 and 5 degrees pitch |

- Refer to airspeed unreliable chart on pages 48a and 48b for specific pitch and thrust values
3. Compare captain and first officer airspeed indications to standby indicator
   - An airspeed display differing by more than 15 knots from the standby indicator should be considered unreliable.

102

Caution! Altitude, vertical speed, limit N1, Reference N1, and N1 bug may be unreliable 4. Airspeed data source
   - Reliable source can be determined
     - AIR DATA source switch (unreliable side).....ALTN
     - Invalid overspeed warning and invalid input to Autopilot Flight Director System and autothrottle may occur or continue
   - Reliable source cannot be determined
     - Attitude and thrust.....Adjust
     - Maintain appropriate pitch and thrust setting by referencing Airspeed Unreliable chart on pages 48a and 48b.

*Airspeed Unreliable checklist complete*

Considerations

- Maintain visual conditions if possible
- Establish landing configuration early
- Use electronic and visual glideslope indicators, where available, for approach and landing
- Refer to IRS groundspeed and the CDU POS REF page and reported wind on approach
- Review minimum equipment for ETOPS and MNPS Continued

FIG. 14

Airspeed Unreliable

48b

106

Climb (290kt / .78M)
- Flaps up
- Maximum climb thrust

104

| Pressure Altitude (FT) | | Weight (1,000lb) 220 | 260 | 300 | 350 | 400 |
|---|---|---|---|---|---|---|
| Sea Level | Pitch | 13.0 | 11.5 | 10.5 | 9.5 | 9.0 |
| | V/S | 6300 | 5300 | 4500 | 3700 | 3100 |
| 10,000 | Pitch | 10.5 | 9.5 | 8.5 | 8.0 | 7.5 |
| | V/S | 5700 | 4700 | 4000 | 3200 | 2700 |
| 20,000 | Pitch | 7.0 | 6.5 | 6.0 | 6.0 | 5.5 |
| | V/S | 4200 | 3400 | 2900 | 2300 | 1800 |
| 30,000 | Pitch | 4.5 | 4.0 | 4.0 | 4.0 | 4.0 |
| | V/S | 2700 | 2200 | 1800 | 1300 | 900 |
| 40,000 | Pitch | 4.0 | 4.0 | 4.0 | | |
| | V/S | 1700 | 1100 | 500 | | |

110

Cruise (290kt / .78M)
- Flaps up
- Set thrust as shown

108

| Pressure Altitude (FT) | | Weight (1,000lb) 220 | 260 | 300 | 350 | 400 |
|---|---|---|---|---|---|---|
| 30,000 | Pitch | 1.0 | 1.5 | 1.5 | 2.0 | 2.5 |
| | %N1 | 84 | 86 | 87 | 89 | 92 |
| 35,000 | Pitch | 1.5 | 2.0 | 2.5 | 3.0 | 3.5 |
| | %N1 | 85 | 87 | 89 | 93 | 98 |
| 40,000 | Pitch | 2.0 | 2.5 | 3.5 | 4.0 | |
| | %N1 | 88 | 92 | 97 | 107 | |

114

Descent (290kt / .78M)
- Flaps up
- Idle thrust

112

| Pressure Altitude (FT) | | Weight (1,000lb) 220 | 260 | 300 | 350 | 400 |
|---|---|---|---|---|---|---|
| 40,000 | Pitch | -1.5 | -0.5 | 0.0 | 0.5 | |
| | V/S | -2800 | -2600 | -2600 | -2800 | |
| 30,000 | Pitch | -2.5 | -2.0 | -1.0 | -0.5 | 0.0 |
| | V/S | -2700 | -2400 | -2200 | -2100 | -2000 |
| 20,000 | Pitch | -2.5 | -1.5 | -1.0 | -0.5 | 0.5 |
| | V/S | -2400 | -2100 | -2000 | -1900 | -1800 |
| 10,000 | Pitch | -2.5 | -2.0 | -1.0 | -0.5 | 0.5 |
| | V/S | -2100 | -1900 | -1800 | -1700 | -1600 |

118

Holding (VREF30 + 80)
- Flaps up
- Set thrust as shown

116

| Pressure Altitude (FT) | | Weight (1,000lb) 220 | 260 | 300 | 350 | 400 |
|---|---|---|---|---|---|---|
| 10,000 | Pitch | 4.5 | 5.0 | 5.0 | 5.5 | 5.5 |
| | %N1 | 60 | 64 | 67 | 72 | 78 |

Continued

48b

FIG. 15

Terminal Area (5000ft)
- Gear up
- Set thrust as shown

| Flap Position | | Weight (1,000lb) 220 | 260 | 300 | 350 | 400 |
|---|---|---|---|---|---|---|
| Flaps Up | Pitch | 4.5 | 5.0 | 5.0 | 5.5 | 5.5 |
| VREF 30 + 80 | %N1 | 56 | 60 | 63 | 68 | 71 |
| Flaps 1 | Pitch | 6.0 | 6.5 | 7.0 | 7.0 | 7.0 |
| VREF 30 + 60 | %N1 | 56 | 61 | 65 | 70 | 73 |
| Flaps 5 | Pitch | 4.5 | 5.0 | 5.0 | 5.0 | 5.0 |
| VREF 30 + 40 | %N1 | 59 | 64 | 67 | 72 | 75 |
| Flaps 15 | Pitch | 6.0 | 6.0 | 6.5 | 6.0 | 5.5 |
| VREF 30 + 20 | %N1 | 60 | 65 | 69 | 74 | 77 |
| Flaps 20 | Pitch | 4.5 | 4.5 | 4.5 | 4.5 | 4.0 |
| VREF 30 + 20 | %N1 | 62 | 67 | 70 | 75 | 78 |

Final Approach (1500ft)
- Gear down
- 3 degree glideslope
- Set thrust as shown

| Flap Position | | Weight (1,000lb) 220 | 260 | 300 | 350 | 400 |
|---|---|---|---|---|---|---|
| Flaps 25 | Pitch | 0.5 | 1.0 | 1.0 | 1.0 | 1.0 |
| VREF 25 + 10 | %N1 | 54 | 59 | 62 | 67 | 70 |
| Flaps 30 | Pitch | 1.0 | 1.0 | 1.0 | 0.5 | -0.5 |
| VREF 30 + 10 | %N1 | 57 | 62 | 66 | 71 | 75 |

48b

FUEL PUMP

55

Messages: CTR L FUEL PUMP CTR R FUEL PUMP
L AFT FUEL PUMP R AFT FUEL PUMP
L FWD FUEL PUMP R FWD FUEL PUMP Condition: Indicated fuel pump output pressure is low Objective: Configure for operation using remaining fuel pumps

Note: Do not reset any tripped fuel pump or fuel pump control circuit breaker

1. Fuel pump PRESS lights

One C PUMPS PRESS light illuminated

- C PUMPS switch (affected pump)............................................ OFF
- FUEL XFEED switches (both)............................................ON

After center tank fuel depleted

- FUEL XFEED switches (both)............................................OFF
- *Checklist Complete*

Both C PUMPS PRESS lights illuminated

- C PUMPS switches (both)............................................OFF
- FUEL XFEED switches (both)............................................OFF
- Center tank fuel is unusable
- Verify left and right main tank quantity is sufficient for planned flight
- *Checklist Complete*

L PUMPS or R PUMPS PRESS light illuminated

- Continue normal operation

*Fuel Pump checklist complete*

Low Fuel Temperature

Condition: Fuel temperature is approaching minimum

Objective: Increase fuel temperature

1 When fuel temperature is approaching 3°C above fuel freeze point

- Increase TAT by increasing speed, climbing or descending to warmer air, or deviating to a warmer air mass
- TAT will increase 0.5 to 0.7 degrees C for each .01 Mach increase.
- Increase TAT to at least the fuel temperature limit
- In extreme conditions, it may be necessary to descend as low as FL250
- After changing cruise altitude or airspeed, verify sufficient fuel remains to proceed to planned destination

*Low Fuel Temperature checklist complete*

55

FIG. 17

PRESS FUEL SYS PRESS

56

Messages: L FUEL SYS PRESS
R FUEL SYS PRESS

Condition: Affected engine is operating on suction feed with all PRESS lights on one side illuminated and crossfeed valves closed Objective: Configure fuel system to maintain fuel balance and required thrust on the affected engine

Caution! At high altitude, thrust deterioration or engine flameout may occur 1. Thrust level of affected engine Engine operating normally

- *Checklist Complete*

Unable to maintain required thrust

- FUEL XFEED switches (both)........................................ON

Note: Operation with the crossfeed valves open will result in a progressive fuel imbalance as both engines feed from the same main tank Do not balance fuel

- Do not accomplish the Fuel Configuration checklist

After FUEL CONFIG light illuminates

- FUEL XFEED switches (both)........................................OFF
- Continue suction feed operation. Sufficient roll control is available to compensate for any main tank fuel imbalance
- Operate at a lower altitude when required thrust cannot be maintained. Verify sufficient fuel remains to continue to planned destination

*Fuel System Pressure checklist complete*

Considerations

- Check ETOPS operating equipment requirements, if applicable

56

FIG. 18

C HYD SYS PRESS

58

Condition: The center hydraulic system pressure is low

Objective: Attempt to restore system pressure, prevent further damage, and configure for landing using backup systems 1. DEMAND pump selector (center)........................................................ON
2. SYS PRESS light

Extinguishes

- *Checklist Complete*

Remains illuminated

- DEMAND pump selector (center)........................................................OFF
- ELEC PRIMARY pump switches (both)....................................................OFF
- Do not accomplish the following checklists
  - HYD DEM PUMP
    - Hydraulic Primary 1 or 2

| **Inoperative systems** | **Consequences** |
|---|---|
| Right autopilot stabilizer trim and center autopilot | Use left autopilot |
| Automatic speedbrake | Deploy speedbrakes manually after landing |

*Checklist Complete except for deferred items*

Deferred items

Landing preparation

- Use flaps 20 and set VREF 20 for landing
- Review non-normal configuration landing distances in the performance section

Extend flaps using alternate systems

- GND PROX FLAP OVRD switch........................................................OVRD
- ALTN FLAPS selector........................................................Set
  - Position to agree with flap lever
- ALTN FLAPS LE and TE switches........................................................ALTN
- ALTN FLAPS selector........................................................Set
  - Extend or retract flaps as required

58

Continued

FIG. 19

C HYD SYS PRESS

58a

Deferred Items continued

Extend gear using alternate systems

- Landing gear lever.......................................................OFF
- ALTN GEAR EXTEND switch (maximum 250K / .76M)..............................DN

After gear down lights illuminate

- Landing gear lever.......................................................DN
- Do not accomplish the following checklists
  - Gear Doors
  - Tailskid
- RESERVE BKS & STRG switch.................................................ON
- If center number 1 ELEC PRIMARY pump PRESS light remains illuminated, complete the RSV BRAKE VAL checklist on page 64

Go-around considerations

- Gear remains down, flaps remain at 20

*Center Hydraulic System Pressure checklist complete*

58a

FIG. 20

Human-Centered Design Process

Develop a Philosophy of Use:

- A vision of how the crew will interact with the QRH
- Based on: Assumptions about flight crew competencies and conduct
  Models of human performance

Final Products:
Final QRH design recommendation
A style guide to provide guidance for implementing the selected design.
The guide can be used by QRH developers to improve and standardize their designs.

Flight Deck Control......................Action

FIG. 30

Exemplary formats for action steps are shown below.

Flight deck control/switch movement....State or Labeled Position

Current: GROUND PROXIMITY FLAP OVERRIDE
SWITCH........................................................OVRD
Proposed: GND PROX FLAP OVRD Switch.....................OVRD
Left EEC Switch..............................................ALTN Current: Observe gear EXTEND limit speed (270K/.82M)
TARGET SPEED.........................................VMO/MMO
Proposed: Limit speed to...........................................270 knots/.82M
Descend at...................................................VMO/MMO
Level at.......................................................10000' or lowest safe altitude
OR
Limit speed to 270 knots/.82M
Descend at VMO/MMO
Level at 10000' or lowest safe altitude (BH preferred)

Current: THRUST LEVER....................................CLOSE
Proposed: Thrust Lever..........................................Confirm, Close (Teamwork)
Thrust lever................Confirm, Slowly Retard (Teamwork and qualification)
!Thrust lever....................Confirm, Retard
Slowly retard lever

FIG. 31

YELLOW

After N2 decreases to 20%:

---

Engine start selector....................GND
Below 10000'...............Deferred action

---

FIG. 32

| Decision step | Time | Teamwork Outcome | Style |
|---|---|---|---|
| Observed State | Immediate reference | Confirmation | CDV |
| | As encountered | Confirmation | CDV |
| | Delayed | Confirmation | CDV |
| Judgment for Action | As encountered | Agreement | |
| | Delayed | Agreement | |
| | Deferred | Agreement | |

FIG. 33

| Navigation step | Time | Teamwork | Style |
|---|---|---|---|
| Go To: Checklist step | As encountered | None | |
| Another checklist | As encountered | None | |
| Supporting information | As encountered | None | |
| End of checklist | As encountered | Announce | Spoken Aloud |

FIG. 34

C HYD 1 OVHT......

73A

C HYD 2 OVHT......

73B

FIG. 35

FIG. 38

3.

Choose One:
- Both AC BUS OFF lights....
- Only Right AC BUS...
- Only Left AC BUS...

FIG. 39

1. Determine flap settings

<1 —— 1 to 15 —— >15

Go to 8 Go to 5 Go to 2

2. Set VREF for smallest flap position.
3. When using VREF 15 and any of the following conditions exist, set VREF ICE = VREF 15+10.*
    - Engine anti-ice.....
    - Wing antice...
    - Icing ...
4. Go to 10

5. Set VREF 40+30 knots.
6. Check the appropriate...
7. Go to 10

8. Use Training Edge Flaps Up Landing Checklist.
9. Go to 10 *(or go to that checklist??)*

10. Deferred Items

.. ...... ......

..... ...... ..

.. ...... ......

* Conditional operators are highlighted to get attention

*(Note that the QRH does not say what to do if non of these conditions exist?)*

1. Determine flap settings:

■ <1 Go to 8

● 1 to 15 Go to 5

▲ >15 Go to 2

▲ 2. Set VREF for smallest flap position
3. When using VREF 15 and any of the following conditions exist, set VREF ICE = VREF 15+10.*
   - Engine anti-ice.....
   - Wing antice..
   - Icing ...
4. Go to 10

● 5. Set VREF 40+30 knots.
6. Check the appropriate...
7. Go to 10

■ 8. Use Training Edge Flaps Up Landing Checklist.
9. Go to 10 *(or go to that checklist??)*

10. Deferred Items
..........
..........
..........

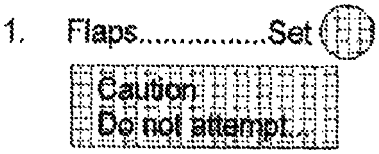
FIG. 43
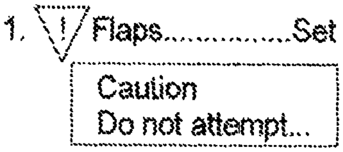
FIG. 44
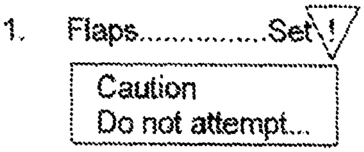
FIG. 45
FIG. 46
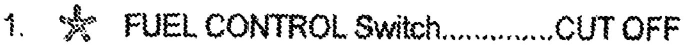
FIG. 47
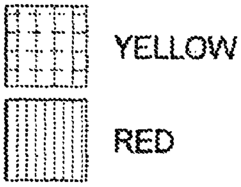

STYLE GUIDE AND FORMATTING METHODS FOR PILOT QUICK REFERENCE HANDBOOKS

CROSS-REFERENCE TO RELATED APPLICATIONS

This application is a continuation-in-part of U.S. patent application Ser. No. 10/938,393 filed on Sep. 10, 2004, which, in turn, claims the benefit of U.S. Provisional Application No. 60/502,135, filed on Sep. 11, 2003. The disclosures of the above applications are incorporated herein by reference.

FIELD OF THE INVENTION

The present invention relates generally to pilot quick reference handbooks (QRHs), and more particularly, but not exclusively to a style guide and formatting methods for QRHs.

BACKGROUND OF THE INVENTION

While operating an aircraft, a flight crew must often access one or more checklists within a quick reference handbook (QRH) in order to successfully perform their primary tasks. Because the operation of an aircraft can depend upon the proper use of a QRH checklist, it is highly desirable to provide an improved format for QRH checklists that allow for even safer aircraft operation.

Pilots work in a complex multitasking environment where many things compete for their attention. Since pilots, as do all humans, have limited attention and cognitive resources, these resources have to be distributed to the activities in which they are engaged. If one task requires a lot of the pilots' resources, then their resources may not be available for other tasks.

To successfully perform their primary tasks, crews must perform secondary or "interface management tasks", such as physically manipulating a checklist, trying to determine what aspects of a checklist should be used in the current task, and/or accessing information in a checklist that is not readily available. In part, these secondary tasks are necessitated by the fact that crews view only a small amount of information at any given time through their flight deck displays and checklist pages.

In many human performance domains, interface management demands have been found to be excessive under some circumstances and the additional workload may interfere with a crew's ability to perform their primary tasks. Two effects have been identified, namely resource-limited effect and data-limited effect. Regarding the resource-limited effect, interface management tasks draw cognitive resources (e.g., attention, etc.) away from the primary tasks and performance declines because there are insufficient resources available for them. With the data-limited effect, primary tasks consume most of the cognitive resources leaving little for interface management performance. Since the primary tasks are dependent on interface management tasks to access the proper information, performance declines due to lack of information.

With respect to the resource-limited effect, primary task performance declines when too much attention is directed to secondary tasks. With respect to the data-limited effect, pilots manage workload by prioritizing their tasks into primary and secondary tasks. Interface management tasks are not prioritized as highly as primary tasks and sometimes are not performed. Crews will use several strategies to minimize interface management demands, such as using the currently viewed information rather than trying to retrieve the best information for the task.

Thus, interface management tasks may create barriers between crews and information. During periods of high workload, crews may decide to not access additional information because the retrieval effort may detract from the crew's primary task of handling the aircraft. Also, seeking new information may disrupt ongoing tasks or may interfere with current information being used. In some cases, crews may not access information because they do not know that it exists, such as failing to use a checklist for annunciated situations.

In summary, while checklists support the general cognitive activities of crewmembers, their use may also add to overall workload and draw resources away from the primary tasks. As noted above, the management strategy adopted by pilots to cope with this added workload can impact performance of the primary tasks.

SUMMARY OF THE INVENTION

According to one aspect of the present invention, a machine-readable medium is provided for use with a processor having a memory. The machine-readable medium includes instructions for causing the processor to generate a quick reference handbook (QRH) for a mobile platform by organizing the QRH by listing checklists within a corresponding one of a plurality of grouping schemes, the grouping schemes including Quick Action, Systems, Annunciated (e.g., EICAS Messages, Lights, etc.); using differentiating criteria for decisions steps, action steps, and navigation steps within the checklists to thereby enable a user to discriminate the decision steps, action steps, and navigation steps from each other; and visually grouping related steps within a checklist.

According to another aspect of the present invention, a machine-readable medium is provided for use with a processor having a memory. The machine-readable medium includes instructions for causing the processor to generate a quick reference handbook (QRH) for a mobile platform by listing additional operational considerations after an indicator that a checklist is complete, whereby the additional operational considerations provide planning information and mission consequences the crew may wish to perform due to a non-normal condition but which are not a required part of conducting the checklist.

According to another aspect of the present invention, a machine-readable medium is provided for use with a processor having a memory. The machine-readable medium includes instructions for causing the processor to generate a quick reference handbook (QRH) for a mobile platform by including a list of operational consequences associated with a checklist near the end of the checklist but before an indicator that the checklist is complete, whereby the operational consequences of inoperative items provide information to the user about consequences resulting from a non-normal condition.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein:

FIG. 1B illustrates a cover for a QRH having a quick action index according to one embodiment of the present invention;

FIG. 4 is a plan view of another exemplary page of a quick reference handbook according to one embodiment of the present invention;

FIG. 5 is a plan view of another exemplary page of a quick reference handbook according to one embodiment of the present invention;

FIG. 6 is a plan view of another exemplary page of a quick reference handbook according to one embodiment of the present invention;

FIG. 7A is a plan view of another exemplary page of a quick reference handbook according to one embodiment of the present invention;

FIG. 7B is a plan view of another exemplary page of a quick reference handbook according to one embodiment of the present invention;

FIG. 8 is a plan view of another exemplary page of a quick reference handbook according to one embodiment of the present invention;

FIG. 9 is a plan view of another exemplary page of a quick reference handbook according to one embodiment of the present invention;

FIG. 10 is a plan view of another exemplary page of a quick reference handbook according to one embodiment of the present invention;

FIG. 11 is a plan view of another exemplary page of a quick reference handbook according to one embodiment of the present invention;

FIG. 12 is a plan view of another exemplary page of a quick reference handbook according to one embodiment of the present invention;

FIG. 14 is a plan view of another exemplary page of a quick reference handbook according to one embodiment of the present invention;

FIG. 15 is a plan view of another exemplary page of a quick reference handbook according to one embodiment of the present invention;

FIG. 17 is a plan view of another exemplary page of a quick reference handbook according to one embodiment of the present invention;

FIG. 18 is a plan view of another exemplary page of a quick reference handbook according to one embodiment of the present invention;

FIG. 19 is a plan view of another exemplary page of a quick reference handbook according to one embodiment of the present invention;

FIG. 20 is a plan view of another exemplary page of a quick reference handbook according to one embodiment of the present invention;

FIGS. 30-49 illustrate various formats and/or color schemes that may be used in presenting information.

Figure 1A:
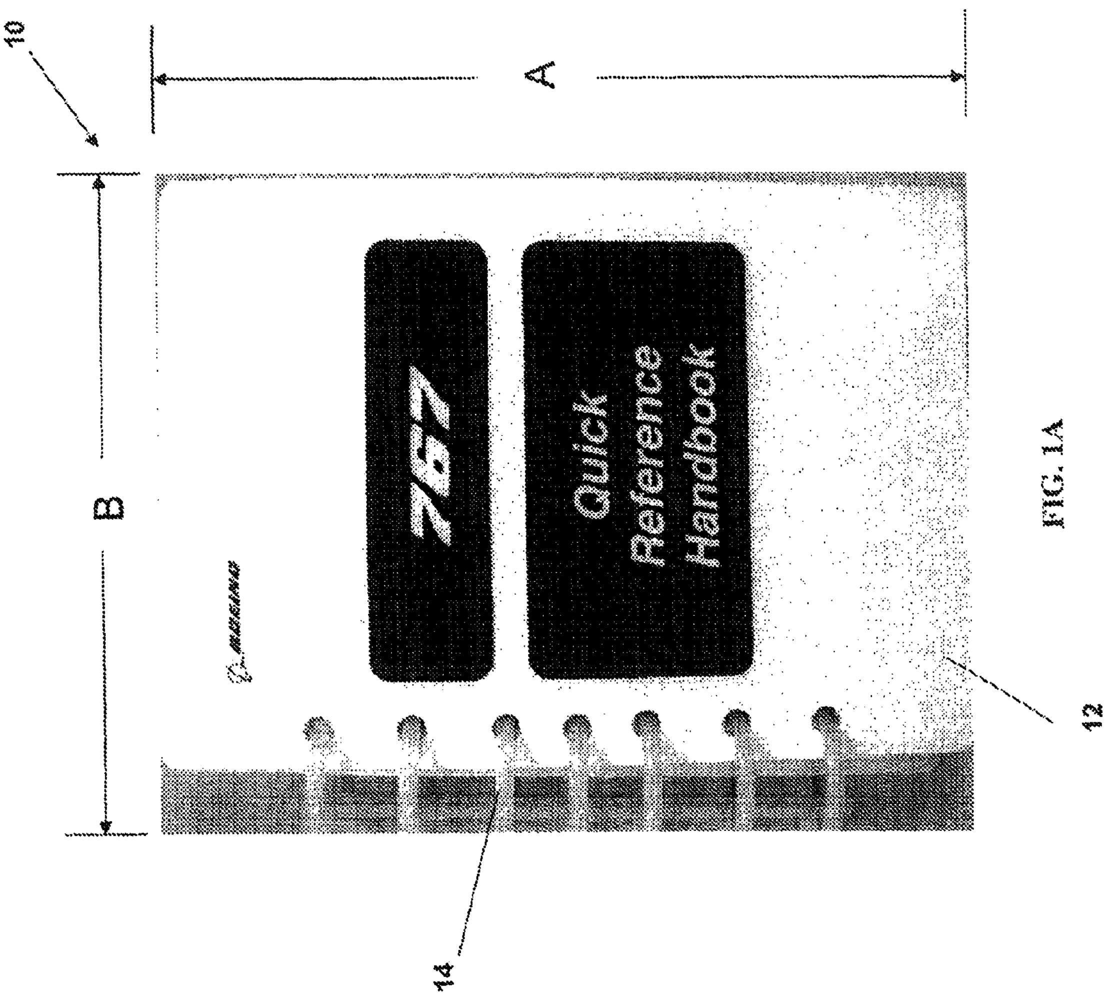
FIG. 1A is a plan view of an exemplary quick reference handbook prepared by a style guide and formatting methods for pilot quick reference handbooks according to one embodiment of the present invention.

It should be understood that the description and specific examples set forth below, and provided in FIGS. 1-29 while indicating at least one exemplary embodiment of the invention, are intended for purposes of illustration only and are not intended to limit the scope of the invention.

DETAILED DESCRIPTION OF THE EXEMPLARY EMBODIMENTS

The following description of exemplary embodiments is merely exemplary in nature and is in no way intended to limit the invention, its application, or uses.

Various embodiments of the present invention include digital or electronic data for a QRH, which may be provided in XML (extensible markup language), Framemaker, HTML (hypertext markup language), PDF (portable document format), etc. The digital or electronic version of the QRH may reside on any of a wide range of computer or machine readable media.

The digital or electronic version of the QRH may allow a user to electronically access the material, for example, while using an electronic flight bag (EFB) or other computing device. Additionally, or alternatively, the electronic QRH version may allow the user to print out the electronic QRH to create a hard copy that can then be accessed and reviewed by a user. When the electronic QRH is printed, the print version of the QRH can include at least one checklist having a format corresponding to any one of the formats described and shown herein, such as the checklist format shown in any one of FIGS. 2 through 20 and 29.

Various embodiments include a machine-readable medium for use with a processor having a memory. The machine-readable medium includes instructions to cause a processor to generate a hard copy or print copy of a QRH having at least one checklist in a format corresponding to any one of the formats described and shown herein, such as the checklist format shown in any one of FIGS. 2 through 20 and 29.

According to one aspect of the invention, a machine-readable medium is provided for use with a processor having a memory. The machine-readable medium includes instructions for causing the processor to generate a quick reference handbook (QRH) for a mobile platform by organizing the QRH by listing checklists within a corresponding one of a plurality of grouping schemes, the grouping schemes including Quick Action, Systems, Annunciated (e.g., EICAS Messages, Lights, etc.); using differentiating criteria for decisions steps, action steps, and navigation steps within the checklists to thereby enable a user to discriminate the decision steps, action steps, and navigation steps from each other; and visually grouping related steps within a checklist.

According to another aspect of the present invention, a machine-readable medium is provided for use with a processor having a memory. The machine-readable medium includes instructions for causing the processor to generate a quick reference handbook (QRH) for a mobile platform by listing additional operational considerations after an indicator that a checklist is complete, whereby the additional operational considerations provide planning information and mission consequences the crew may wish to perform due to a non-normal condition but which are not a required part of conducting the checklist.

According to another aspect of the present invention, a machine-readable medium is provided for use with a processor having a memory. The machine-readable medium includes instructions for causing the processor to generate a quick reference handbook (QRH) for a mobile platform by including a list of operational consequences associated with a checklist near the end of the checklist but before an indicator that the checklist is complete, whereby the operational consequences of inoperative items provide information to the user about consequences resulting from a non-normal condition.

Any of the aspects of the present invention can be used in combination with any one or more of the other aspects of the present invention.

Assumptions about flight crew competencies and conduct must be interpreted within the context of human performance. A key aspect of user-centered design is that to support skilled performance, the resources provided have to be compatible with the flight crews cognitive and information processing capabilities.

When pilots observe indications of a non-normal occurrence, the pilots try to construct a coherent explanation for the non-normal occurrence. This cognitive activity is commonly referred to as situation assessment and involves coordination between crew knowledge and experience, the external setting, and context. It is through this coordination that the crew develops an accurate understanding of the situation. These understandings may be dynamic and adaptable to new stimuli in the environment. Ideally, the crew has agreement on their individual assessments of the flight situation.

Action Response refers to deciding upon a course of action to address a situation and then taking action. In general, response planning involves using a situation model to identify objectives (e.g., stabilize the aircraft, etc.) and the transformations required to achieve them. In the absence of procedures, pilots generate alternative response plans, evaluate them, and select the most appropriate one to the current situation model. In some cases, the crew may interact with the world to gain more information about the situation or to refine their understanding of the situation. These interactions may influence future actions.

The pilots' primary tasks also include crew communications and coordination with people and events outside the aircraft, like air traffic control, operator flight management centers, and airport ground operations. Aircraft procedures and Quick Reference Handbooks (QRHs) are an integral part of the flight deck and the crew's performance of primary tasks. Aircraft procedures are designed to support the crew by providing strategies based on detailed, "off-line" analyses of both normal and non-normal states. These procedures help bridge the gap between engineering and operations.

The QRH supports several aspects of primary task performance. More specifically, the QRH supports monitoring by informing crews of the task relevant aircraft parameters. The QRH supports situation assessment by indicating the meaning of flight deck indications, guiding the decision making process by providing decision steps that structure aircraft conditions using logical statements to support the identification of a proper response plan to follow, providing rationale for better understanding of action steps, and providing information on the consequences of actions. Further, the QRH supports action response by providing pilots with step-by-step action statements to accomplish the objectives of the tasks.

Because the way a checklist is designed and formatted can greatly affect the secondary task workload it imposes, there is a need to design the QRH to minimize secondary task workload.

In addition to effects associated with workload and attention management, checklist design can also impact performance. Therefore, it is highly desirable to have QRH designs that do not include design features which make the performance of a QRH checklist susceptible to error, and thus eliminate, or at least substantially minimize, the occurrence of design-induced errors. QRH checklists are designed to at least minimize the occurrence of common design-induced errors such as misordered action-sequence errors, loss-of-activation errors, capture errors, description errors, and action errors.

With respect to the cognitive challenges of managing workload in complex operational environments, the goal of user-centered design is to provide flight deck interfaces that are easy to use and minimally distract crews from their primary tasks.

Accordingly, a user interface for supporting the users thereof to efficiently and safely perform their tasks is provided. Following an extensive data collection effort involving structured interviews and questionnaires sent to aircraft operators and an analysis of existing QRH content and format, several human performance issues associated with QRH use were identified and validated including: difficulty finding the correct checklist, doing the wrong checklist, difficulty resolving decision steps with complex logical relationships (such as "if" statements, etc.), difficulty interpreting qualitative terms (such as "as required", etc.), performing and remembering recall steps, skipping checklist steps, performing unnecessary checklist steps, losing one's place, difficulty finding supporting information needed to complete a task, difficulty using supporting information, failure to remember that a normal checklist (NC) has changed following use of a non-normal checklist (NNC), difficulty in physically handling and manipulating the QRH, and knowing when to stop.

General principles for QRH design are described below that address at least one or more of the following aspects of QRH design. These general principles of QRH design include: Accurately Represent the System, Support Crew Tasks, Meet Expectations, Minimize Secondary Tasks, Distractions, and Workload, Ensure Cognitive and Physical Compatibility, Design for Simplicity, Design for Standardization, Consistency, and Predictability, Design for Positive Guidance, Design for Discrimination, Design for Timeliness, Design for Appropriate Flexibility, Design for Tolerance to Error, and Ensure Health and Safety.

The present criteria for designing a quick reference handbook (QRH) reflect the philosophy of its use. The considerations underlying the philosophy for the design of various QRH elements are presented herein. For the purposes of describing these implications, the QRH has been characterized in terms of the design elements that make up its features and functions.

By providing improved user-centered QRHs, the present invention provides at least one or more of the following advantages. A first possible advantage is the reduction in the need for operators to develop and maintain a company QRH and/or reduce the amount of change needed to create a company QRH from an industry standard. This reduces operators' overall operational costs.

A second possible advantage is that the improved user-centered QRH can improve operator understanding of checklists and information in the QRH. A third possible advantage is that the QRH can further standardize operational documentation across aircraft models. Standardization reduces costs for maintaining different documents. It also reduces the operator costs for training that is associated with transitioning crews between aircraft and supports mixed-fleet flying. When crews use different formats, the probability increases for negative transfer errors in procedure and checklist use.

A fourth possible advantage of an improved user-centered QRH is that the NNC's can be characterized in terms of the design elements that make up its features and functions. QRH design is described below along the following eleven topics: (1) Role of the QRH, (2) Organization of Checklists within the QRH, (3) Checklist Selection, (4) Checklist Verification, (5) Checklist Steps, (6) Cautions and Warnings, (7) Technical Data, (8) Navigation and Place keeping Aids, (9) Supporting Information, (10) Operational Considerations, and (11) Document Characteristics.

Other important design considerations involve the context in which the QRH will be used. For example, operational environment includes design considerations that address the environmental conditions of use, such as lighting, glare, smoke, air mask, etc. Relevant factors are identified which the design can accommodate.

Another design consideration is the relationship of QRH to other user-system interfaces (USIs). The QRH is part of the overall aircraft user-system interface. These considerations address their relationship. The location of the QRH(s) supports ready retrieval and physical support for use. Tasks that rely on integrating actions and information across different user-system interfaces are supported to the extent that they are consistent, e.g., similar working, labeling, use of coding, etc.

(1) Role of the QRH

The primary purpose of the QRH is to support flight crew tasks during non-normal in-flight operations. The QRH is a single source reference document that optimally will contain all relevant guidance, information, and data needed to support the flight crew in the conduct of non-normal tasks. Information and data associated with a specific checklist are contained within the checklist, co-located with the checklist, or referenced by page number. One rationale for this is to reduce information search time and errors due to absence of information or data.

Currently, the normal checklists are included in the QRH. Preferably, however, the normal checklists are separated from non-normal checklists in the QRH thus making the normal checklist document smaller and its operation easier to navigate and manipulate.

(2) Organization of Checklists within the QRH

Organization refers to the physical arrangement of the checklists within the document. Currently, checklists are arranged alphabetically. Preferably, the organization reduces errors of selecting a checklist with a similar title and reduces navigation and search when performing tasks. To accomplish this, the following guidelines are provided.

Checklists are organized to minimize (or at least reduce) the need for navigation through the QRH. The current organization can lead to errors of selecting a checklist with a similar title. It also requires a lot of navigation when performing tasks. A task-based organization is preferable so that checklists typically used together or which commonly follow each other can be located together.

Combining multiple things into one checklist should be and preferably is avoided. Combining many situations into one checklist makes the checklist long and requires conditionals. It is generally better to have shorter checklists without conditionals.

Where possible, checklists should address less than worse-case scenarios. Normal condition checklists and non-normal condition checklists should be separated into two documents. Creating two documents will make each documents smaller, easier to navigate, and easier to manipulate.

Checklists are organized in the QRH to support non-normal tasks from beginning to end. Normal checklists that are modified due to a change in aircraft capability are appended to the non-normal checklist in the QRH, or they are clearly identified. Non-normal checklists that follow another non-normal checklist are placed after the associated checklist or are referenced by page number. All normal checklists that are not modified due to a change in aircraft capability are preferably removed from the QRH and are placed on a normal checklist card.

(3) Checklist Selection and (4) Verification

All non-normal checklists are assumed to be cue driven. The trigger is what alerts the crew that a non-normal condition exists. The triggers may originate within the flight deck (e.g., EICAS, fault light, aural warning, etc) or they may originate from some other source (e.g., noise, vibration, smell, flight attendant, etc.). A means of supporting the crew in linking a cue or constellation of cues to the appropriate checklist is preferably provided.

One rationale for this is that the crew needs to be able to verify that the found checklist is the correct checklist for the non-normal condition. It also needs to support non-native English speakers propensity to explicitly cue match EICAS messages and switch/light labels to the condition. In general, cue matching is what helps the crew verify they have identified the condition correctly and found the corresponding checklist.

Checklist Selection Guidelines

The QRH provides features to guide the pilot in selecting the proper checklist from an external triggering condition, such as a panel light, EICAS (Engine Indication and Crew Alerting System) message, or pilot identification of an unannunciated condition. These features include tables of contents, light indices, etc.

Panel lights, EICAS messages, and other triggers have maximum (or at least heightened) discriminability to minimize (or at least reduce) the chance of going to the wrong checklist. Since many messages in the cockpit have similar wording, pilots may access the wrong checklist. Enhancing the pilot's ability to discriminate between checklists helps minimize (or at least reduce the likelihood of) this error.

EICAS messages that do not have checklists are coded differently than those leading to checklists. Pilots should immediately know which messages are associated with checklists and which are not. Providing this information will reduce needless access of the QRH when no checklist exists.

"Crew awareness" checklists (carets) should be eliminated. These require navigation and pilots don't obtain any information once they access the appropriate checklist. The EICAS message alone performs this function. If a caret item has some information for the crew, then a checklist or note is provided.

When separate EICAS messages send the pilot to the same checklist, a decision step is provided to facilitate the determination of where in the checklist users should go for each particular message.

The transition from triggering message to checklist is direct with no additional cognitive analysis required. Pilots should not have to classify messages into systems and then look up the checklist in an alphabetical list by system.

When the actions required by different checklists or checklist steps conflict (e.g., set flaps at 20 degrees vs. 15 degrees, etc.), the checklist or other procedures should provide information to help pilots resolve the conflict.

When multiple triggers occur in close temporal proximity, pilots are given information to help them choose the order in which checklists are performed. A measure of support for this can be provided by using a prioritization coding scheme, similar to that used for EICAS messages. Pilots would be trained to complete higher priority checklists first. Color can be used to code checklist priority.

Checklists containing memory steps are coded in the checklist selection tables and indices. Coding this information helps alert the pilot to the existence of such steps if they somehow didn't realize these urgent steps had to be performed.

Pilots have immediate access to a list of conditions associated with checklists for unannunciated conditions. Crews often have difficulty diagnosing the condition, especially engines, and may not know which checklist is applicable to an unannunciated non-normal condition. A symptom list matrix with the list of checklists can be provided as an aid for checklist identification. Support is needed to select checklists when multiple triggers occur simultaneously.

Indexes and table of contents are designed to facilitate search. Checklists are indexed by their triggering cue. Different kinds of indexes are used to assist the crew with finding the correct checklist and they are appropriate to the aircraft: light/switch index, message index, systems index. In one prototype/exemplary concept uses several short indexes, such as Messages, Lights, Unannunciated, System Name, etc. For non-EICAS aircrafts, an exemplary QRH prototype includes Lights, Unannunciated, and System Name indexes.

Tabs to the checklist are as direct as possible to provide quick access to the correct checklist and reduce translation. Tabs are labeled on each side to facilitate search. They are also sturdy to resist wear.

Tabs are labeled by page number, although this may increase overall expense because of document management when there is a page change needed. Other suggestions included labeling by ATA coding, by section number, with system names.

Checklists are not duplicated in the QRH. Checklist titles may be duplicated across indexes. This reduces the chance of not revising a checklist during a revision cycle.

The QRH preferably provides immediate access to checklists that contain action steps that must be performed without delay. So they are easy to locate and use, immediate action or quick action checklists can be placed in the front of the QRH, in the front of their corresponding system sections, and/or they can be placed on the QRH covers. For example, FIG. 1B illustrates a cover for a QRH having a quick action index. Placing immediate action or quick action checklists in the most (or in an at least highly) accessible location of the QRH can help reduce the need for excessive memory items. Time critical checklists are easier to locate if they are located in the front of the book or in the front of their associated system section where they are readily accessible. Immediate action or quick action steps are included in the body of the full checklist before any subsequent checklist items. This provides continuity from immediate action checklist steps to the additional checklist steps.

Checklist Verification Guidelines

Checklists are identified through a checklist title and other information, such as triggering information and aircraft condition giving rise to the triggers. Prototype/Exemplary concepts are provided following the guidelines below.

One guideline is to provide each checklist with a distinctive unambiguous title, and whenever possible, the title should match the cue (e.g., EICAS message or discreet light, etc.). To the greatest extent possible, the differences between titles are maximized (or at least increased) to minimize (or at least reduce) the chances of selecting the wrong checklist.

Another guideline is to have page numbers prominently and saliently displayed near the checklist title. Page numbers are used to transition from the checklist triggering condition to the checklist. Thus, the numbers are highly salient for rapid and reliable viewing.

A further guideline is to provide contextual information where needed to help ensure that the proper checklist being used is located near the title. At a minimum, that information should contain the specific triggering indicators and a statement of the underlying condition.

Contextual information is preferably visually grouped and set off from the procedure steps to enable pilots to clearly distinguish contextual information from the procedure steps so that in case of time urgency they can rapidly begin the checklist steps.

Information about the trigger condition is preferably located near the title. The corresponding lights, messages, and other conditions causing the non-normal condition will appear at the top of the checklist so the flight crew can readily verify that the correct checklist has been found. These can be color coded to match their appearance in the flight deck.

(5) Checklist Steps

Checklist steps are instructions that guide pilot actions. There are several different kinds of steps: decision steps, action steps, and navigation steps. Checklist action steps will preferably have a distinct format to represent the purpose of the step and to support easy discrimination.

Decision steps give instructions for evaluating conditions so the appropriate action can be selected from a predefined set. The decisions may involve conditional logic, i.e., where the actions are to be performed only if a specified set of conditions exists. Decision steps present conditional statements that help the pilot determine which checklist steps to use. The outcome of the step(s) is navigation within the checklist.

Decision steps are a closed system so the pilot has every possibility or combination of conditions identified, even if the combination directs the crew to another checklist. This helps prevent error. All decision consideration is grouped together so they are in one visual field. Key decision logic (such as "IF" and indentation, etc.) is replaced with symbols to avoid confusion.

Navigation steps instruct the pilot to go to a particular step in the current procedure, to go to another procedure, or to end the procedure. Action steps describe the monitoring, control, and communication actions to be taken, i.e., instructions to perform physical steps and mental ones (e.g., "verify"). Action steps may also describe the objectives of those actions. Action steps differ along dimensions of time demands and teamwork. Temporal aspects of action steps are indicated. Important actions, involving a critical control movement are highlighted.

General Guidance Regarding Checklist Steps

Each primary action step is preferably numbered. First-level checklist action steps are numbered to assist with place keeping and communication. Second level action steps are not numbered, but are presented in the sequence the crew should accomplish them.

Steps are worded in simple, precise language. Steps are also made as simple as they can be. Steps are easier to follow if the amount of text is minimized. Vague language, like "as required," should be made precise whenever possible.

Where possible, a limited set of graphic elements should be included to rapidly convey important information. Well chosen graphics are rapidly interpreted and are less prone to error for non-native English speakers.

Steps are presented with only the information required to accomplish or understand the step. Checklist steps are one of the most important aspects of the QRH. Their presentation is as clean and uncluttered as possible. Mixing other supporting information into the steps can create distractions that can more easily result in skipping or missing a step. Methods to ensure that pilots are aware of supporting information and are guided to it are addressed in other sections of this document.

Decision steps, action steps (including recall steps), and navigation steps are easily discriminated from each other. Since the behaviors for the three types of steps are different, clearly distinguishing the types of steps helps ensure the proper behavior is accomplished.

Sensory/perception should not be a problem when appropriate font size and style is used (e.g., no font size less than 10 pts, etc.).

Support is needed (and thus preferably provided) when different steps in different checklists conflict (for example: set flaps at 20 degrees vs. 15 degrees).

Positive wording of action steps should be used when possible, with negatives being identified or highlighted so they are salient.

The flow of checklists and checklist steps preferably follows flight task sequence.

Recall Steps

Recall steps are minimized (or at least reduced) to only those actions that must be completed immediately. Memory steps are easy, do not include conditional statements, and are not mission critical (e.g., engine shutdown, etc.). Decision steps are not memory steps. These are steps that must be accomplished to prevent crew incapacitation, aircraft damage or loss of control. Since these steps must be recalled from long-term memory and are performed without reference to a checklist, they are only required when a step must be accomplished before there is sufficient time to retrieve the QRH and access the checklist. Because relying on memory can be error prone, the number of such steps is minimized. Also due to memory limitations, memory steps should not require reasoning about aircraft conditions, e.g., decision steps requiring conditional logical reasoning. Memory may degrade under stress, crews rush through steps, performing memory steps may conflict with flying the aircraft, increased opportunity for error, require training and testing.

Recall steps are presented in a convenient location that can be read within a few seconds. All recall steps must be almost immediately available once the crewmember has retrieved the QRH. One exemplary prototype concept presents the recall steps on the QRH covers or in the first few QRH pages. If recall steps are provided in a location separate from the full checklist, guidance from the end of the presentation of recall steps to the full checklist is preferably provided with clear reference to the appropriate page number. Any recall steps presented prior to referencing the full checklist should be repeated in the full checklist in a manner that visually sets them apart from non-memory steps. Clearly distinguishing recall steps from the rest of the checklist will facilitate pilots in starting at the right place in the checklist and not have to search for the proper step.

Decision Steps

The specific items to consider in the decision step are grouped together. Decision steps give instructions for evaluating conditions so the appropriate action can be selected from a predefined set. Decision steps present conditional statements that help the pilot determine which checklist steps to use. Presenting all options together will facilitate evaluating the conditions.

Preferably, decision steps are completely closed. Decision steps are a closed system, so pilot has every possibility or combination of conditions is identified (all possible outcomes are addressed). For example, in dual engine failure, guidance is provided if the engines relight or not. Each decision step should have a result, even if no further action is required.

Where possible, declarative statements of conditions are presented rather that using conditional operators. "If . . . , then . . . " statements are normally difficult for non-native English speakers to reason about and may result in error. Significant decision terms are highlighted. This includes terms like "and" and "or." The outcome of the decision step(s) is navigation to the proper part of the checklist or to another checklist.

Action Steps

Action statements are preferably worded, formatted, or coded to indicate the style of crew interaction and communication needed as follows. Clear initiation criteria are provided, such as a clear indication of when to start. Clear termination criteria are also provided, such as a clear indication of when to stop, even if checklist is not complete. Temporal aspects of steps are clearly indicated in the wording of the step. Important actions are highlighted. All keywords should be salient; and related steps should be visually grouped.

Navigation Steps

Navigation steps instruct the pilot to go to a particular step in the current procedure, to go to another procedure, to end the procedure, or to another place in the QRH.

(6) Cautions and Warnings

Cautions alert pilots to important preconditions or consequences of action steps. Cautions should be highly salient. Since high salience is needed (or at least preferred) for cautions, color or distinctive symbology is preferably used rather than just font coding or other less salient feature. Cautions are collocated with the appropriate step. This helps ensure that the content of the caution is read when needed. Where appropriate, information is provided as to whether the caution applies prior or after the relevant step. This helps ensure that pilots know when to read the caution with respect to the step action.

Caution and warning statements need to be visually salient. Color (in addition to distinctive symbology) can be used to discriminate between cautions and warning statements. Cautions and warning statements are preferably located near the appropriate action step so pilots are likely to read them when needed.

(7) Technical Data

Checklists preferably include technical data integral to checklist use. This data provides information that is used to tailor checklist actions. Such information can be in the form of tables, graphs, and diagrams. Technical data is presented to the flight crew in a format that is simple, contains basic values, and is easy to use and interpret. All advisory performance data are relocated to another manual.

Non-normal maneuvers are removed or co-located with the associated checklist. Maneuvers that are expected to be known by the flight crew are in the training manual and not the QRH.

Technical Data Guidelines

Information is organized by task and checklist step. The information is only as precise as needed by the task (over precision can add to complexity, time to use, and chances of error). Table and graph formatting are designed to support visual search and readability. Technical data are located near the appropriate action step but not in such as way as to divide the sequence of steps. Locating data near the steps reduces the need for pilots to navigate to it. This data is not located on the same page as the checklist steps so as to not separate sequential steps by too much information. To maintain awareness of where the checklist is going, it is important to keep steps relatively close together. Visual aids are used to assist pilots in locating supporting technical data.

(8) Navigation Aids and Placekeeping

Navigation aids and placekeeping are the design features of the QRH that provide landmarks to indicate where the pilot is in the checklist (such as page numbers, step numbers, and headings, etc.) and the design features that facilitate the location of other information within and between checklists (such as tabs, arrows, etc.). Checklists may also include aids for placekeeping (marking where a pilot is so they can more easily return).

Navigation Aids and Placekeeping Guidelines

Page or section numbers are preferably visible when the pilot is in the front of the QRH. Pilots navigate from the index to the proper checklist using page numbers. Page numbers are salient and always visible on each QRH page. Support is provided for marking the location of a needed checklist or other information. If a pilot leaves the checklist to do something else and wants to return to a particular location, marking will facilitate the transition. This can be accomplished in several ways. First, one or more "ribbon-type" bookmarks could be attached to the QRH binding. Pilots could use them as needed, to mark the location of a checklist or other supporting information. Another approach is to provide foldout tabs that can be opened. When open, the tabs are visible.

Support is provided for identifying currently active steps. Visual aids and guidance are provided when a checklist step directs the pilots' attention to another part of the checklist or supporting information. Checklists that continue from one page to the next provide markings on both top and bottom of the continuation.

Identify all crew action end points in the checklist. Identify all checklist complete points in the checklist. Use "END" or an end of checklist symbology to indicate no further crew action is needed, although there may be other information that needs to be read. Use "Checklist Complete" only when the QRH can be closed. Whenever practical one checklist will appear on a single page. In the cases where the checklist must continue onto another page, there are clear place keeping markers on both top and bottom of the continuation. Indentation should not be carried onto another page.

Checklist elements are visually distinct from each other. Navigation and place keeping structure are provided by sequential numbering of primary action steps. Landmarks such as page numbers are salient and always visible. Support is provided for indicating where you are in a checklist (especially if interrupted) and for identifying currently active steps. There are pointers to supporting information.

(9) Supporting Information

Understanding a checklist step may be supported with information explaining the basis for the step. This may include text, synoptics, and other technical information. Provision of such information helps less experienced pilots use the checklist in a more informed manner. It may also help minimize intentional non-compliance and help prevent operators from making inappropriate changes to the specified actions.

Supporting Information Guidelines

Statements of the high-level objective to be achieved by a checklist are presented. This information supports the pilot's evaluation of the success of the checklist.

Supporting information is located near the appropriate action step but not in such as way as to divide the sequence of steps. This provides supporting information (such as "amplified" information) in a way so that it does not interfere with checklist use. A very experienced pilot is able to quickly and efficiently complete the checklist with minimal distractions, but sufficient information is available for less experienced pilots to better understand the basis and meaning of checklist steps.

An indication may be provided for those steps for which supporting information is available. Since supporting information may not be available for every step, pilots can be provided with a visual indication, such as a symbol, to indicate when it is available. Information needed to perform a step or that contains warnings and cautions appear within the body of the checklist. Synoptics and circuit breaker diagrams may be included in the QRH.

(10) Operational Considerations

Checklists include information identifying the consequences of checklist use. This includes "Do not accomplish" statements and information about how other checklist are modified as a consequence of the current checklist or non-normal condition, e.g., modified NCs and operational constraints such as can't fly faster than, can't fly higher than, need longer runway, etc.

Operational Consideration Guidelines

This type of information is provided for all checklists where appropriate. Consequence information is presented following the checklist steps. Inoperative items and additional considerations information is provided such as what equipment may be needed for an approach, and inoperative equipment that may limit a particular kind of approach (CAT III), or other mission consequences that are relevant to the pilot. Where checklists are used prior to takeoff, these may include go/no-go criteria.

(11) Document Characteristics

Document characteristics refer to the features relating to the characteristics of the physical document, such as size, shape, page color, page texture, binding, etc.

Document Characteristics Guidelines

Pages may be white. White pages maximize the contrast between QRH elements and document background as well as color graphics. Pages are durable, resist glare, and spills. QRH binding preferably permits change pages to be easily included. The binding should be sturdy enough so that pages do not come apart when the QRH is dropped. Checklist typography should comply with NASA guidelines and standards.

The location of the QRH in the flight deck supports ready retrieval and physical support for use. The font size is at a minimum of 10 point, and 11 or 12 point is preferred. The longer size permits the use of larger font and may allow a checklist to reside on a single page rather than crossing multiple pages.

Philospohy and Assumptions

There are several assumptions underlying QRH philosophy of the present invention. Assumptions about flight crews and operational conduct that influence the design of the QRH will now be outlined.

Flight Crew Assumptions

One assumption about the flight crew is that aircraft pilots are qualified and trained in the aircraft. This assumes that pilots are trained in the aircraft, its systems, operation, and handling and have passed the minimum qualification standards. The level of detail of QRH instructions reflects this basis.

Another assumption is that aircrew behavior is guided by procedures. Because piloting is a complex activity, procedures are needed for normal and non-normal operations.

An addition assumption is that pilots have familiarity with the procedures through their training and experience. Checklists are needed as reminders of procedure actions.

A further assumption is that the aircrew may not be familiar with the specific non-normal checklist they are using. Because non-normal conditions are rare on modern aircrafts, a flight crew may not have used a non-normal checklist in a long time. Therefore, the QRH design should be intuitive.

Another assumption is that the flight crew has a basic level of English proficiency. This assumption recognizes that aircrafts are flown by flight crews who may not be native English speakers and that English proficiency varies. Thus, the QRH is written to reduce sentence complexity and make consistent use of words and terminology. This assumption also recognizes that reading proficiency is generally higher than oral proficiency among the pilot population world-wide.

A further assumption is that flight crews do not need explicit guidance in the checklist for the conduct of routine normal operational tasks. To reduce checklist complexity, explicit guidance for routine tasks a crew encounters in daily normal operations is not provided, such as Start APU, etc. Explicit guidance is provided in the checklist for any task that deviates from normal operational settings or sequence.

An additional assumption is that the flight crew is responsible for prioritizing their activities and sequence of checklist accomplishment. Generally assumes flight crews will prioritize their tasks in the following order: safety, passenger comfort, and efficiency.

Operations Assumptions

One operations assumption is that if possible, the QRH should remain onboard the aircraft and be unique to that aircraft model. This simplifies the QRH design and makes it compatible with aircraft-specific equipment. A paper version of the QRH may be issued to pilots for their personal use as a study guide. Operational versions of the QRH should remain on the aircraft.

Another operations assumption is that Normal and Non-normal Procedures and the QRH are an integral part of aircraft design. The QRH is part of the overall aircraft design. The location of the QRH supports ready retrieval and physical support for use. Tasks that rely on integrating actions and information across different interfaces are supported to the extent that they are consistent, e.g., similar working, labeling, use of coding, etc. The QRH is designed to support the flight crew's operation of the aircraft in normal and non-normal conditions.

A further operations assumption is that checklist action items vary in their time demands for completion. A limited set of actions must be performed immediately and therefore must be memorized (cannot rely on checklists). Others must be performed quickly and require immediate access. The remaining actions are performed when encountered in the checklist or are deferred. The design of the checklist reflects these dimensions of time.

An additional operations assumption is that checklist action items vary in their teamwork demands for completion. The kind of crew coordination required for checklist completion varies. The design of the checklist reflects this variation. Normal checklists typically follow the do-verify and challenge-response teamwork methods. Non-normal checklists typically follow the challenge-do-verify, read-and-do, and challenge-confirm methods.

Another operations assumption is that flying requires teamwork. Flying requires significant crew task coordination. At the simplest level, tasks are divided between the "pilot flying" (PF) and the "pilot monitoring" (PM). The flight deck is also divided into areas of responsibility to suggest an appropriate division of crew action between pilots. Thus the checklists are designed to support both of these paradigms.

Yet another operations assumption is that checklists do not guide the flight crew to trouble shoot non-normal conditions. In non-normal situations while flying, pilots manage the aircraft's configuration to ensure safety and the QRH does not address diagnostic and maintenance information. However the QRH may contain information that might help a flight crew confirm a non-normal condition.

In special operational situations, such as ETOPS (Extended Twin-Engine Operations or Extended Diversion Time Operations), additional information that supports diagnostic analysis may be provided. In rare cases where there is potential for the conduct of the checklist to not resolve the situation, additional systems configuration guidance may be provided in the QRH.

Checklists address single malfunctions and do not address situations involving multiple failures. In certain unrelated multiple failure situations, the flight crew may have to combine elements of more than one checklist and possibly make judgments about how to proceed. The pilot-in-command must assess the situation and use sound judgment to determine the safest course of action.

The QRH design also assumes flight deck information is correct unless there is conflicting information. Pilots are trained to assume the information presented by their flight deck displays is accurate and they generally do not need to verify that the QRH triggering conditions are valid. In some situations indicator lights are tested to verify suspected faults.

The pilot-in-command is the final authority for the operation of the aircraft. Both pilots, however, are responsible for the safe operation of the aircraft. Pilots must be aware that checklists cannot be created for all situations and are not intended to replace sound judgment. In some cases, deviation from checklists may (at the pilot-in-command's discretion) be necessary based on the unique situation of the aircraft.

In a non-normal condition, the pilot-in-command is expected to manage the flight situation. Research has shown (FAA/NTSB) that the incident and accident rate is lower when the pilot-in-command manages the non-normal situation.

In a non-normal condition, the flight crew is expected to utilize an appropriate level of automation that will aid the crew in workload management. Expects pilots will use automation as a tool for reducing crew workload under non-normal conditions.

The QRH design also assumes that flight crews do not need explicit guidance in the checklist for the conduct of routine normal operational tasks. To reduce checklist complexity, explicit guidance for routine tasks a crew encounters in daily normal operations is not provided, such as Start APU. Explicit guidance is provided in the checklist for any task that deviates from normal operational settings or sequence.

The QRH is designed to be a single-source reference document for in-flight operational use by the flight crew. The QRH contains checklists as well as any appropriate supporting information to aid the crew in checklist completion. It is not intended to contain training information.

The flight crew is expected to read every line in the checklist. Any unnecessary text is removed from the checklist. The checklist is to be accomplished as written.

The QRH is to be used as part of a flight operations book set. Expects operators to have other documents with supplementary information on training, systems, etc.

Checklist Steps

Checklist steps provide instructions that guide pilot actions. There are three different kinds of checklist steps: decision steps, navigation steps, and action steps. Checklist steps differ along dimensions of (1) time demands, (2) crew action required, and (3) teamwork involved in their accomplishment. In some cases, these differences are reflected in the format of the checklist item. In other cases, these differences may be transparent to the flight crew and only be applicable in the authoring of checklists and procedures.

(1) Time Demands

Recall steps are actions the crew performs from memory. There are some non-normal conditions that require an immediate response from the crew where crew action must be initiated without delay and without reference to a checklist. Both crewmembers systematically and without delay accomplish all recall items in their area of responsibility from memory. Recall steps are minimized in the QRH and limited to only those actions that require an immediate crew response. Recall steps should not require conditional reasoning by the crew. Clear criteria can be established for identifying which steps must be recall steps and which may be reference steps.

Immediate Versus Quick Reference Actions

Immediate action checklists include immediate actions and may include quick reference actions. Some immediate action steps are of such critical nature that they are accomplished by memory. Other quick action steps may be conducted with reference to an immediate action checklist if such an immediate action checklist is included in the QRH. The immediate action memory steps and the immediate reference steps are preferably presented in the front of the QRH, in checklists at the front of each system section, and/or on a separate quick reference card (QRC) if used. All immediate action steps are duplicated within their corresponding reference checklists.

Immediate actions are typically "those actions that must be performed so expeditiously that time is not available for a crewmember to refer to a manual or checklist." However, if it can be demonstrated that the action may be taken safely by reference to a QRC or immediate action index then the action need not be conducted from memory.

Some non-normal conditions require an immediate response, where no time can be lost when responding even to a checklist. These are primarily conditions involving flight control problems (such as runaway stabilizer trim, etc.) or non-normal maneuvers (such as explosive decompression, etc.). There may also be some cases where the workload of both pilots is excessive and neither pilot can refer to the checklist or if the checklist was read could process the information.

Hasty action can create other problems or make the situation worse. A mistaken diagnosis of the condition may lead to the wrong response. For an engine-fire warning in flight a memory item procedure might dictate shutting down the engine immediately. But a fire warning might also result from a faulty warning system or engine bleed air leak. If the throttle lever is retarded the fire warning may cease especially in the case, for example, of a bleed air leak. On short final or in a power-critical situation it may be prudent to not secure the engine if no secondary indications of engine fire are observed.

Immediate Action Items describe information from Order 8400.10—Air Transportation Operations Inspector's Handbook Volume 3, Chapter 15, Section 1, 2079. The following provides the definition of "Immediate Action": An action that must be taken in response to a non-routine event so quickly that reference to a checklist is not practical because of a potential loss of aircraft control, incapacitation of a crewmember, damage to or loss of an aircraft component or system—which would make continued safe flight improbable.

An immediate action is an action that must be accomplished so expeditiously (in order to avoid or stabilize a hazardous situation) that time is not available for a crewmember to refer to a manual or checklist. Crewmembers must be so familiar with these actions that they can perform them correctly and reliably from memory. Situations that require immediate action include, but are not limited to the following, imminent threat of crewmember incapacitation, imminent threat of loss of aircraft control, and imminent threat of destruction of a system or component which makes continued safety of the flight and subsequent landing improbable.

Under these criteria, a flight crew donning oxygen masks in response to a depressurization or turning off the fuel and ignition in case of a hot start are situations requiring mandatory immediate action items. The loss of thrust on a jet engine during cruise, however, would not normally require an immediate action item according to these criteria.

Certain situations that either require or appear to require immediate action have proven to be a stimulus for evoking incorrect and inappropriate flight crew actions. Therefore, immediate action items must be strictly limited to only those actions necessary to stabilize the situation.

Reference Action Steps

Reference steps are performed by reference to the checklist. They are initiated when encountered in the checklist. The crew is expected to accomplish the checklist steps as written and to read each line aloud.

Delayed Action Steps

Delayed steps are performed when a specified condition or parameter is met, e.g., time or parameter value, aircraft state, etc. These steps are initiated when encountered in the checklist and the specified criteria are satisfied.

Deferred Action Steps

Deferred steps are performed at some later time in the flight, when the appropriate time (such as landing or approach) is encountered, or are an on-going task for the duration of the flight. The accomplishment of these steps is typically tied to a particular phase or phases of flight.

(2) Crew Actions

Decision Steps

Decision steps provide instructions for evaluating conditions so the appropriate action can be selected. The outcome of the step(s) is a decision about a course of action. Decision steps always involve a choice between competing paths for action. Decision steps involving conditional logic are not conducted from memory. There are three kinds of decision steps.

One kind of decision step relates to observations about the state of the world that requires the crew to determine the applicable state (e.g., light is on versus light is off, etc.). These decision steps involve a choice between two or more discreet conditions or specific courses for crew action. Another kind of decision step relates to judgments on the part of the flight crew. Such a decision step may be to determine the course of action to follow (e.g., to continue the flight versus to land, etc.) or to make a judgment about the management of the situation.

The third kind of decision step relates to an observation or judgment about a single condition, where only the single condition requires crew action. In some cases, the alternative condition (e.g., wing anti-ice is not required, etc.) is not presented because no crew action is required. This philosophy and format reduces checklist complexity.

Navigation Steps

Navigation steps instruct the pilot to go to a particular step in the checklist, to another checklist, to supporting information, or to the end the checklist.

Action Steps

Action steps describe the monitoring, control, briefing, planning, and communication actions to be taken, e.g., instructions to perform physical steps (e.g., depress XYZ, etc.) and/or mental ones (e.g., "verify", etc.). Action steps may also describe the objectives of those actions.

In general the kinds of actions required of the crew include, but are not limited to the following actions: flight deck control/switch movement, flight control manipulation, movement of a critical control (teamwork), monitoring (for a condition or parameter), activities the flight crew engages in, enter or manipulate data, brief, communicate, direct, and review information.

Action steps may take the form of instructions, commands, or statements depending on the kind of information, teamwork, and timeliness required to accomplish the action.

An exemplary format for recall steps (which is a type of action step) is shown in FIG. 30. Recall steps can be grouped with a red box or other graphic indicator, such as being preceded by a red dot as shown in FIGS. 9, 14 and 29. Recall steps are distinguished from other action steps. The box format in FIG. 30 is consistent with current QRH format. An alternative format is the current format of a single black box. An exemplary format for recall steps is shown in FIG. 30.

Recall steps are preferably grouped within a red box or other graphic indicator, such as being preceded by a red dot as shown in FIGS. 9, 14, and 29. Recall steps are distinguished from other action steps. The box format is consistent with the current QRH format. An alternative format is the current format of a single black box.

When an action is performed in routine normal operations, there is no need to specify explicit guidance unless the step is modified for the specific non-normal conditions. Crew action is slowed for critical control movements to ensure that confirmation is actually made. Confirm appears in italics to indicate it is spoken and helps ensure the other pilot is in the loop. Various embodiments add the word "Confirm" before the action for the actions outlined in FAA 8400.10 Document.

Procedural actions that require confirmation include the following actions resulting in the shutting down of an engine, actions resulting in the deactivation of flight controls, actions that if performed incorrectly (in the wrong sequence or at the wrong time) produce a catastrophic result even if the incorrect action is highly unlikely, actions where past experience or analysis has shown that there is a high probability for error or incorrect action, which may create a hazardous situation.

An emphasis on confirmation of critical control movement by both crew members should not reduce the emphasis on confirmation of all actions in a non-normal response.

Some checklist actions are activity-based and appear in sentence format, such as for example, enter or manipulate data, reactivate flight plan, brief, communicate, direct, notify flight attendants, review information, and refer to "Flight with Unreliable Airspeed" tables on page X. These formats represent non-specific flight crew activities.

(3) Team Work

Checklist steps also vary in their requirements for crew coordination.

Non-Normal Checklists

Challenge-Do-Verify Method: "The challenge-do-verify (CDV) method consists of a crewmember making a challenge before an action is initiated, taking the action, and then verifying the action item has been accomplished. The CDV method may be effective when one crewmember issues the challenge, and the second crewmember takes the action and responds to the first crewmember verifying that the action was taken. This method requires the checklist be accomplished methodically one item at a time in an unvarying sequence. The primary advantage of the CDV method is the deliberate and systematic manner in which each action item must be accomplished. The CDV method keeps all crewmembers involved, provides for concurrence from a second crewmember before an action is taken, and provides positive confirmation that the action was accomplished. The CDV method also enforces crew coordination, cross-checking, and verification, all of which aid the crewmember in overcoming the adverse effects of stress. The disadvantages of the CDV method are that it is rigid and inflexible, and that crewmembers cannot accomplish different tasks at the same time.

Actions that require the CDV method appear in the challenge-response format. Actions that do not require the CDV method appear as an instruction statement. Instructions are read aloud and are performed by the PM or PNF.

Normal Checklists

Do-Verify Method: The do-verify (DV) method consists of the checklist being accomplished in a variable sequence without a preliminary challenge. After all of the action items on the checklist have been completed, the checklist is then read while each item is verified. The DV method allows the flight crews to use flow patterns from memory to accomplish a series of actions quickly and efficiently. Each individual crewmember can work independently, which helps balance the workload between crew members. The DV method has a higher inherent risk of an item on the checklist being missed than does the CDV method. All normal checklist items appear in the challenge-response format." (Reference: Paragraph 3-2201 of Order 8400.10—Air Transportation Operations Inspector's Handbook Volume 3, Chapter 15, Section 1, 2079).

QRH Format and Content Changes

An exemplary QRH format including content changes will be described according to one exemplary embodiment of the invention.

Document Characteristics

The document may be longer and slightly wider (e.g., eleven inches long and six inches wide, etc.). The binder should not break open when dropped. The paper should be white and durable. A minimum font size of ten points is preferably used.

Document Organization

In various embodiments, QRH introduction material may be removed and placed in another document, such as the FCTM (Flight Crew Training Manual). The performance tables should be integrated with the checklist where appropriate. The remaining tables will be moved to another manual available to the pilot. Normal checklists format will be consistent to the maximum extent practical with the non-normal formats. Normal checklists will be separate from the QRH and placed on a glare resistant, laminated card.

Organization of Checklists in the QRH

Checklists will be indexed by page number. Each checklist may have a tab that is labeled with the page number. There will be several grouping schemes for organizing the checklists and will appear in the following order: Immediate Action, System, Messages, Lights All checklists with memory steps will be grouped in the immediate action section. Grouping schemes are in the front of the QRH and are tabbed and labeled appropriately. All checklist grouping schemes will list checklists in alphabetical order. Global structure of the checklists is organization by system. Checklists are then sequenced in a task-oriented manner. All checklists will be cross-referenced in the indices. There will be no duplication of checklists. Messages or lights that do not have an associated checklist will be indicated as "crew awareness" in the indices. Immediate action index will include all checklists with recall steps. Index unannunciated checklists in their own section in the index. Normal checklists format may be consistent with the non-normal formats. Normal checklists will be separate from the QRH and placed on a glare resistant, laminated card. There may be some critical checklists on the QRH cover (e.g. passenger evacuation, etc.).

Checklist Characteristics and Criteria

The page number will appear in large bold type in the upper right and lower right corners of the page. Title format is the same as the current version. Checklist titles will be distinct and unambiguous. The checklist title will match the message or light as much as possible. There should be no combined checklists (e.g. engine fire should be separate from engine severe damage or separation). Checklists titles that are not messages or lights will appear in mixed case. Contextual information will be visually grouped under the title and set off from the steps. A graphic of the triggering cue (message or light) will be presented near the title. Additional contextual information may be needed to advise the crew or assist verification with specific content specified. Checklists will indicate the context of their accomplishment (ground vs. in-flight). Checklists should contain data tables or graphics when appropriate. The checklist format will be designed to facilitate the tasks in the specific checklist. Therefore, there may be several checklist formats in the QRH.

Modified normal checklists versus phase of flight preparation statements. Order of checklist steps should be consistent with flight operations, such as to direct the pilot to head the airplane in the direction of an airport before doing the rest of the steps, etc. The condition statement should include information that helps the crew verify the checklist, indicate other possible conditions that might be present or should be considered, etc. Simplify checklists whenever possible. Identify lights, messages, and other cues that should be used to verify the condition. Whenever possible checklists that reference another checklist should attempt to integrate the referenced checklist into the originating checklist (e.g., as shown for the AC Bus checklist (FIG. 5) and the cabin altitude checklist (FIG. 4)).

Checklist Steps

Primary action and first-level steps are preferably numbered. Steps will be worded in simple precise language. When appropriate, a limited set of graphical elements should be included to rapidly convey important information. Present steps with only the information needed to accomplish the step. The brackets will go away. Additional information about a step may be referenced in a footnote. Decision, action, and navigation steps will be easily discriminated from each other. Support is needed when different steps in different checklists conflict. Positive wording will be used when possible and negatives will be identified (in bold) so they are salient. The flow of checklists and checklist steps should follow task sequence. Related steps will be visually grouped, and the use of shading may also be used. Recall steps will be minimized (or at least reduced). Recall steps will be identified with a distinctive format (e.g., red box, connecting lines, preceded by a red dot, or other suitable graphic indicator, etc.). The specific items to consider in the decision steps should be grouped together. Decision steps will be closed, as much as possible. Decision steps will be graphically linked. Action steps will be referenced or placed immediately underneath the decision step. Significant decision terms will be highlighted (and/or) in bold type. Identify single conditions (e.g., APU if available, If wing anti-ice is required, etc.). Identify all conditions in decision steps. Provide context markers in checklists (something that indicates the appropriate context for action).

Exemplary formats for action steps are shown in FIG. 31.

An exemplary format for a delayed action, such as monitoring for a condition or parameter is shown in FIG. 32. The conditions in this step must be met before taking the action. As shown in FIG. 32, the keywords ("After" and "Below 1000") are presented in bold. For additional salience, the whole criteria could also be in bold.

Some checklist actions are activity-based and appear in sentence format, such as enter or manipulate data, reactivate flight plan, brief, communicate, direct, notify flight attendants, etc.

Action statements should be worded, formatted, and/or coded to indicate the style of crew interaction and communication needed (such as using italics to indicate spoken words with confirm added to critical control movements, etc.). Clear initiation criteria should be provided, such as a clear indication of when to start (e.g., when a condition or parameter is to be met). Temporal aspects of steps should be clearly indicated in the wording of the step, such as using words like after, when, phase of flight, etc. Clear termination criteria should be provided, such as providing a clear indication of when to stop, even if checklist is not complete.

Navigation steps should instruct the pilot to go to a particular step in the current procedure, to go to another procedure, or to end the procedure. (Name of checklist complete, Name of checklist complete except for deferred items, Name of checklist complete and go complete another checklist, "End" or an end of checklist symbology is used to indicate no more crew action is required although there may be additional notes to read or other considerations, etc.)

Cautions and Warnings

Cautions are co-located with the associated step. A yellow inverted triangle with an exclamation point is presented before the step and is connected to an explanation, such as shown in the exemplary formats. Caution statements that apply to the whole checklist or a whole condition appear in a yellow box. A similar format for warning will be used.

Supporting Information

Operational consequences will be organized at the end of the checklist. They provide information about functional system consequences (such as inoperative systems) and its affect on system or airplane operation resulting from the non-normal condition. There are also mission-level consequences that the crew must be made aware of for the remainder of the flight. These consequences will also be presented at the end of the checklist but will be separate from the system-level consequences. Considerations is a new category of information that identifies other tasks or activities the crew must perform as a result of the non-normal condition but is not part of conducting the checklist. This information could include information about inoperative equipment that may limit a particular kind of approach, instructions to continue monitoring for icing, etc. This info will appear after the operational consequences section and after the "checklist complete" statement. The considerations section may also be divided into phase of flight: considerations for descent, considerations for landing, etc.

Maneuvers

Non-normal maneuvers will include only those maneuvers that may be referenced. They will not contain instructions for normal maneuvers, only non-normal or infrequent maneuvers, e.g. single engine approaches.

Performance Data

There may be a section for performance tables that are referenced by several different checklists. This section should be kept small and usable. The performance tables will be integrated with the checklist where appropriate. The remaining tables will be moved to another manual available to the pilot. Tables that support multiple checklists may be referenced so we do not duplicate tables across checklists. Performance data should be in a simple and pilot friendly format.

Normal Checklist Philosophy and Design Guidelines

Safety

Checklists are designed to maximize safe operation of the airplane.

Structure

Checklist structure should facilitate efficient interaction between the pilots. Where practical, the format should also indicate the kind of crew interaction (who speaks and when). For training purposes, normal and non-normal checklist structure and formats should be the same where possible.

Interaction Style

Specify the crew interaction styles used for each checklist. For most normal checklists, the preferred method is the scan-flow procedure (i.e., do first, talk after). The verification is conducted by reading the checklist with the "challenge-response" checklist technique. Where practical, identify when crewmembers perform concurrent checks and when they perform sequential checks. No checklists are conducted silently. All checklists are spoken and follow the challenge-response teamwork technique.

Briefings

Checklists should contain items to confirm the accomplishment of crew briefings and provide redundant verification of critical items (e.g., flaps).

Titles

Titles of the normal checklists should directly correlate to the phase of flight in which they are conducted. E.g., the landing checklist should be titled "Before Landing" checklist.

Checklist Initiation

Provide guidelines about when a checklist should be initiated and by whom. Define clear "triggers" for when the checklist is to be initiated.

Sequence

Procedures are organized by phase of flight and written to match typical customer line operations. The sequence of items in a checklist should match the most common sequence of information flow into the flight deck.

Checklist Complete

Provide a "Checklist complete" statement or icon at the end of all checklists read aloud.

Interruptions

Design to be resilient to interruptions and distractions. Provide policy of when it should be started over. Include a guideline on when to avoid doing a checklist, to minimize interruptions.

Typography

Follow industry typography standards.

Checklist Length

Keep checklists associated with airplane transition to a movement phase of flight (i.e. Before Takeoff, Before Landing) as short as possible to: a) reduce crew workload and b) increase resiliency to interruptions.

Verification

Where possible, both the checklist reader and responder are responsible for visually verifying checklist items were properly set.

Multiple Flights

Some operations require checklists be run several times a day or only once a day. The design should be simple so that it is easy to support both kinds of flight operations.

Response

The checklist item response should reflect the flight deck cue or environmental cue the crew will use to identify/verify the action was properly conducted. These could range from the outcome of the action, the desired control position, the desired state of the system or airplane, or a combination of these. Ambiguous words like "As Required" or "Checked" or "Set" should be avoided where possible.

Quick Reference (QRH) Design Guidelines

Human Performance Model

Assumptions about flight crew competencies and conduct must be interpreted within the context of human performance. A key aspect of user-centered design is that to support skilled performance, the resources provided have to be compatible with the crews cognitive and information processing capabilities. In this section we will consider this perspective.

A commercial aircraft is a complex integration of hardware, software, and human components that work together to achieve mission goals of efficient and safe transportation. Crewmembers have defined responsibilities for their role in achieving the mission and perform tasks to achieve them. These tasks involve, among other things, interacting with other aspects of the system (hardware and software). This is accomplished through the user-system interface (USI).

The USI provides resources, such as alarms, displays, controls, and procedures the crew uses to perform their tasks. USI resources are organized into a flight deck layout and their use is affected by environmental conditions, such as lighting, temperature, and noise. These are important considerations in USI design.

Like any supervisory controller, the pilots' primary tasks involve several generic cognitive tasks.

Monitoring and Detection

Monitoring and detection refer to the activities involved in extracting information from the environment. Monitoring is checking the state of the aircraft to determine whether the systems are operating correctly; it can include checking parameters on flight deck displays, observing an unusual situation (like vibration or smoke), or obtaining reports from other crewmembers. Detection is the pilot's recognition that something is about to become non-normal or is non-normal.

Situation Assessment

When pilots observe indications of a non-normal occurrence, they try to construct a coherent, explanation for them. This cognitive activity may be called situation assessment and involves coordination between crew knowledge and experience, the external setting, and context. It is through the coordination of these that the crew develops an accurate understanding of the situation. These understandings may be dynamic and adaptable to new stimuli in the environment. Ideally, the crew has agreement on their individual assessments of the flight situation.

Action Response

Action Response refers to deciding upon a course of action to address a situation and then taking action. In general, response planning involves using a situation model to identify objectives (stabilize the airplane) and the transformations required to achieve them. In the absence of procedures, pilots generate alternative response plans, evaluate them, and select the most appropriate one to the current situation model. In some cases the crew may interact with the world to gain more information about the situation or to refine their understanding of the situation. These interactions may influence future actions.

The primary tasks of pilots also include crew communications and coordination with people and events outside the aircraft, like air traffic control, operator flight management centers, and airport ground operations.

Aircraft procedures and QRHs are an integral part of the flight deck and the crew's performance of primary tasks. Aircraft procedures are designed to support the crew by providing strategies based on detailed, "off-line" analyses of both normal and non-normal states. The procedures help bridge the gap between engineering and operations. The QRH supports several aspects of primary task performance.

The QRH supports monitoring by informing crews of the task relevant aircraft parameters.

The QRH supports situation assessment by (1) indicating the meaning of flight deck indications, (2) guiding the decision making process by providing decision steps that structure aircraft conditions using logical statements supporting the identification of a proper response plan to follow, (3) providing rationale for better understanding of action steps, and (4) providing information on the consequences of actions.

The QRH supports action response by providing pilots with step-by-step action statements to accomplish the objectives of the tasks.

Pilots work in a complex multitasking environment where many things compete for their attention. Since humans have limited attentional and cognitive resources, these resources have to be distributed to the activities they are engaged in. If one task requires a lot of resources, then not much may be available for other tasks.

To successfully perform these primary tasks, crews must perform secondary or "interface management tasks" such as physically manipulating a checklist, trying to determine what aspects of a checklist should be used in the current task, or accessing information in a checklist that is not readily available. In part, these tasks are necessitated by the fact that crews view only a small amount of information at any one time through their flight deck displays and checklist pages.

In many human performance domains, interface management demands have been found to be excessive under some circumstances and the additional workload may interfere with a crew's ability to perform their primary tasks (O'Hara and Brown, 2002). Two effects have been identified, namely resource-limited effect and data-limited effect.

Regarding the resource-limited effect, interface management tasks draw cognitive resources (e.g., attention) away from the primary tasks and performance declines because there are insufficient resources available for them. Primary task performance declines when too much attention is directed to secondary tasks.

With respect to the data-limited effect, primary tasks consume most of the cognitive resources leaving little for interface management performance. Since the primary tasks are dependent on interface management tasks to access the proper information, performance declines due to lack of information. Pilots manage workload by prioritizing their tasks into primary and secondary. Interface management tasks are not prioritized as highly as primary tasks and frequently are not performed. Crews will use several strategies to minimize interface management demands, such as using the currently viewed information rather than trying to retrieve the best information for the task.

Thus, interface management tasks may create barriers between crews and information. During periods of high workload, crews may decide to not access additional information because the retrieval effort may detract from the crew's primary task of handling the aircraft. Also, seeking new information may disrupt ongoing tasks or may interfere with current information being used. In some cases, crews may not access information because they do not know that it exists, such as failing to use a checklist for unannunciated situations.

In summary, while checklists support the general cognitive activities of crewmembers, their use may also add to overall workload and draw resources away from the primary tasks. As noted above, the management strategy adopted by pilots to cope with this added workload can impact performance of the primary tasks. The way a checklist is designed can greatly affect the secondary task workload it imposed. Therefore it is important to design the QRH to minimize secondary task workload.

In additional to effects associated with workload and attention management, checklist design can impact performance in other ways as well. There are certain design features that make the conduct of a checklist susceptible to error. When checklists have these features, they foster such design-induced errors. Some of the common design-induced errors are Misordered Action-Sequence Errors, Loss-of-Activation Errors, Capture Errors, Description Errors, and Action Errors.

Misordered action-sequence errors occur when steps within a sequence are skipped, reversed, and repeated. Competing tasks that create divided attention make pilots susceptible to this problem.

Loss-of-activation errors occur when attention is pulled away from the task to do something else and the pilot does not return to the checklist at all. The attention shift can disrupt memory of task status.

Capture errors occur when the pilot goes to take an action but accidentally completes a similar action. For example, if a pilot goes from an EICAS message to a procedure page, which contains several different procedures with very similar names, he may begin an incorrect checklist.

Description errors occur when the information used to initiate an action is ambiguous and leads to an incorrect action. For example, a pilot wants to begin a decent, but misinterprets a poorly worded instruction, and begins the decent too soon.

Action errors occur when an action is performed incorrectly.

Pilots may be more susceptible to these errors due to lack of familiarity, especially with NNCs (non-normal checklists). Even though QRHs are used by skilled pilots, the degree of pilot experience is variable, and even highly-experienced pilots may not be very experienced in the use of particular non-normal procedures. Checklists should be designed to minimize the occurrence of these common error forms.

With respect to the cognitive challenges of managing workload in complex operational environments, the goal of user-centered design is to provide flight deck interfaces that are easy to use and minimally distract crews from their primary tasks.

User interfaces are most effective when they are almost transparent to users. Transparency enables users to devote their complete attention to the primary tasks. To the extent that users must stop and think about how to use the interface, e.g., to navigate through a QRH to find data needed for checklist execution, attention is directed away from the primary tasks. At best, this can lead to frustration. The user's task has shifted from a primary task to figuring out how to use the interface. At worst, it can lead to error or abandonment of the primary task.

Thus, it is important to design the interface so that it supports the user to efficiently and safely perform their tasks. General principles for QRH design are high-level and their implementation in QRH design can lead to alternative design formats. They address the following aspects of QRH design: Accurately Represent the System, Support Crew Tasks, Meet Expectations, Minimize Secondary Tasks, Distractions, and Workload, Ensure Cognitive and Physical Compatibility, Design for Simplicity, Design for Standardization, Consistency, and Predictability, Design for Positive Guidance, Design for Discrimination, Design for Timeliness, Design for Appropriate Flexibility, Design for Tolerance to Error, and Ensure Health and Safety.

General Design Goals Based on Philosophy of Use

QRH features are designed to: Support skilled and trained flight crews in performing their primary tasks of monitoring and detection, situation assessment, response planning, and response implementation; Support teamwork; Minimize the imposition of secondary task workload; Accommodate varying experience levels of pilots and potentially less familiarity with non-normal conditions (NNCs) and checklists in comparison with normal conditions (NCs); Accommodate the multilingual background of users; Reflect human-centered design principles; and Minimize error and provide design features to detect errors where they occur.

QRH Components

The QRH is characterized in terms of the design components that make up its features and functions. QRH design will now be generally divided into the following six elements: (1) Checklist Indexing, (2) Immediate Actions, (3) Checklists, (4) Technical Data, (5) Document Characteristics, and (6) Navigation and Placekeeping Aids.

The QRH has an organizational structure that is part of the overall document design. Immediate actions may be placed in the first pages of the QRH and some may be even placed on the front covers (e.g., FIG. 1B, etc.) and/or back covers. Checklist indexes follow the immediate actions. The checklists that follow are indexed by page number and may be placed in sections based on airplane system. Supplementary Technical Data that is not included within a checklist is placed in the back or in a reference tab in the QRH. A section for Revision data and dates may also be provided at the back of the QRH.

Each of the above design components is described below for exemplary embodiments of the invention. Other important design considerations involve the context within which the QRH will be used such as operational environment and relationship to other flight deck interfaces.

Operational environment generally refers to the design considerations that address the environmental conditions of use, such as lighting, glare, smoke, air mask, etc. Relevant factors have to be identified and the design should accommodate them.

Relationship of QRH to other flight deck interfaces generally refers to the QRH as being part of the overall aircraft design. These considerations address their relationship. The location of the QRH(s) should support ready retrieval and physical support for use. Tasks that rely on integrating actions and information across different interfaces are supported to the extent that they are consistent, e.g., similar working, labeling, use of coding, etc.

(1) Checklist Indexing

The QRH provides features to guide the pilot in selecting the proper checklist from an external triggering condition, such as a panel light, EICAS message, or pilot identification of an unannunciated condition. These features include tables of contents, light indices, alphabetical listing by system, etc.

(2) Immediate Actions

Immediate action checklists include immediate actions and may include quick reference actions. Some immediate action steps are of such critical nature that they are accomplished by memory. Other quick action steps may be conducted with reference to an immediate action checklist if such an immediate action checklist is included within the QRH. The immediate action memory steps and the quick or immediate reference steps may be presented in the front of the QRH or on a separate quick reference card (QRC). All immediate action steps are duplicated within their corresponding reference checklists.

(3) Checklists

Checklist identification: Checklists are identified through a checklist title and other information, such as triggering information and aircraft condition giving rise to triggers.

Checklist Steps: Checklist steps are instructions that guide pilot actions. There are three different kinds of steps: Decision, Action, and Navigation. Checklist steps differ along dimensions of crew action required, time demands, and teamwork involved in their accomplishment. In some cases these differences will be reflected in the format of the checklist item. In other cases these differences may be transparent to the flight crew and only be distinguishable for exposition of checklists and procedures.

The time demands for recall steps usually require recall steps to be initiated within 5 seconds. Recall steps are accomplished from memory.

Quick Action Reference is an action initiated within 15 seconds. These steps are performed with reference to an immediate action index.

Reference Action is an action initiated when encountered in the checklist.

Delayed Action steps are steps that are performed when some condition is satisfied, e.g., time or parameter value, state, altitude.

Deferred Action steps are steps that are performed at some later time in the flight, such as landing or approach.

Crew Actions—Decision Steps

Decision steps give instructions for evaluating conditions so the appropriate action can be selected from a predefined set. The decisions may involve conditional logic, i.e., where the actions are to be performed only if a specified set of conditions exists. Decision steps present conditional statements that help the pilot determine which checklist steps to use. The outcome of the step(s) is a decision about a course of action. As shown in FIG. 33, there are two kinds of decision steps. One involves an observation about the state of the world and requires the crew to determine the applicable state (such as light is on versus light is off, etc.). The other kind of decision step is open-ended and involves a judgment on the part of the flight crew. Such a decision step may be to determine the course of action to follow (such as to continue the flight versus to land, etc.) or to make a judgment about the management of the situation. Decision steps always involve a choice between competing action paths. Decision steps involving conditional logic are not conducted from memory.

Crew Actions—Navigation Steps

As shown in FIG. 34, navigation steps instruct the pilot to go to a particular step in the current procedure, to go to another procedure, or to end the procedure. The only kind of teamwork required is for the pilot monitoring to announce that the checklist is complete.

Crew Actions—Action Steps

Action steps describe the monitoring, control, briefing, planning, and communication actions to be taken, i.e., instructions to perform physical steps (e.g., depress XYZ, etc.) and mental ones (e.g., "verify", etc.); they may also describe the objectives of those actions. In general the kinds of actions required of the crew include, but may not be limited to the following actions: move a physical control, monitor for condition or parameter, brief or communicate, review supporting information.

Action steps may take the form of instructions, commands, or statements depending on the kind of information, teamwork, and timeliness required to accomplish the action.

With respect to teamwork demands, steps differ in terms of the crew coordination and communication required to accomplish the step.

The Do-Verify (DV) method consists of the checklist being accomplished in a variable sequence without a preliminary challenge. After all of the action items on the checklist have been completed, the checklist is then read while each item is verified. The DV method allows the flight crew to use flow patterns from memory to accomplish a series of actions quickly and efficiently. Each individual crewmember can work independently which helps balance the workload between crewmembers. The DV method has a higher inherent risk of an item on the checklist being missed than does the CDV methods. (Reference: Paragraph 3-2201 of Order 8400.10—Air Transportation Operations Inspector's Handbook Volume 3, Chapter 15, Section 1, 2079). The verification should be accomplished using the challenge-response technique between crewmembers. The carrying out of memory items involves performing the action items from memory and then after the items are completed, verifying completion by checklist. The verification of memory items can be accomplished using the challenge-response technique between crewmembers.

The Challenge-Response (CR) can be used with normal checklists for checking to confirm that an action has already been correctly accomplished. The CR method is often used to verify that critical steps in procedure flows have been taken and the airplane is in proper configuration for the next phase of flight. The verification process in the DV style should be accomplished using the CR technique. For non-normal checklists the CR format is used for control movement action steps. Whenever possible the name of the control device or the label in the flight deck should be listed in the left margin and the action to be taken or the desired state should be listed in the right margin.

The Challenge-Do-Verify (CDV) method consists of a crewmember making a challenge before an action is initiated, taking the action, and then verifying that the action item has been accomplished. The CDV method is most effective when one crewmember issues the challenge and the second crewmember takes the action and responds to the first crewmember verifying that the action was taken. The method requires the checklist be accomplished methodically one item at a time in an unvarying sequence. The primary advantage is the deliberate and systematic manner in which each action item must be accomplished. The CDV method keeps all crewmembers involved, provides for concurrence before an action is taken, and provides positive confirmation that the action was accomplished. The disadvantages are that it is rigid and inflexible and that crewmembers cannot accomplish different tasks at the same time. The CDV method also enforces crew coordination, cross-checking, and verification, all of which aid the crewmember in overcoming the adverse effects of stress. (Reference: Paragraph 3-2201 of FAA 8400.10 document). The CDV method is for NNCs and applies to the specific action to be performed or the position of a switch or control should be moved to.

The read-do-call method consists of one crewmember reading aloud from the checklist and one pilot (depending on the area of responsibility) takes the action and calls that it is complete. This is step-by-step guidance through a checklist and does not rely on the crew's memory. This kind of teamwork is slow, deliberate, and accurate but can be susceptible to error if conduct is interrupted.

The challenge-confirm method consists of one crewmember making a challenge for a critical procedural item and then the second crewmember confirm prior to actuation. The FAA's 8400.10 document offers some guidance for this kind of teamwork. "Procedures which contain such critical procedural actions must clearly identify the critical actions and the crewmember who is responsible for giving the confirmation. The types of procedural actions that require this confirmation include the following: actions resulting in the shutting down of an engine; actions resulting in the deactivation of flight controls; actions that if performed incorrectly (in the wrong sequence or at the wrong time) produce a catastrophic result even if the incorrect action is not highly likely; actions where past experience or analysis has shown that there is a high probability for error or incorrect action and which creates a hazardous situation." (Reference: Paragraph 2179 of FAA 8400.10 document).

Cautions

Cautions alert pilots to important preconditions, consequences of action steps, or consequences of the condition.

Operational Consequences

Checklists include information identifying the consequences of checklist use. This includes "Do not accomplish" statements and information about how other checklists should be modified as a consequence of the current checklist, e.g., modified NCs and operational constraints such as can't fly faster than, can't fly higher than, need longer runway.

Supporting Rationale

Understanding of a checklist step may be supported by information explaining the basis for the step. This may include text, synoptics, and other technical information. Provision of such information helps less experienced pilots to use the checklist in a more informed manner. It may also help minimize willful non-compliance and help prevent operators from making inappropriate changes to the specified actions. This information is commonly referred to as "amplified" information, and this amplified information may appear in brackets in the checklist or simply as text below the checklist step and is expected to be read aloud. A majority of operators have reported that current information is inadequate and needs further "amplification".

Technical Data

Technical data that are integral to checklist use should be presented in the context of the checklist. This data provides information that is used to tailor checklist actions. Such information can be in the form of tables, graphs, and diagrams. This data should appear in a simplified, easy-to-use presentation. Additional technical data may appear on the normal checklist or in a separate data section at the back of the QRH or in the Operations Manual. The amount of technical data placed in the QRH should be minimal.

Navigation and Placekeeping Aids

These are the design features of the QRH that provide landmarks to indicate where the pilot is in the checklist (such as page numbers, step numbers, and headings, etc.) and features that facilitate the location of other information within and between checklists (such as tabs, arrows, etc.). Checklists may also include aids for placekeeping (marking where a pilot is so they can more easily return).

Organization of Checklists within the QRH

Organization refers to the physical arrangement of the checklists within the document. Most checklists today are arranged alphabetically within system.

Document Characteristics

These features relate to characteristics of the physical document, such as size, shape, page color, page texture, binding, etc.

Guidelines and Candidates for QRH Components

Exemplary guidelines or rules for the design of QRH components are identified in this section. In some cases, candidate concepts are presented that represent alternative ways of implementing the guidelines. The candidate concepts are sometimes presented following individual guidelines and sometimes at the end of the section. In the case of the latter, several guidelines may be reflected in the design.

These alternatives can be compared in the QRH Test and Evaluation program to select the features that best meet the usability objectives. Some guidelines are followed with "Rationale" statements or "Notes." Rationale statements provide some justification or explanation of the guideline. Notes provide some considerations that could not be addressed at this time.

Checklist Selection

The QRH provides features to guide the pilot in selecting the proper checklist from an external triggering condition, such as a panel light, EICAS message, or pilot identification of an unannunciated condition. These features include tables of contents, light indices, categorization by system, etc.

Panel lights, EICAS message, and other triggers should have maximum (or at least heightened) discriminability to minimize (or at least reduce) the chance of going to the wrong checklist. One rationale for this is that since many messages in the flight deck have similar wording, pilots may access the wrong checklist. Enhancing the pilot's ability to discriminate between them will help minimize this error.

Unique numbers or letters can be assigned to flight deck information sources (e.g., in the lookup table or index) that are linked to checklists that are included in checklist identification information. For example, as indicated in FIG. 35, the two procedures in FIG. 35 are both on page 73 the addition of a letter indicates which checklist appears first.

EICAS messages that do not have checklists should be coded in differently than those leading to checklists. A rationale for this is that pilots should immediately know which messages are associated with checklists and which are not. Providing this information will reduce needless access of the QRH when no checklist exists.

"Pilot awareness" checklists (carets) should be eliminated. A rationale for this is that carets require navigation, and pilots don't obtain any information once they access the appropriate checklist. If there is information useful to the pilot, then that information should be included in a checklist.

When separate EICAS messages send the pilot to the same checklist, a decision step should be provided to facilitate the determination of where in the checklist users should go for each particular message. In various embodiments, criteria are developed for when two checklists can be combined and when they should be kept separate. One criterion is the checklists can be combined when the condition leads to the same actions (the steps are the same). Another is that they can be combined when most of the steps are the same and the difference is easily represented by a decision step. Conversely, checklists should not be combined when complex decision steps are needed to guide pilots to the appropriate actions. They should also not be combined if a mistake can be dangerous. That is, if the pilot makes a mistake and performs the wrong step and that action significantly compromises flight safety.

The transition from triggering message to checklist should be as direct as possible with no additional cognitive analysis or interpretation required. A rationale for this is that pilots should not have to classify messages into systems and then look up the checklist in an alphabetical list by system. In some embodiments, checklist reference information is put directly in the trigger message so no lookup table is necessary. In the example below, the information in parenthesis is the unique QRH page reference to the appropriate procedure built directly into the EICAS message. When the message is read, the pilot can proceed directly to the checklist, thus bypassing the index.

C HYD 1 OVHT (73A)

This kind of change may be impractical for current airplanes without an ECL (Electronic Checklist). A retrofit electronic checklist application may later be developed and implemented for the current fleet.

When the actions required by different checklists or checklist steps conflict (e.g., set flaps at 20 degrees vs. 15 degrees, etc.), the checklist or other procedures should provide information to help pilots resolve the conflict.

When multiple triggers occur in close temporal proximity, pilots should be given information to help them choose the order in which checklists should be performed. A measure of support for this can be provided by using a prioritization coding scheme, similar to that used for EICAS messages. Pilots would be trained to complete higher priority checklists first. Color or some other scheme could be used to code checklist priority.

Checklists containing memory steps should be coded in the checklist selection tables and indices. A rationale for this is that coding this information will help alert the pilot to the existence of such steps if they somehow didn't realize these urgent steps had to be performed.

Immediate Actions

Immediate action memory steps should be minimized to only those actions that must be initiated within five seconds. Decision steps should not be memory steps. A rational for this is that these are the steps that must be accomplished to prevent crew incapacitation, airplane damage, or loss of control. Since these steps must be recalled from long-term memory and are performed without reference to a checklist, memory steps should only be required when a step must be accomplished before there is insufficient time to retrieve the QRH and access the checklist. Because relying on memory can be error prone, the number of such steps should be minimized. Also due to memory limitations, memory steps should not require reasoning about aircraft conditions, e.g., decision steps requiring conditional logical reasoning, etc.

If practical, immediate action steps should be presented in a convenient location that can be read within a few seconds. This is because immediate action steps must be almost immediately available once the crewmember has retrieved the QRH.

Any immediate action steps presented prior to referencing the full checklist should be repeated in the full checklist in a manner that visually sets them apart from non-memory steps.

Clearly distinguishing memory steps from the rest of the checklist will facilitate pilots in starting at the right place in the checklist and not have to search for the proper step.

Checklists

Checklists are identified through a checklist title and other information, such as triggering information and aircraft condition giving rise to the triggers. Exemplary prototype concepts are provided following the guidelines.

Each procedure should have a distinctive title. To the greatest extent possible, the differences between titles should be maximized to minimize the chances of selecting the wrong checklist.

Page numbers should be prominently and saliently displayed near the checklist title. Any checklist with more than one page should begin on an even number. A rationale for this is that page numbers are used to transition from the checklist triggering condition to the checklist. Thus, the number should be highly salient for rapid and reliable viewing.

Contextual information needed to help ensure that the proper checklist is being used should be located near the title. At a minimum, that information should contain the specific triggering indicators and a statement of the underlying condition.

Checklist priority should be indicated as part of the contextual information. This is because checklist priority can aid in the determination of which checklist to use when more than one could be used. In addition, crews sometimes associate checklist length with priority. Providing priority information will eliminate that potential confusion.

Contextual information should be visually grouped and set off from the procedure steps. This will help pilots clearly distinguish contextual information from the procedure steps so that in case of time urgency the pilots can rapidly begin the checklist steps.

Figure 36:
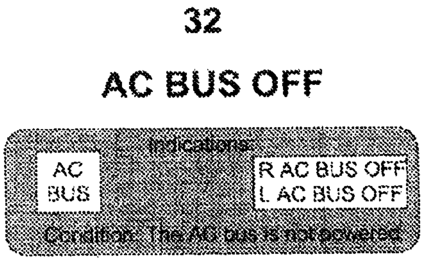

The prototype in FIG. 36 provides salient page number and checklist title. The procedure contextual information is presented in a "context block" that is collocated with the title/page number and is visually grouped and set off by a demarcation line and non-salient background shading from the checklist steps.

Figure 37:
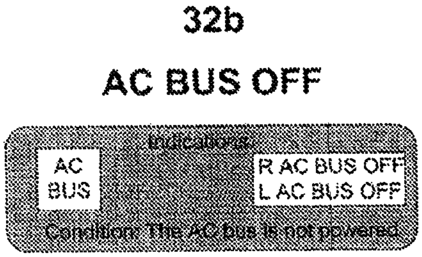

This prototype in FIG. 37 is the same as the one in FIG. 36, however the page number is augmented with a letter designation.

Another prototype is the same as the one in FIG. 37, however, checklist priority is indicated in the context block (and can be provided with color elements).

Checklist Steps

Checklist steps are instructions that guide pilot actions. There are several different kinds of steps: Decision, action, and navigation. Prototype examples are presented for individual selected guidelines and at the end of the session to illustrate combinations of guidelines. Font sizing and adjusting font size can permit more information to be put on a page. Also proper font selection can facilitate readability and minimize errors.

The section is organized into the following subsections: General guidelines, immediate action steps, decision steps, reference action steps, and navigation steps.

General Guidance Regarding Checklist Steps

Each primary action step should be numbered. Steps should be worded in simple, precise language. Steps will be easier to follow if the amount of text is minimized. Vague language, like "as required," should be made precise whenever possible. Responses to challenges should be full, specific and unequivocal, avoiding where possible the terms "as required" or "set". Phases should be concise but understandable and unambiguous. Excessive brevity can result in checklists taking longer to read and understand.

Where possible, a limited set of graphic elements should be included to rapidly convey important information. Well chosen graphics are rapidly interpreted and will be less prone to error for non-native English speakers.

Present steps with only the information required to accomplish or understand the step. Checklist steps are the most important aspect of the QRH. Their presentation should be as clean and uncluttered as possible. Mixing other supporting information into the steps can create distractions that can more easily result in skipping or missing a step. Methods to ensure that pilots are aware of supporting information and are guided to it are addressed in other sections of this document.

Decision steps, action steps (including memory steps), and navigation steps should be easily discriminated from each other. Since the behaviors for the three types of steps are different, clearly distinguishing the types of steps can help ensure the proper behavior is accomplished.

Where checklist calls refer to a particular switch, light, lever or instrument, the entry must be the same as that used to identify it on the aircraft panel. These kinds of action steps should probably be put in the challenge-response format.

Decision Steps

The specific items to consider in the decision step should be grouped together. Decision steps give instructions for evaluating conditions so the appropriate action can be selected from a predefined set. Decision steps present conditional statements that help the pilot determine which checklist steps to use. Presenting all options together will facilitate evaluating the conditions.

An example of such grouping is presented in FIG. 38. Additional concepts are also presented herein.

Whenever possible, decision steps should be completely closed. Decision steps should be a closed system, so pilot has every possibility or combination of conditions is identified (all possible outcomes are addressed), e.g., in dual engine failure, provide guidance if the engines relight or not. Each should have a result, even if no further action is required.

Open-loop decision steps should be supported with additional information. In the case where the crew must make a judgment about which course of action to follow, operational consequences of each path should be presented to facilitate crew decision making.

Exploit crew perceptual processes. Whenever possible, the controls and indications that appear in the flight deck should be replicated in the checklist. See flaps example below.

Where possible, declarative statements of conditions should be presented rather than using conditional operators. "If . . . , then . . . " statements are difficult for native English speakers to reason about. They can be very error prone for non-native English speakers.

Significant decision terms should be highlighted. Keep the use of these terms to a minimum whenever possible, including the use of such terms as "and" and "or."

The outcome of the decision step(s) should be either navigation to the proper part of the checklist or to another checklist or to an agreed upon course of action.

Action Steps

Action statements should be worded, formatted, or coded to indicate the style of crew interaction and communication needed. Teamwork differences should be presented using alternative syntactical forms for the different teamwork styles required. However, the division of labor (e.g., pilot flying/pilot monitoring) may not be coded since the allocation of crew responsibility is based on the practices of the operator.

Clear initiation criteria should be provided (clear indication of when to start). Clear termination criteria should be provided (clear indication of when to stop, even if checklist is not complete). Temporal aspects of steps should be clearly indicated in the wording of the step, which user does now, which later, which continuous, and which deferred.

Steps can reflect the need to take action such as "immediate action memory" steps (e.g., less than five seconds)—these are the memory steps; "immediate action reference" steps (e.g., less than fifteen seconds); "reference" steps—steps that are performed when encountered in the procedure; "delayed" steps that are performed when some condition is satisfied (e.g., time or parameter value, etc.); "deferred" steps are deferred and performed when a predefined state/condition exists.

Important actions, like setting flaps, should be highlighted. All keywords need to be salient. Related steps should be visually grouped.

Navigation Steps

Navigation steps should instruct the pilot to go to a particular step in the current procedure, to go to another procedure, or to end the procedure. In the first example prototype in FIG. 39, a decision step is differenced from action steps by shading and its inclusion within a rectangular box, which may be colored or gray-shaded. All the decision statements are pulled together, and arranged in increasing order of magnitude from left to right. Navigation steps are provided to link the decision to the appropriate group of steps. As indicated in FIG. 39, the steps are visually grouped by leaving spaces between the groups. The conditional considerations in Step 3 ("When" "and") are highlighted for enhanced attention grabbing value.

All primary action steps are numbered, and the navigation steps provide guidance that should help to positively guide pilots at every step.

Figure 40:
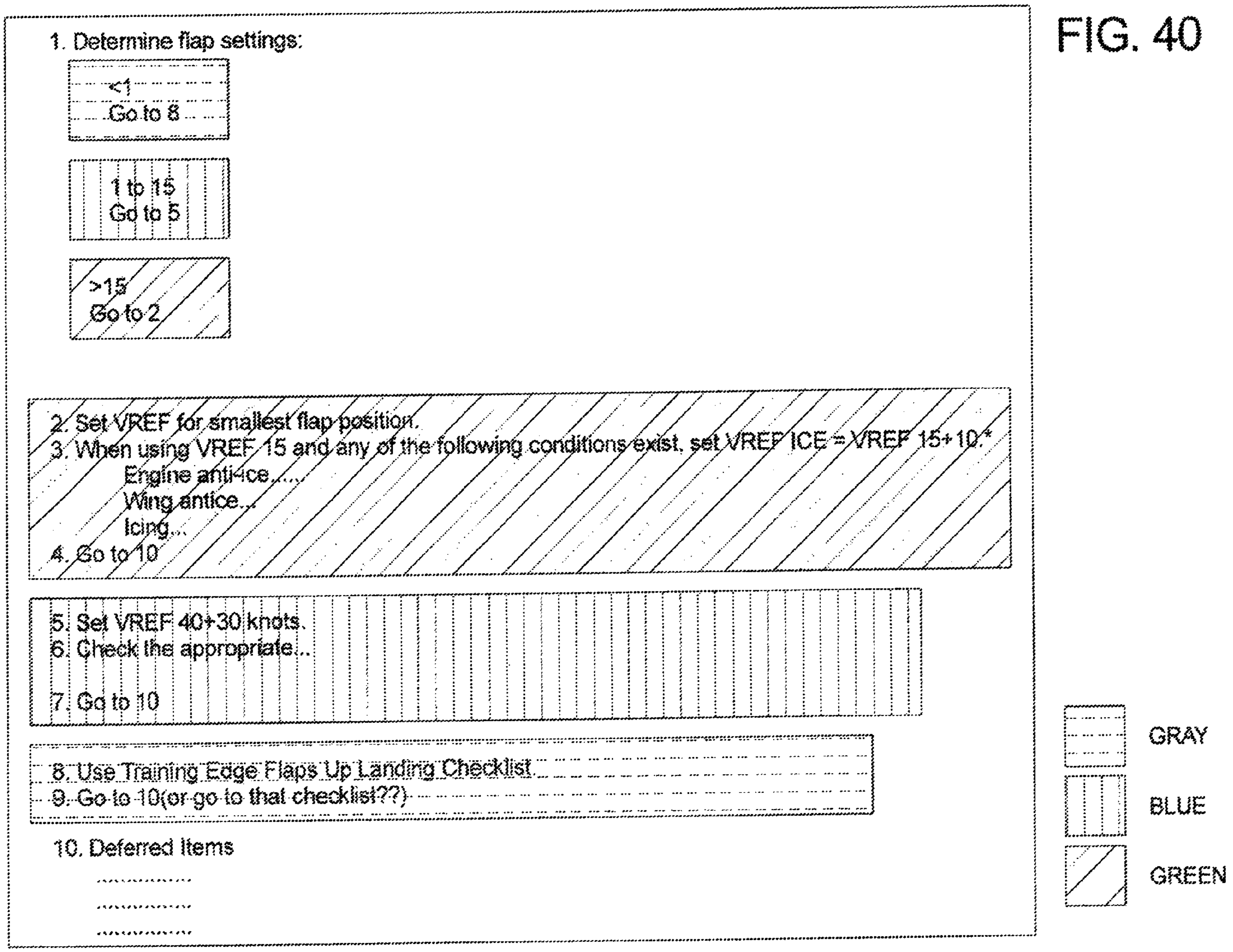

In the second example prototype in FIG. 40, the decision step is distinguished by bold font and color or gray-shading (e.g., blue shaded rectangle, green shaded rectangle, gray-shaded rectangle, etc.), and is used to enhance navigation by creating visual momentum between the decisions and their applicable action steps. Shading differences (e.g., color and/or gray shading, etc.) can also be used to help establish the links and/or color for something else such as priority. In the example in FIG. 40, the first and sixth rectangles (from the top) may be gray-shaded, the second and fifth rectangles may be colored blue, and the third and fourth rectangles may be colored green. If color is used for this purpose, pale rather than saturated colors should be used since they have low salience. However, with the background coloring, the eye can rapidly see the connection. The advantage of this approach is that it creates a relatively unobtrusive link between the decision and the appropriate action steps that is compelling and should minimize the possibility of going to the wrong steps.

Figure 41:
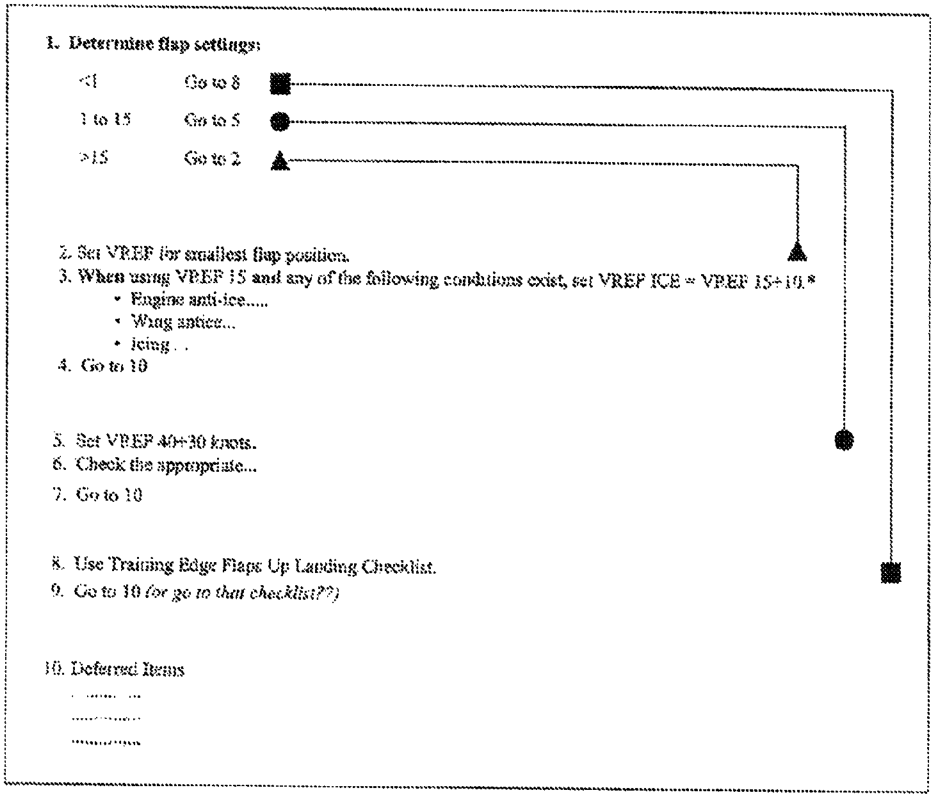
Figure 42:
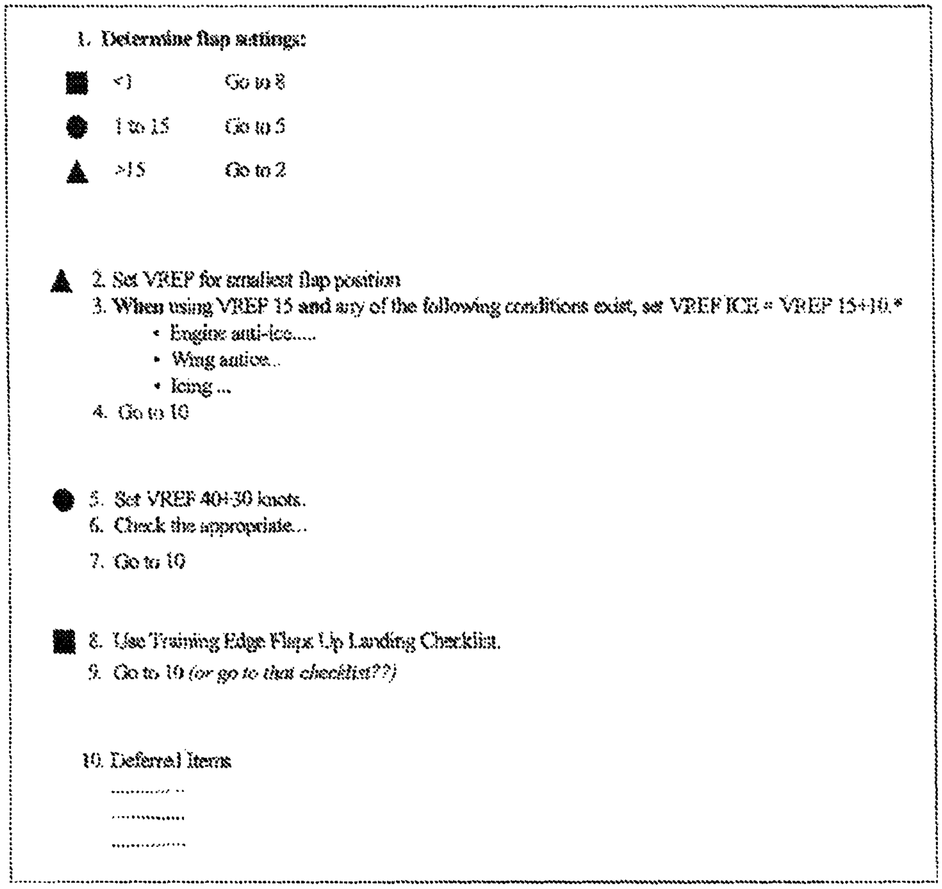

QRHs may also use arrows and lines to accomplish essentially the same thing. The example prototype in FIG. 41 is a variation of this approach. An alternative to the use of lines, using only symbols is presented in FIG. 42.

Cautions

Cautions alert pilots to important preconditions or consequences of action steps. Cautions should be highly salient. Since high salience is needed for cautions, color or distinctive symbology should be used rather than just font coding or other less salient feature. The discussion in the prototype section addresses the choice between them.

Cautions should be collocated with the appropriate step. This will help ensure that the content of the caution will be read when needed.

Where appropriate, information should be provided as to whether the caution applies prior or after the relevant step. This will help ensure that pilots know when to read the caution with respect to the step action.

Several exemplary different approaches to coding of cautions including using color (e.g., yellow, etc.) or a symbol (e.g., international alert symbol, etc) are presented in FIGS. 43-47. In the first prototype (FIG. 43), yellow is used to signal a caution. A yellow dot is placed after the step to indicate that the caution is applicable after the step has been taken. In the second two prototypes (FIGS. 44 and 45), a symbol is used to indicate the existence of a caution. Examples are shown for applicability of the caution before and after the step respectively. In selecting between color and symbology, one consideration is whether color will be used to indicate priority. If color is used for priority (FIGS. 46 and 47), e.g., red to indicate high-priority and yellow to indicate medium priority, then yellow should not be used for cautions. In such cases, symbols are preferred.

Technical Data

Checklists include technical data that are integral to checklist use. This data provides information that is used to tailor checklist actions. Such information can be in the form of tables, graphs, and diagrams.

Information should be organized by task and checklist step. The information should be only as precise as needed by the task (over precision can add to complexity, time to use, and chances of error). Table and graph formatting should be designed to support visual search and readability. Technical data should be located near the appropriate action step but not in such as way as to divide the sequence of steps. Locating data near the steps reduces the need for pilots to have to navigate to it. This data is not located on the same page as the checklist steps so as to not separate sequential steps by too much information. To maintain awareness of where the checklist is going, it is important to keep steps relatively close together.

Figure 48:
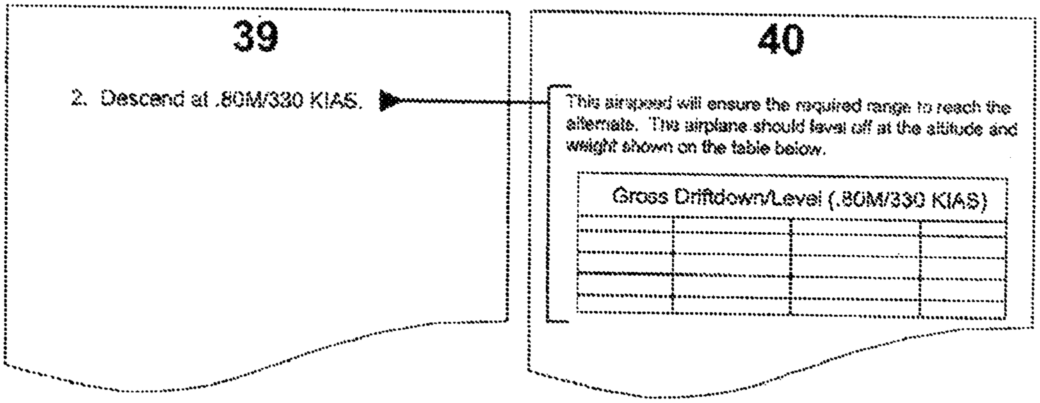

Visual aids should be used to assist pilots in locating supporting technical data. The prototype in FIG. 48 illustrates the guidance. Technical information is collocated with the guideline, but on the facing page. Visual aids draw the pilot's attention to the needed information. In this case the triangle at the end of the procedure step provides a cue to the existence of the supporting information and technical data.

Figure 49:
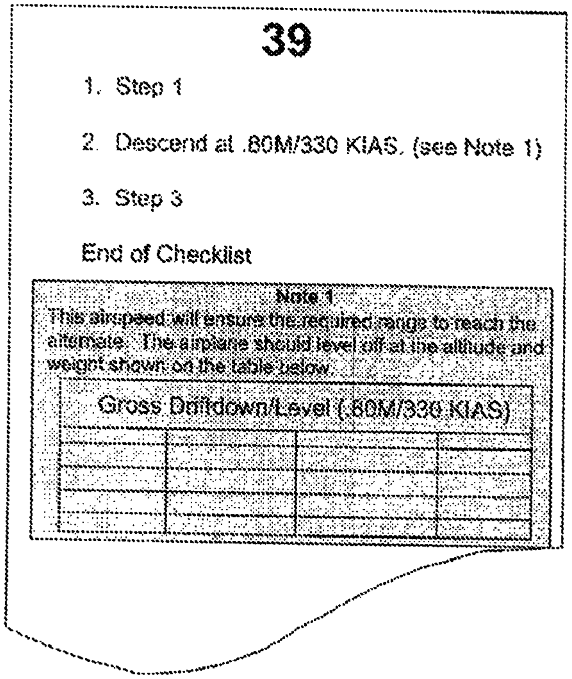

The alternative prototype in FIG. 49 uses a note to direct the pilot to the appropriate information.

Information on Supporting Rationale

Understanding of a checklist step may be supported by information explaining the basis for the step. This may include text, synoptics, and other technical information. Provision of such information helps less experienced pilots to use the checklist in a more informed manner. It may also help minimize willful non-compliance and help prevent operators from making inappropriate changes to the specified actions.

Statements of the high-level objective to be achieved by a checklist should be presented. This information supports the pilot's evaluation of the success of the checklist.

Supporting information should be located near the appropriate action step but not in such as way as to divide the sequence of steps. The supporting information (such as "amplified" information) should be provided in a way so that it does not interfere with checklist use. Very experienced pilots should be able to quickly and efficiently complete the checklist with minimal distractions, yet sufficient information should be available for less experienced pilots to better understand the basis and meaning of checklist steps.

An indication should be provided for those steps for which supporting information is available. Since supporting information may not be available for every step, pilots should be provided with a visual indication, such as a symbol, to indicate when it is available. See prototype examples above. Similar techniques should be used to present this information. Checklist steps should be kept clean and minimal as possible, thus this info can be placed somewhere else.

Operational Consequences

Checklists include information identifying the consequences of checklist use. This includes "Do not accomplish" statements and information about how other checklist should be modified as a consequence of the current checklist, e.g., modified NCs and operational constraints such as can't fly faster than, can't fly higher than, need longer runway.

This type of information should be provided for all checklists where appropriate. Where checklists are used prior to takeoff, "go/no-go" criteria may also be provided. Consequence information should be presented following the checklist steps, but before the "Checklist Complete" information.

Navigation and Placekeeping Aids

These are the design features of the QRH that provide landmarks to indicate where the pilot is in the checklist (such as page numbers, step numbers, and headings, etc.) and features that facilitate the location of other information within and between checklists (such as tabs, arrows, etc.). Checklists may also include aids for placekeeping (such as marking where a pilot is so they can more easily return, etc.). Prototypes of many of these features were presented earlier.

If possible, page numbers should be visible when the pilot is in the front of the QRH. Pilots navigate from the index to the proper checklist using page numbers.

Tabs with page numbers can also be put on the top of each page or possibly every five pages or so. Page numbers should be salient and always visible on each QRH page.

Support should be provided for marking the location of a needed checklist or other information. If a pilot leaves the checklist to do something else and wants to return to a particular location, marking will facilitate the transition. This can be accomplished in several ways. First, one or more "ribbon-type" bookmarks could be attached to the QRH binding. Pilots could use them as needed, to mark the location of a checklist or other supporting information. Another approach is to provide foldout tabs that can be opened. When open, the tabs are visible.

Support should be provided for identifying currently active steps. Visual aids and guidance should be provided when a checklist step directs the pilot's attention to another part of the checklist or supporting information.

Checklists that continue from one page to the next should provide markings on both top and bottom of the continuation.

Organization of Checklists within the QRH

Organization refers to the physical arrangement of the checklists within the document. Currently many operators arrange them alphabetically within the system.

Checklists should be organized to minimize the need for navigation through the QRH. The current organization can lead to errors of selecting a checklist with similar title. It also requires a lot of navigation when performing tasks. A task-based organization may be preferable so that checklists typically used together of which commonly follow each other can be located together.

Combining lots of things into one checklist should be avoided. Combining many situations into one checklist makes the checklist long and requires conditional statements. It is better to have more short checklists without conditionals.

Where possible, checklists should address less than worse-case scenarios. NC checklists and NNC checklists should be separated into two documents. Creating two documents will make each documents smaller, easier to navigate, and easier to manipulate.

Document Characteristics

These features relate to characteristics of the physical document, such as size, shape, page color, page texture, binding, etc. Pages should be white. White pages will maximize the contrast between QRH elements and document background.

Pages should be durable. QRH binding should permit change pages to be easily included. Binding should be sturdy enough so that pages do not come apart when the QRH is dropped.

According to a preferred embodiment and generally referring to FIG. 1A, a quick reference handbook 10 prepared using the style guide and formatting methods for pilot quick reference handbooks of the present invention is shown. Quick reference handbook 10 includes a cover 12 providing outer protection for the individual pages of the handbook and a ring binder 14 allowing quick access to individual pages of the quick reference handbook 10. Quick reference handbook 10 includes a handbook height "A" and a handbook width "B".

The QRH can also provide immediate access to checklists that contain action steps that must be performed without delay. So they are easy to locate and use, immediate action or quick action checklists can be placed in the front of the QRH, in the front of their corresponding system sections, and/or they can be placed on the QRH covers. For example, FIG. 1B illustrates a cover for a QRH having a quick action index. Placing immediate action or quick action checklists in the most (or in an at least highly) accessible location of the QRH can help reduce the need for excessive memory items. Time critical checklists are easier to locate if they are located in the front of the book or in the front of their associated system section where they are readily accessible. Immediate action or quick action steps are included in the body of the full checklist before any subsequent checklist items. This provides continuity from immediate action checklist steps to the additional checklist steps.

Figure 2:
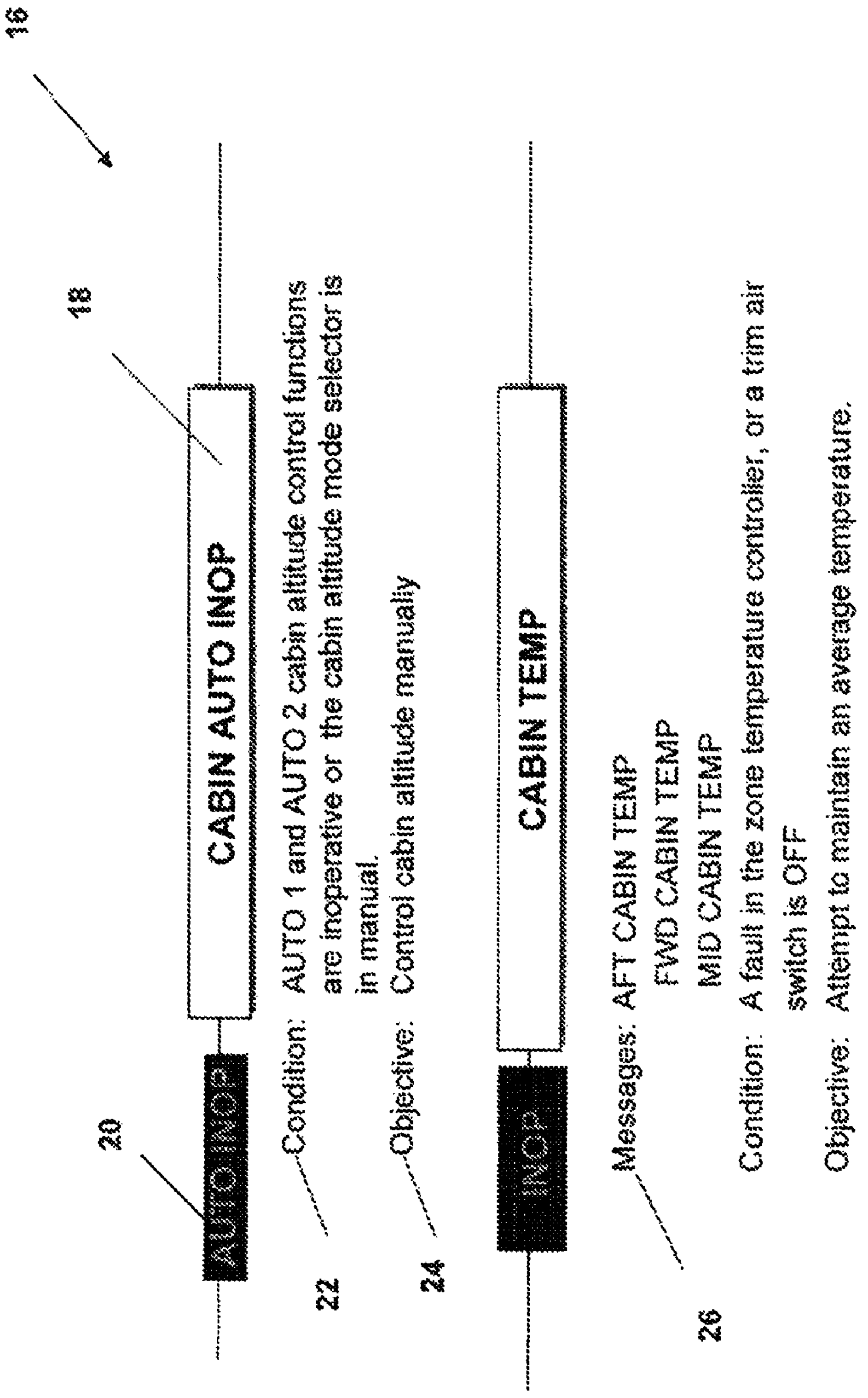
FIG. 2 is a flow chart of the general format for pages of a quick reference handbook according to one embodiment of the present invention.

As best seen in reference to FIG. 2, an exemplary check list format 16 for individual pages of quick reference handbook 10 is provided. Individual pages of the quick reference handbook 10 will generally include one or more item identification boxes 18 which provide a condition of interest to the flight crew. An indicator 20 adjacent to each item identification box 18 simulates an alert or operating condition signal received by the flight crew that helps direct the flight crew to the individual item in the quick reference handbook. Under each item identification box 18 is generally provided a condition statement 22 intended to generally provide a condition of the problem or situation and an objective statement 24 identifying the objective to be achieved. One or more message sections 26 can also be provided. Message sections 26 further identify specific conditions which further differentiate the item identified in the item identification box 18.

Figure 3:
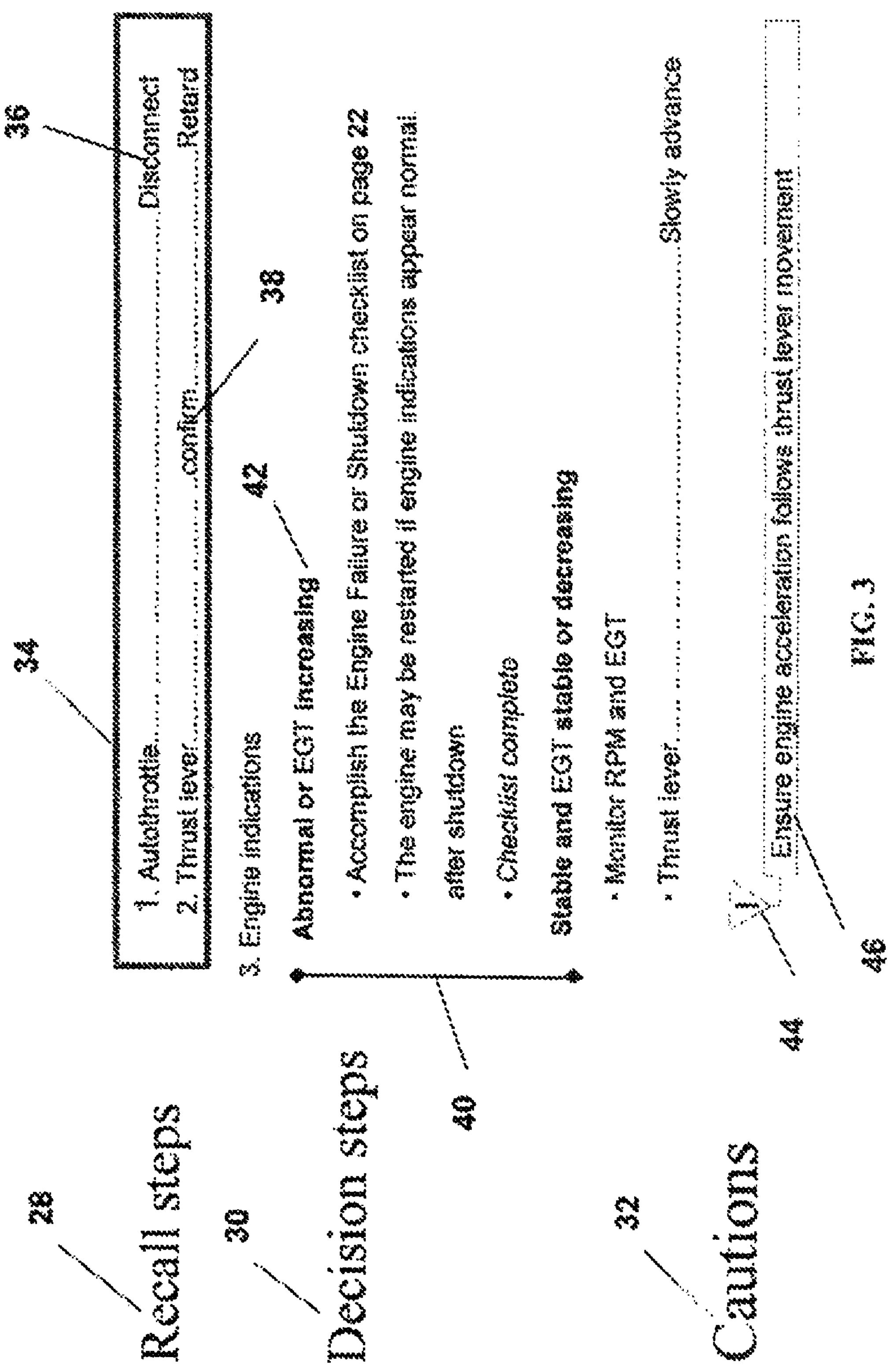
FIG. 3 is a flow chart of exemplary checklist steps used for producing quick reference handbook pages according to one embodiment of the present invention.

Referring generally to FIG. 3, the format for individual pages of the quick reference handbook 10 also distinguishes between each of a recall step 28, a decision step 30, and a caution 32. Recall steps 28 are generally identified within a red colored rectangular box 34. An action step 36 and a confirmed step 38 are also shown as exemplary information provided within recall step box 34. Decision steps 30 are further broken down using a decision step group indicator 40 which visually indicates the total number of individual decision steps. An individual decision step 42 is shown. When a caution 32 is provided, a caution symbol 44 is presented which is visually linked to a caution message 46.

Referring generally to FIG. 4, each page of the quick reference handbook 10 is provided with a page number 48 provided at both top and bottom corners of the page. An exemplary selector position 50 is identified which is visually offset by a plurality of marks similar to periods. Any one of the quick reference handbook pages can also include one or more data tables. Data tables 52 are provided when multiple conditions may be present or when a selection between multiple criteria is required. Each individual checklist is defined within the boundaries of a checklist format 16 and a checklist complete message. In the example shown, a checklist partially complete message 54 is provided to differentiate the portions of the checklist that are completed except for those items which are deferred. When deferred items are identified, they are distinguished by a deferred items symbol 56. When each of the items of the checklist including the deferred items is completed a checklist complete message 58 is provided to identify the end of the particular checklist. A new checklist which may start on the same page is differentiated by a new checklist identifier 60. If the new checklist is completed on the same page a checklist complete message 62 is also provided.

As best seen in reference to FIG. 5, individual checklists may also be provided with variable operations messages 64. Variable operation messages 64 identify an initial and a final condition. Individual checklists can also include reference to illuminated indicators on a panel. In the example shown, a panel light designation 66 further identifies the various conditions for one or more indicators. Individual checklists of the present invention can also include tables identifying consequences to various system conditions. In the example shown in FIG. 5, a first and a second system consequences table 68, 70 are provided. These tables identify for example an inoperative system and the individual consequence of that individual inoperative system for each of a right and a left electrical bus.

Referring next to FIG. 6, another feature of the quick reference handbook 10 of the present invention is that individual checklists include one or more references to alternate pages of the handbook 72. Where alternate pages are identified, the page number is provided in bold lettering to visually distinguish the page the operator is directed to.

Referring now to FIG. 7A, where the total information required for an individual checklist is not capable of being provided on a single page, continuation pages are provided. A page continuation symbol 74 identifies in a standard format and color that the page is a continuation of or requires the continuation of a handbook page. Individual checklists of the present invention also can be provided with one or more consideration notes 76. Consideration notes 76 provide general information to the flight crew, to assist in the decision making process.

As best seen in FIG. 7B, individual checklists of the present invention can also identify multiple conditions in a multiple condition format 78. The multiple conditions identify a specific condition in bold letters and direct the operator to the specific checklist required for that particular condition.

Referring next to FIG. 8, individual criteria for specific conditions can be identified as bold messages 80. By the use of bold lettering, the operator's attention is drawn to a specific situation or condition which is or must be present before proceeding to the next step.

As best seen in FIG. 9, individual decision steps which identify abnormal conditions including a first and second abnormal condition option 84, 86 employ the use of bold and non-bold lettering to visually identify differentiating criteria between each of the options.

Figure 13:
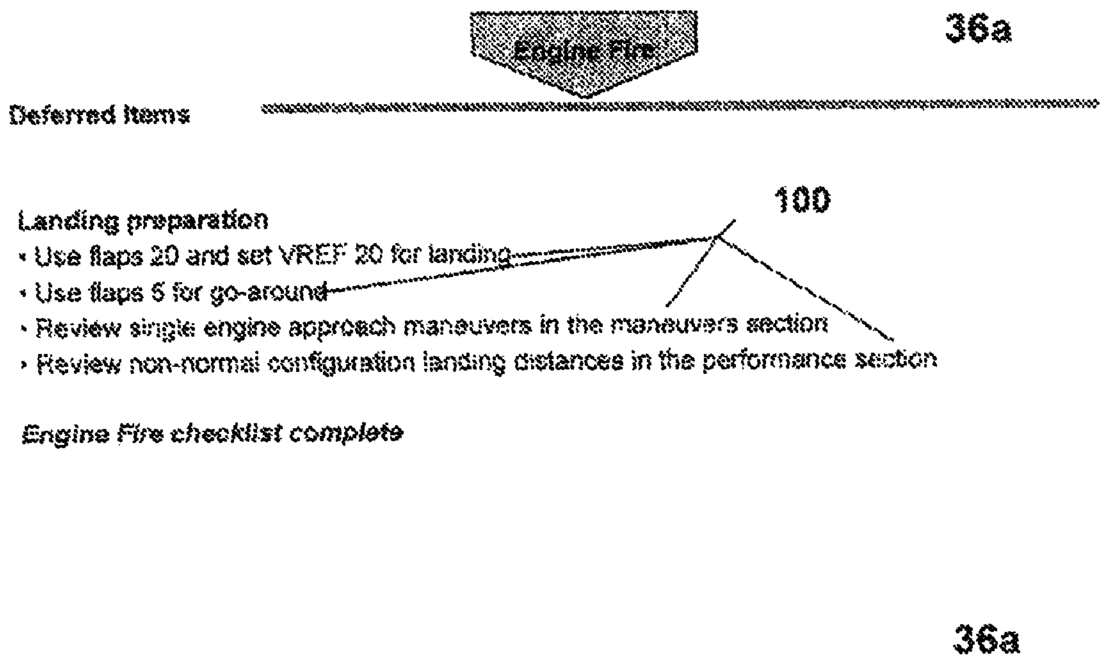
FIG. 13 is a plan view of another exemplary page of a quick reference handbook according to one embodiment of the present invention.
Figure 16:
FIG. 16 is a plan view of another exemplary page of a quick reference handbook according to one embodiment of the present invention.

Referring generally to FIGS. 10 through 14, checklists of the present invention also provide do not accomplish messages 88 (FIG. 10) which are intended to simplify the use of quick reference handbook 10 by quickly identifying within the individual checklist other steps or checklists which are not required to be performed. Also shown in FIG. 10, a system condition indicator 90 and a consequences indicator 92 are provided at the top sections of individual tables to quickly identify the row or column information categories. Individual notes such as note message 94 (FIG. 11) are also provided to identify general information to the flight crew. Where confirmation of an individual step is recommended by checklists of the present invention, a confirm instruction 96 (FIG. 12) is clearly differentiated between the designated item and its desired condition 98. As best seen in FIG. 13, deferred items under a deferred item heading which do not require a specific order of operation, are identified as non-timing specific items 100 separately identified by bullets. These items can be performed in any sequence. As previously noted, and specifically referring to FIG. 14, an individual caution message 102 is provided within a rectangular window to visually set off the caution message from other adjacent information in the checklist.

Referring next to FIG. 15, where multiple tables of information are provided such as first, second, third and fourth flight condition data tables 104, 108, 112, and 116 a heading is generally provided immediately adjacent thereto to specifically identify the condition or information provided in the individual tables. In the example shown in FIG. 15, the individual tables 104, 108, 112 and 116 are differentiated by each of a first flight condition 106, second flight condition 110, third flight condition 114, and fourth flight condition 118 indicator. For example, first flight condition 106 identifies the condition as a climb phase wherein the flaps are positioned in an up condition and maximum climbing thrust is provided. First flight condition 106 therefore provides general information applying to all of the data in first flight condition data table 104.

Referring generally to FIGS. 16 through 20, additional exemplary checklists are provided for a plurality of checklist items.

Figure 21:
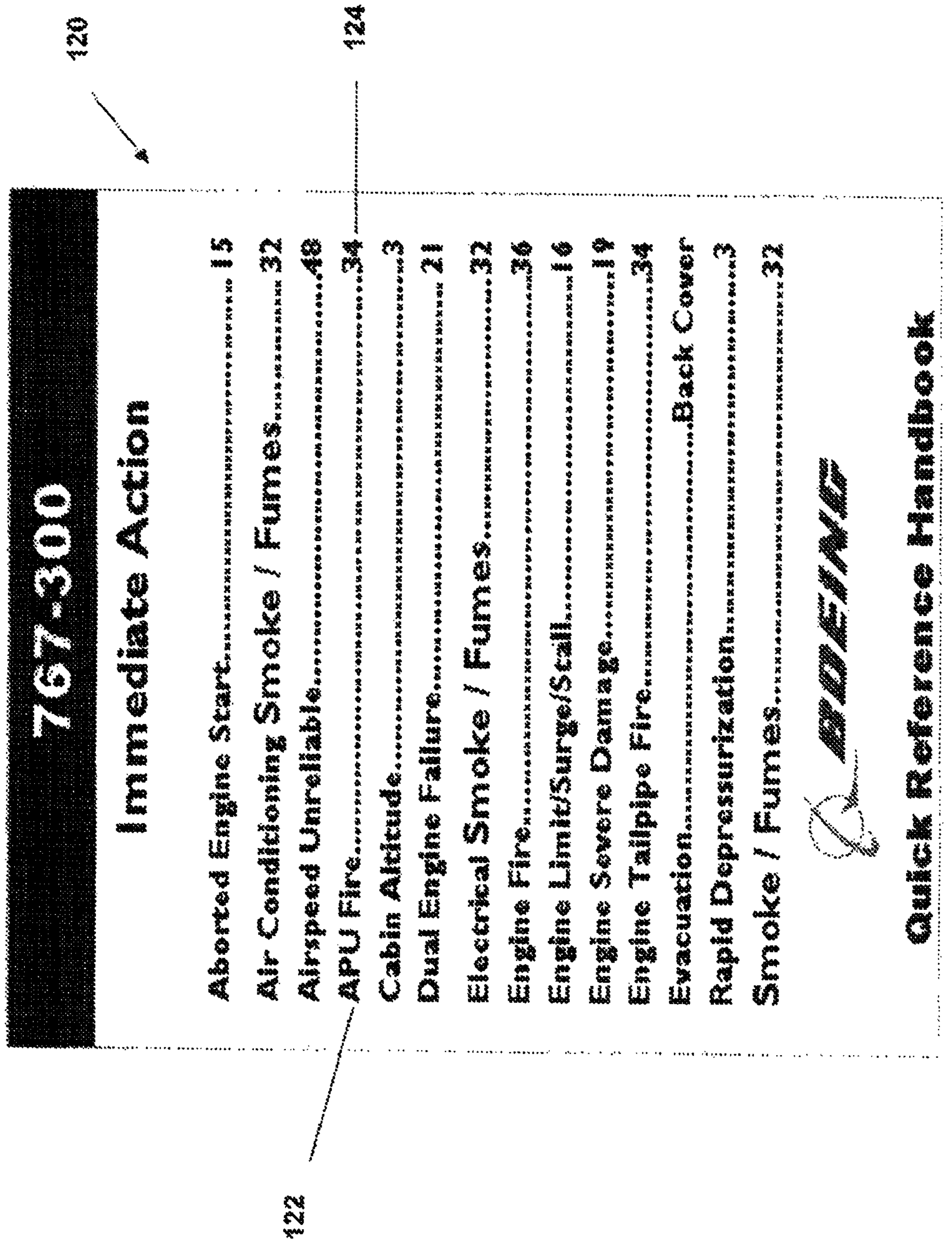
FIG. 21 is a plan view of another exemplary page of a quick reference handbook according to one embodiment of the present invention.

As best seen in reference to FIG. 21, items within quick reference handbook 10 that require immediate action are identified on one or more immediate action pages 120 of quick reference handbook 10. Each immediate action page 120 provides data as alphabetically listed actions 122 each specifically identifying a QRH page number 124.

Figure 22:
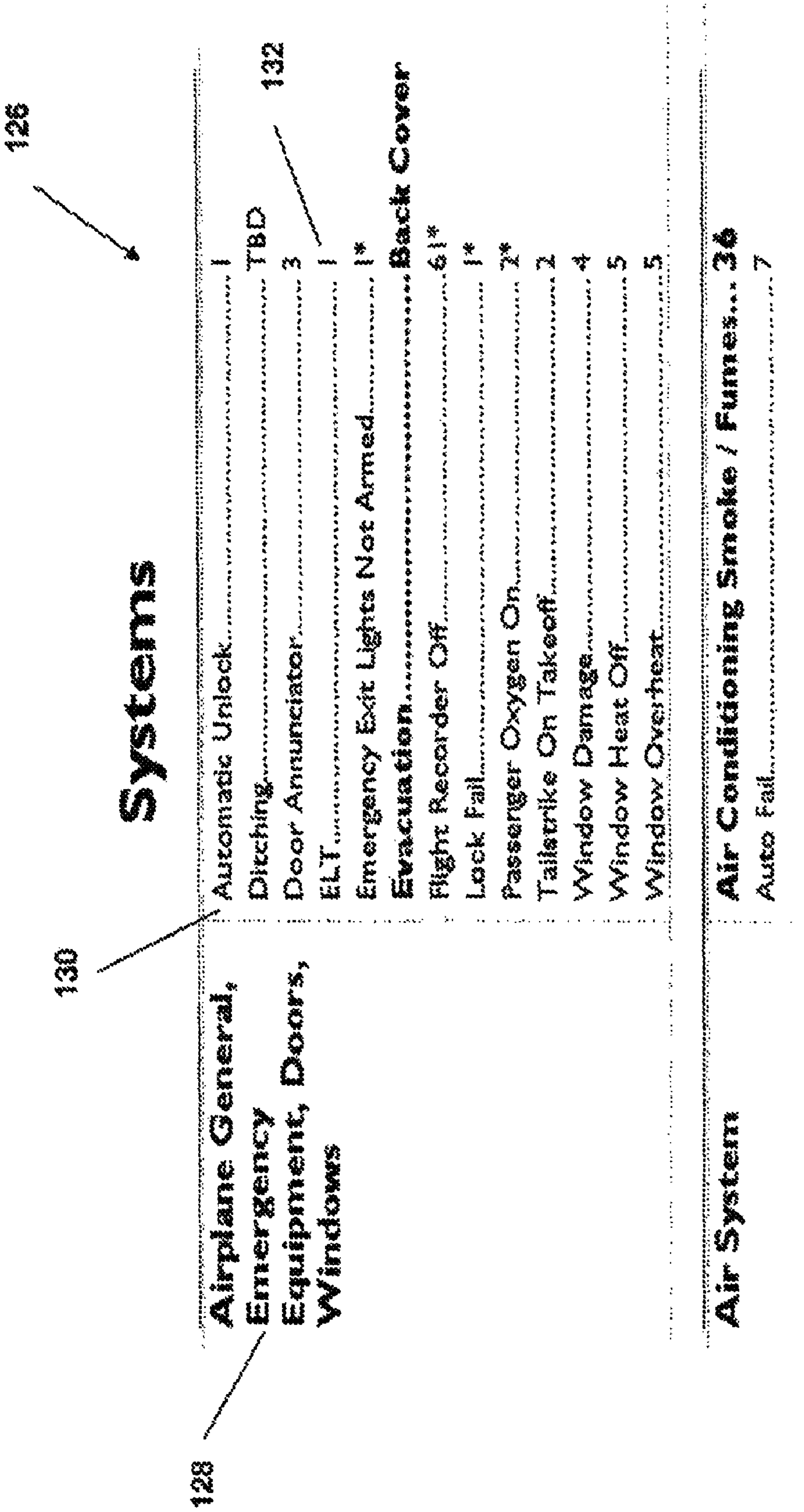
FIG. 22 is a plan view of another exemplary page of a quick reference handbook according to one embodiment of the present invention.

Referring generally to FIG. 22, individual or groups of systems of the aircraft can be quickly identified on a system condition page 126. Each system condition page 126 provides a listing of system groups 128, which can include one or more individual systems. By line and column spacing of each system group 128, one or a plurality of system item listings 130 are provided in alphabetical order. A QRH page number 132 is designated for each system item listing 130. Items of general interest or hierarchy are also identified by bold lettering.

Figure 23:
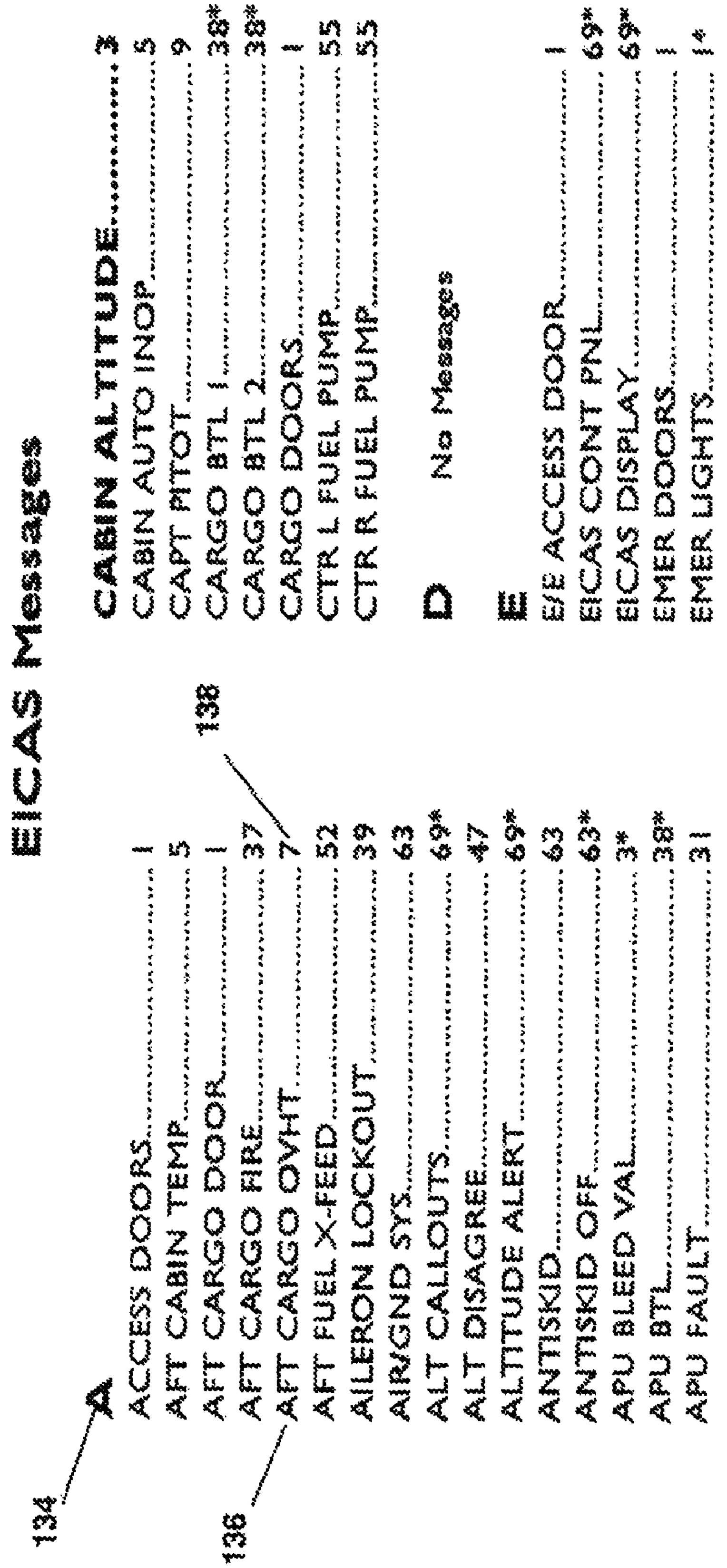
FIG. 23 is a plan view of another exemplary page of a quick reference handbook according to one embodiment of the present invention.
Figure 24:
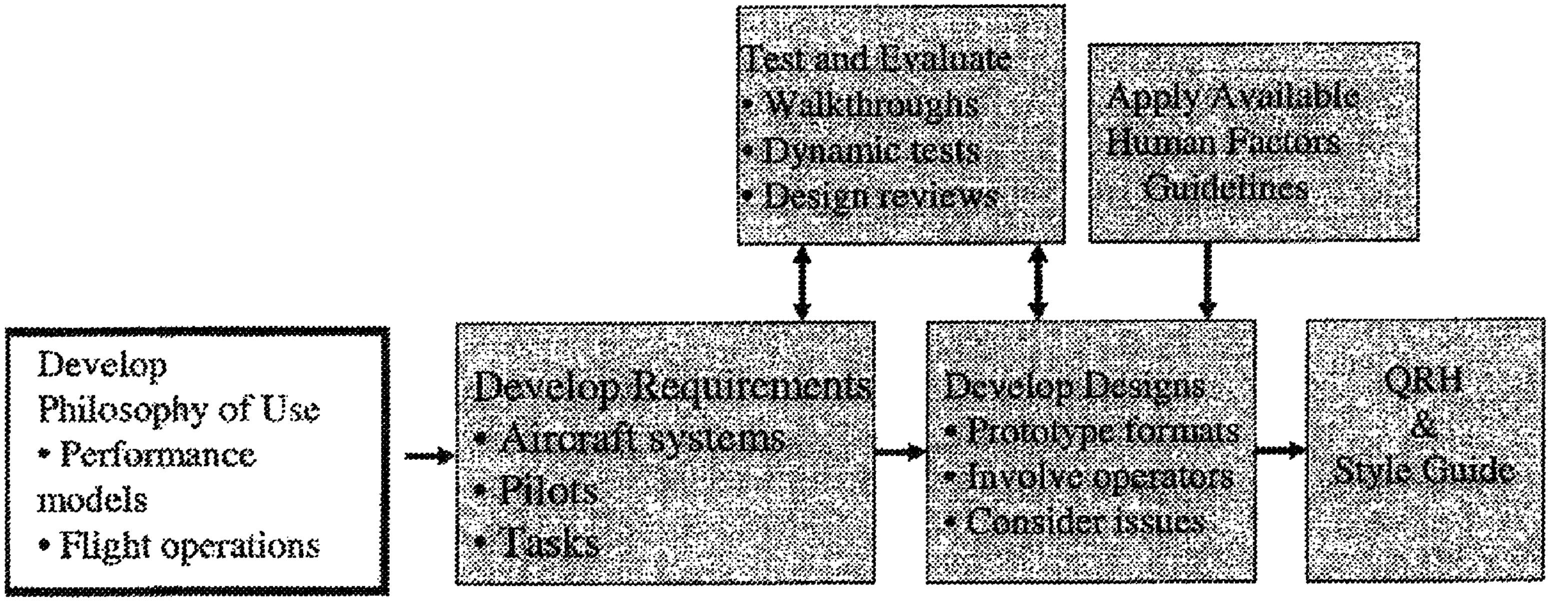
FIG. 24 is a flow diagram of steps performed for a human centered design process to prepare a quick reference handbook according to one embodiment of the present invention.
Figure 25:
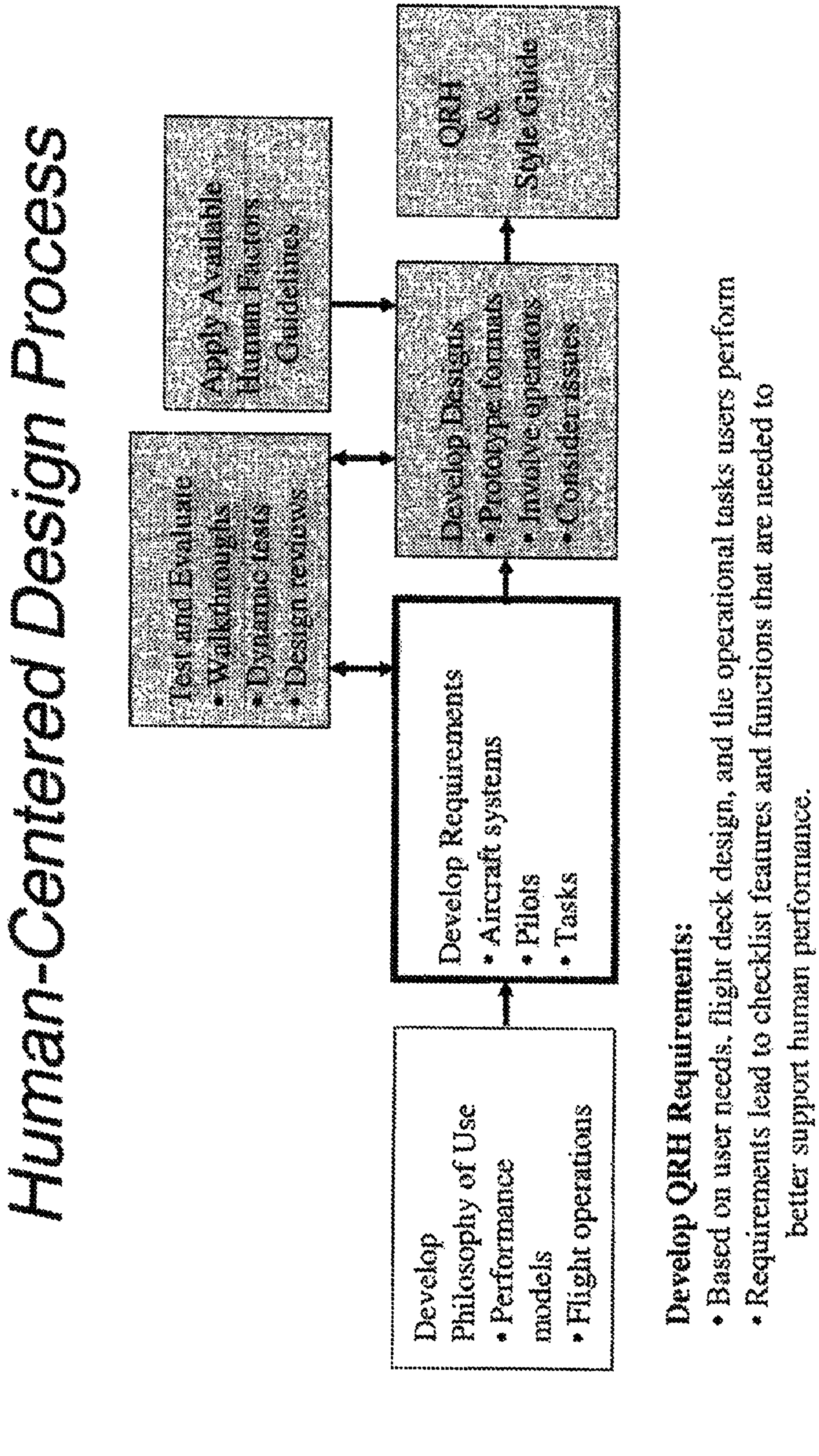
FIG. 25 is a flow diagram similar to FIG. 24.
Figure 26:
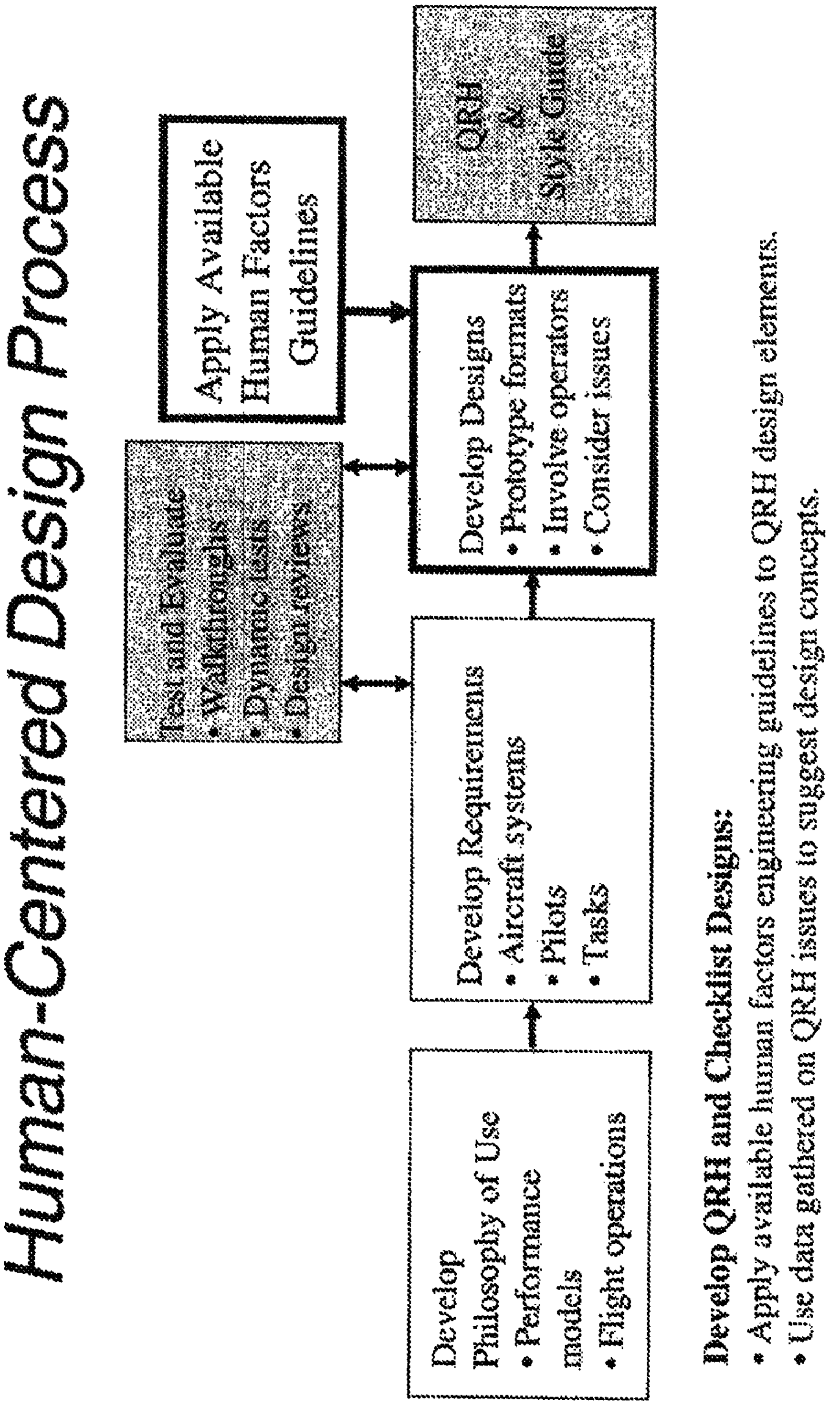
FIG. 26 is a flow diagram similar to FIG. 24.
Figure 27:
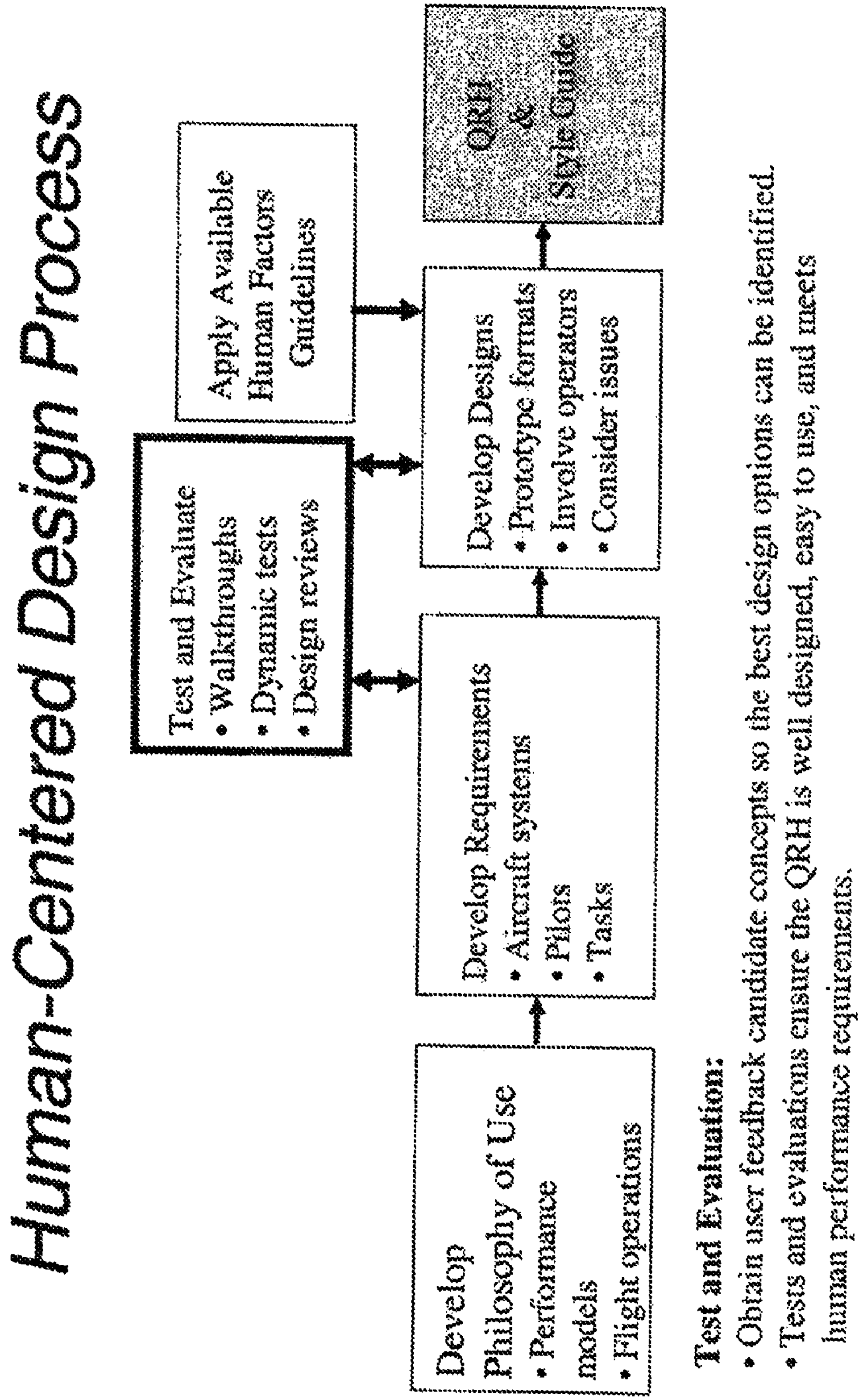
FIG. 27 is a flow diagram similar to FIG. 24.
Figure 28:
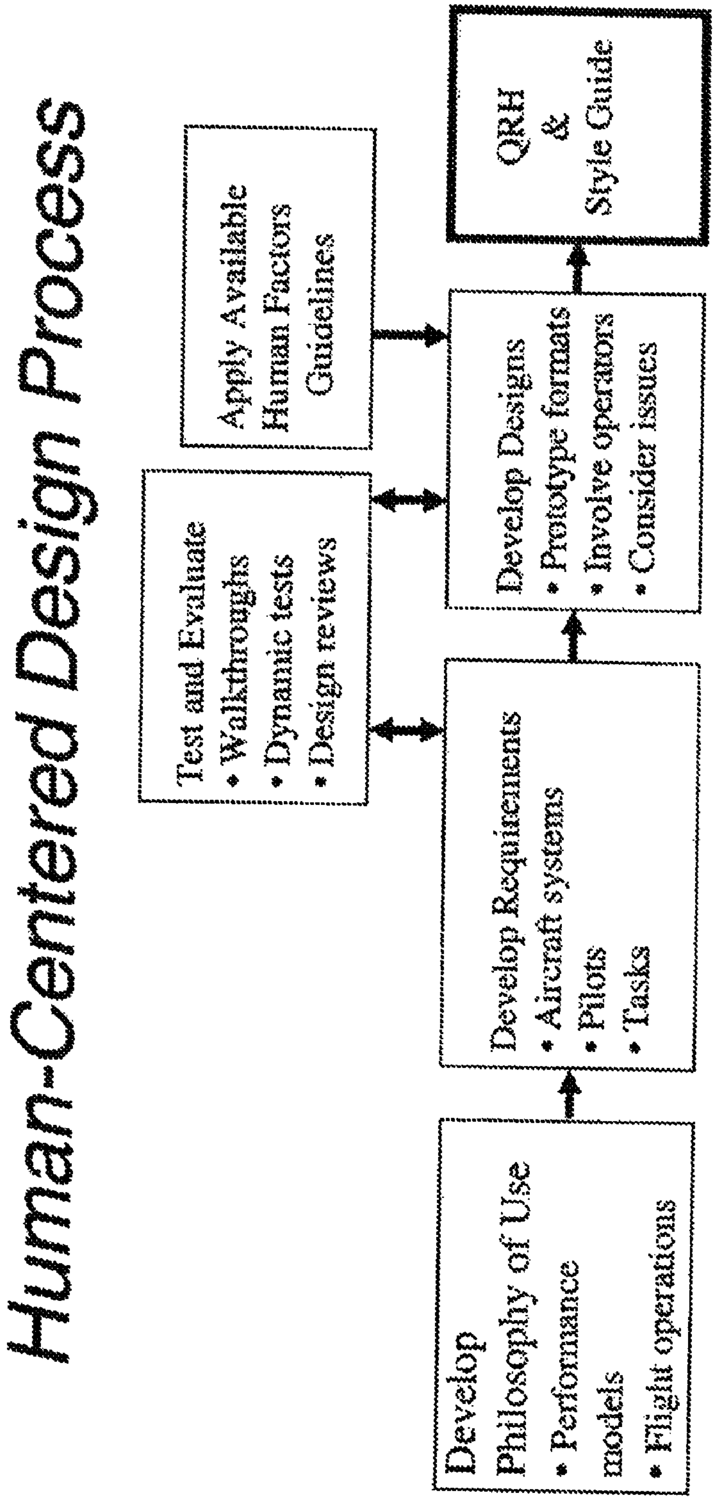
FIG. 28 is a flow diagram similar to FIG. 24.

Referring to FIG. 23, one or more EICAS message pages can be provided by the quick reference handbook 10 of the present invention. Each EICAS message page provides an EICAS alphabetic listing 134 under which is alphabetically listed a plurality of EICAS messages 136 each identified by a QRH page number 138.

Referring generally to FIGS. 24 through 28, a flow diagram of the human centered design process to prepare quick reference handbooks of the present invention is provided. A philosophy of use is identified in FIG. 24. The QRH requirements processes are identified in FIG. 25. The QRH checklist designs are identified in FIG. 26. Test and evaluation processes are identified in FIG. 27. The QRH design recommendations from the design process are identified in FIG. 28.

Figure 29A:
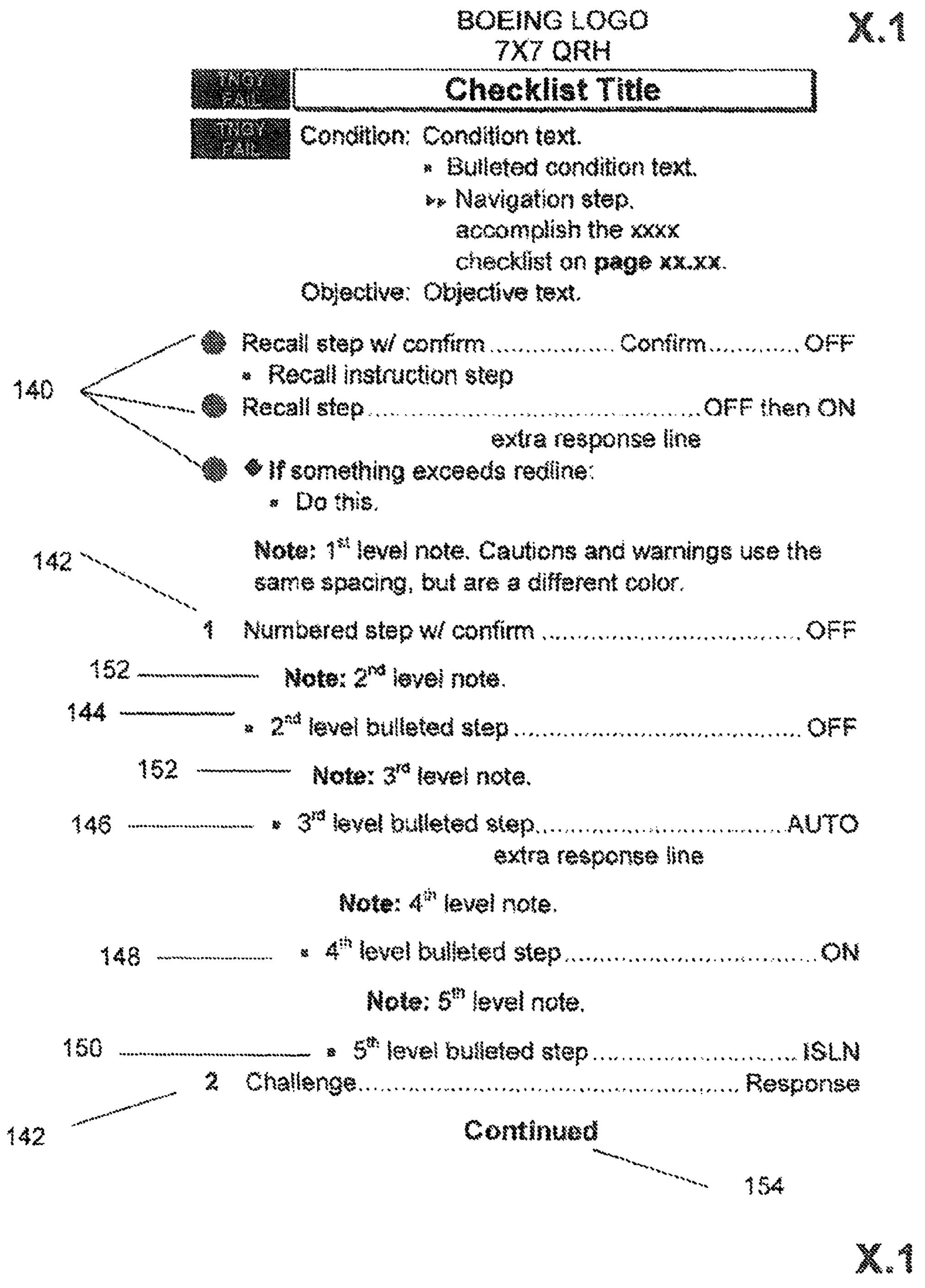
FIGS. 29A through 29E are plan views of another exemplary format for a checklist of a quick reference handbook according to one embodiment of the present invention.

With reference now to FIGS. 29A through 29E, there is shown another exemplary format for a checklist of a quick reference handbook of the present invention. As shown in FIG. 29A, red dots or bullets 140 are used to indicate recall steps. These red dots 140 are very effective at visually grouping the recall steps as well as making the recall steps very easily to locate within the checklist. Alternatively, other suitable colors or gray-shading can be used for the bullets 140, and/or other graphic indicators besides bullets can be used to indicate recall steps.

Figure 29B:
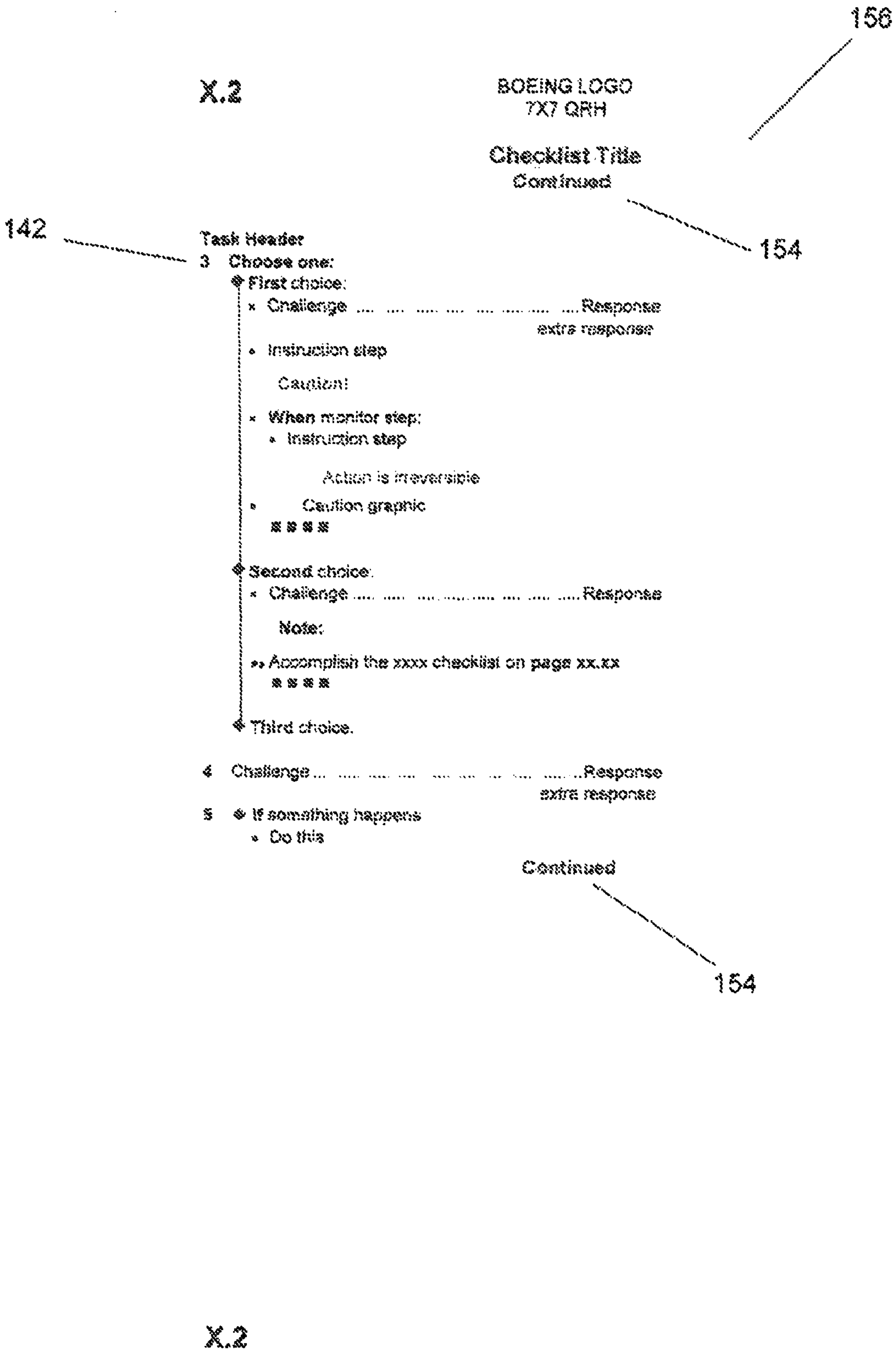
Figure 29C:
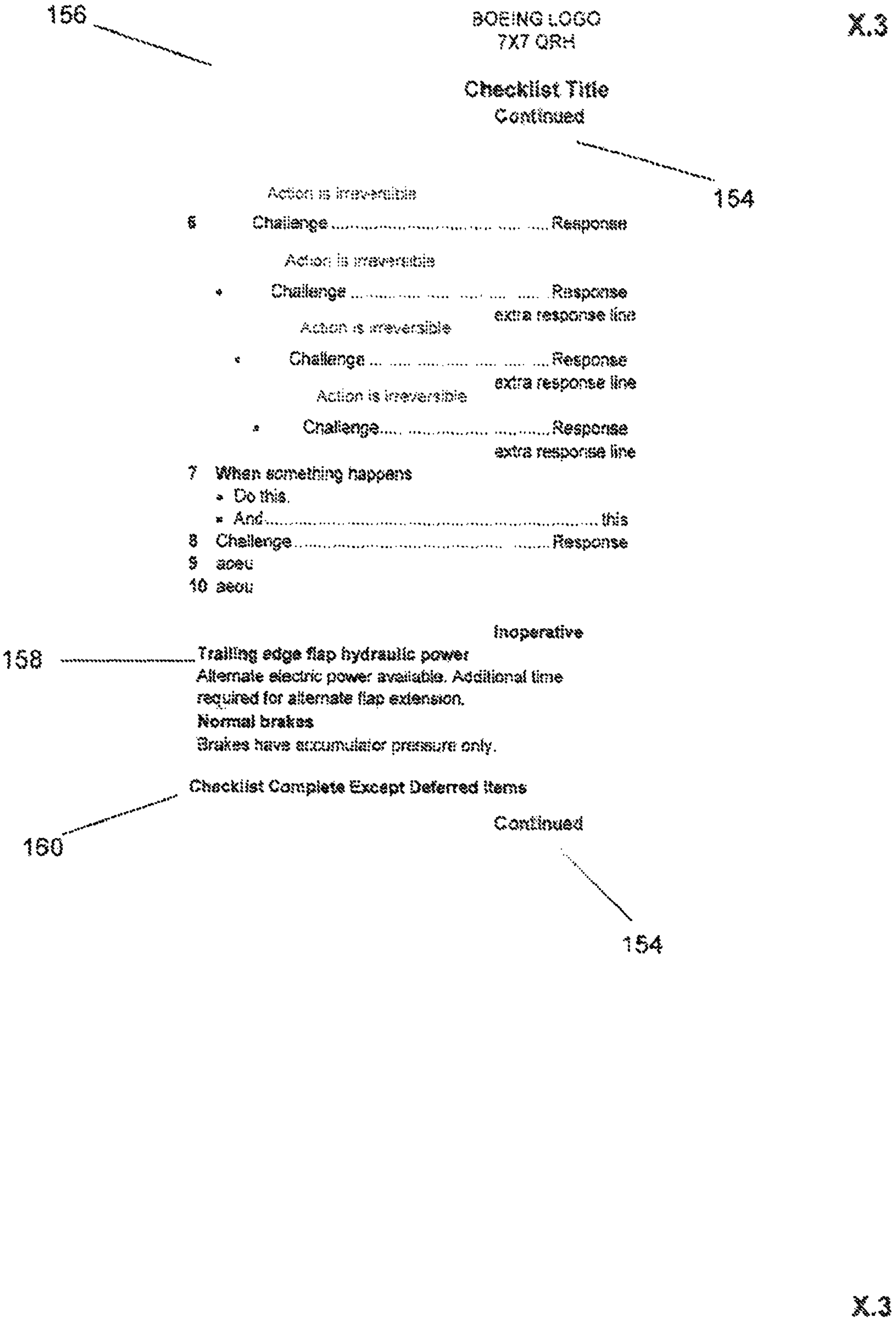

Also shown in FIGS. 29A through 29C, the primary action or first-level checklist steps 142 are numbered one through ten to assist with placekeeping. The lower-level steps (e.g., second level 144, third level 146, fourth level 148, fifth level 150, etc.) are not numbered, but the lower-level steps are offset from one another by indentations and by bullets. These features also assist the user with placekeeping. Notes regarding the lower-level steps can be included within a rectangular box 152 that is colored (e.g., light blue, etc.) or gray-shaded. Alternatively, these lower-level step notes can be highlighted using other graphic indicators or boldface type.

The checklist format shown in FIG. 29 also includes graphics or markings 154 at the top and bottom of the corresponding pages to indicate that the checklist continued. In this particular format, there is also a bar 156 at the top of the continuation page as shown in FIGS. 29B through 29E.

As shown in FIG. 29C, inoperative items and their consequences can be include included within a rectangular box 158 that is colored (e.g., light blue, etc.) or gray-shaded. Alternatively, the inoperative items can be highlighted using other graphic indicators or boldface type.

Figure 29D:
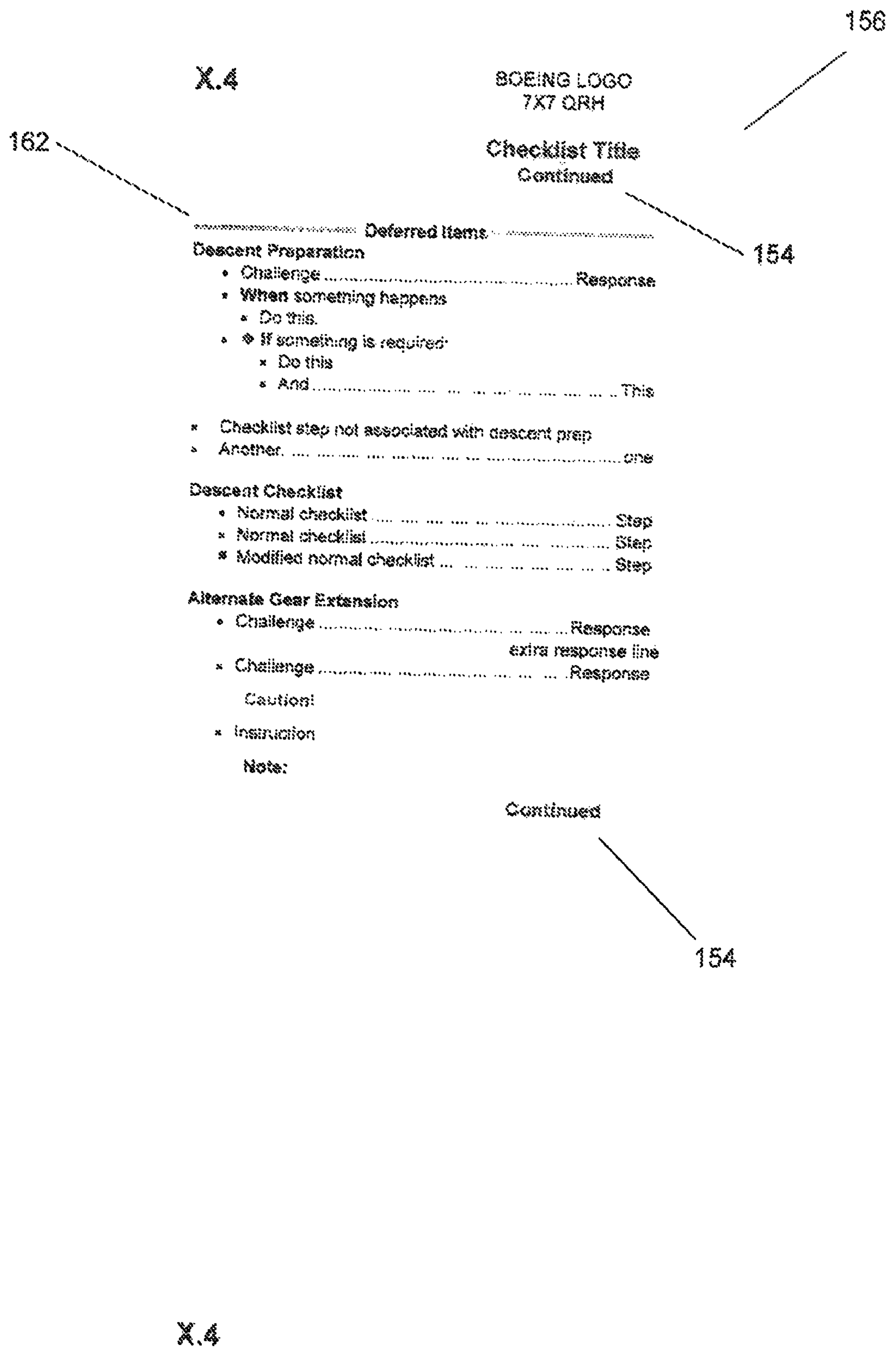

Also shown in FIG. 29C, there is a graphic 160 to indicate that the checklist is complete except for deferred items. Regarding the deferred items, FIG. 29D shows an exemplary graphic 162 indicating the beginning of the list of deferred items.

Figure 29E:
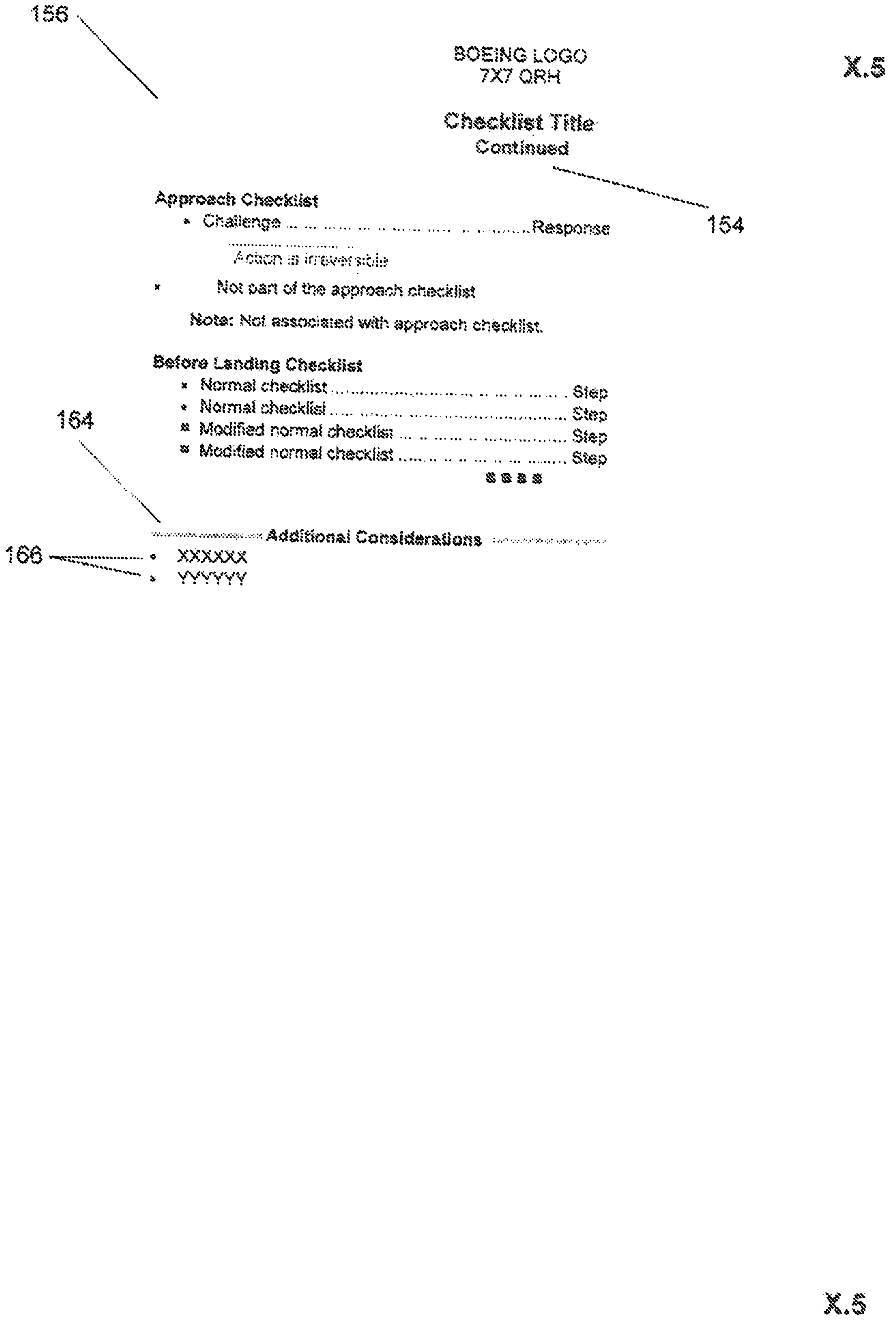

With reference now to FIG. 29E, additional considerations can be placed at the end of the checklist after the deferred items. A graphic 164 is used to indicate the beginning of the additional considerations. Bullets 166 or other graphic indicators can be used to help distinguish the additional considerations.

Various embodiments include digital or electronic data for a QRH, which may be provided in XML (extensible markup language), Adobe's Framemaker, HTML (hypertext markup language), PDF (portable document format), etc. The digital or electronic version of the QRH may reside on any of a wide range of computer or machine readable media.

The digital or electronic version of the QRH may allow the user to electronically access the material, for example, while using an electronic flight bag (EFB) or other computing device. Additionally, or alternatively, the electronic QRH version may allow the user to print out the electronic QRH to create a hard copy that can then be accessed and reviewed by a user.

Various embodiments can also include a user interface that allows the user to enter data for the QRH, such as the checklists and the checklist steps. In this exemplary manner, the user would be able to modify the content as necessary to meet the user's airline operational needs. The user could then print out the QRH having the user-entered data. When the QRH is printed, the print version may include at least one checklist having a format corresponding to any one of the formats described and shown herein, such as the checklist format shown in any one of FIGS. 2 through 20 and 29.

Various embodiments include a machine-readable medium for use with a processor having a memory. The machine-readable medium includes instructions to cause a processor to generate a hard copy or print copy of a QRH having at least one checklist in a format corresponding to any one of the formats described and shown herein, such as the checklist format shown in any one of FIGS. 2 through 20 and 29.

In various embodiments, the digital or electronic version of the QRH can be coded such that the QRH can be printed in color, grey scale, or black and white. In such embodiments, items within one or more of the QRH checklists may be "double coded" with graphic indicators (e.g., inclusion within a rectangular box, etc.) and with color.

According to one embodiment of the present invention, a digital or electronic version of a QRH includes sequentially numbered pages on which are presented checklists. An alphabetized immediate or quick action index is provided on at least one of the pages and differentiated from the checklists. At least one checklist can be an immediate or quick action checklist, which includes at least one recall step differentiated by inclusion within a substantially rectangular box or other distinctive graphic indication.

According to another embodiment of the present invention, a digital or electronic version of a QRH includes a plurality of checklists that are organized within the electronic QRH by listing the checklists within a corresponding one of a plurality of grouping schemes. The grouping schemes include Immediate Action, Systems, EICAS Messages, and Lights. The electronic QRH can also include differentiating criteria for decisions steps, action steps, and navigation steps within the checklists to thereby enable a user to readily discriminate the decision steps, action steps, and navigation steps from each other. The electronic QRH can also include visually groupings of related steps within a checklist.

In another exemplary implementation, a digital or electronic version of a QRH includes additional operational considerations that are listed after an indicator that a checklist is complete. The additional operational considerations can provide planning information and mission consequences the crew may wish to perform due to a non-normal condition but which are not a required part of conducting the checklist.

In a further exemplary implementation, a digital or electronic QRH includes a list of operational consequences associated with a checklist near the end of a checklist but before an indicator that the checklist is complete. The operational consequences of inoperative items can provide information to the user about consequences resulting from a non-normal condition.

While various exemplary embodiments have been described, those skilled in the art will recognize modifications or variations which might be made without departing from the inventive concept. The examples illustrate the invention and are not intended to limit it.

What is claimed is:

1. A machine-readable medium for use with a processor having a memory, the machine-readable medium comprising instructions for causing the processor to generate a quick reference handbook (QRH) for a mobile platform by: organizing the QRH by listing checklists within corresponding grouping schemes including:

Immediate Action;

Systems; and

Engine Indication and Crew Alerting System (EICAS) messages;

using differentiating criteria for decisions steps, action steps, and navigation steps within the checklists to thereby enable a user to discriminate the decision steps, action steps, and navigation steps from each other; and visually grouping related steps within a checklist.

2. The machine-readable medium of claim 1, further comprising instructions for causing the process to generate the QRH by grouping each checklist having a memory step as an Immediate or Quick Action checklist.

3. The machine-readable medium of claim 1, further comprising:

organizing the checklists to include a grouping scheme including lights; causing the machine readable medium to generate the QRH by:

titling each checklist with a distinctive unambiguous title substantially matching the triggering cue for the checklist; and alphabetically listing each checklist by title with a checklist tab number adjacent the title within a corresponding one of a plurality of indexes including an Immediate Action index, a Systems index, an EICAS Messages index, and a Lights index.

4. The machine-readable medium of claim 3, further comprising instructions for causing the process to generate the QRH by cross-referencing one or more of the checklists in two or more indexes to thereby avoid duplication of the complete checklist in several sections.

5. The machine-readable medium of claim 3, further comprising instructions for causing the process to generate the QRH by including features for assisting the user in linking one or more cues to the appropriate checklist, the features including one or more of a table of contents, a lights index, and an EICAS message.

6. The machine-readable medium of claim 1, further comprising instructions for causing the process to generate the QRH by displaying a graphic of one or more triggering cues on a page of the QRH adjacent the title of the checklist presented on the page.

7. The machine-readable medium of claim 1, further comprising instructions for causing the process to generate the QRH by using color to categorize steps.

8. The machine-readable medium of claim 1, further comprising instructions for causing the process to generate the QRH by graphically linking decision steps within a checklist.

9. The machine-readable medium of claim 1, further comprising instructions for causing the process to generate the QRH by highlighting one or more decision terms within a list of decision checklist steps.

10. The machine-readable medium of claim 1, further comprising instructions for causing the process to generate the QRH by numbering two or more steps within the checklists.

11. The machine-readable medium of claim 1, further comprising instructions for causing the process to generate the QRH by including one or more deferred items within the checklists.

12. The machine-readable medium of claim 1, further comprising instructions for causing the process to generate the QRH by using one or more graphics to indicate completion of a checklist.

13. The machine-readable medium of claim 1, further comprising instructions for causing the process to generate the QRH by providing an objective statement for at least one of said checklists.

14. The machine-readable medium of claim 1, further comprising instructions for causing the process to generate the QRH by including differentiating criteria for indicating the style of crew interaction for an action statement.

15. The machine-readable medium of claim 1, further comprising instructions for causing the process to generate the QRH by indicating to the user to confirm a critical control movement.

16. The machine-readable medium of claim 1, further comprising instructions for causing the process to generate the QRH by using differentiating criteria to highlight keywords related to delayed actions to assist the crew in monitoring for a precondition before taking the delayed action.

17. The machine-readable medium of claim 1, further comprising instructions for causing the process to generate the QRH by indicating temporal aspects within the wording of the checklist steps.

18. The machine-readable medium of claim 1, further comprising instructions for causing the process to generate the QRH by including cautions and warnings differentiated by inclusion within a colored or a gray-shaded rectangle adjacent the associated checklist step and a colored or a gray-shaded inverted triangle with an exclamation point, and providing an explanation of the caution or warning before the associated checklist step.

19. The machine-readable medium of claim 1, further comprising instructions for causing the process to generate the QRH by including cautions and warnings differentiated by inclusion within a colored rectangle or a gray-shaded rectangular.

20. The machine-readable medium of claim 1, further comprising instructions for causing the process to generate the QRH by providing a matrix of one or more triggering cues or indications to aide the user in identifying unannunciated conditions.

21. The machine-readable medium of claim 1, further comprising instructions for causing the process to generate the QRH by listing one or more critical or quick action checklists on the cover of the QRH.

22. The machine-readable medium of claim 1, further comprising instructions for causing the process to generate the QRH by using positive wording for checklist steps, and highlighting negative wording in checklists steps to improve legibility.

23. The machine-readable medium of claim 1, further comprising instructions for causing the process to generate the QRH by including contextual information adjacent the checklist titles and visually differentiated from the checklist steps, whereby the contextual information helps ensure that the proper checklist is being used, the contextual information including one or more of a triggering cue and a statement of the underlying condition.

24. The machine-readable medium of claim 1, further comprising instructions for causing the process to generate the QRH by differentiating decision steps from action steps and navigation steps by using one or more of shading, key words, graphics, color, and bold font.

25. The machine-readable medium of claim 1, further comprising instructions for causing the process to generate the QRH by providing spacing and task headers between the groups of related steps to thereby identify to the user that each group of related steps is associated with a particular task.

26. The machine-readable medium of claim 1, further comprising instructions for causing the process to generate the QRH by using one or more graphics to indicate a checklist is continued on another page.

27. The machine-readable medium of claim 1, further comprising instructions for causing the processor to generate the QRH by:

sequentially numbering a plurality of pages of the QRH;

creating a plurality of checklists on the plurality of handbook pages;

alphabetizing an immediate or quick action index on at least one of the plurality of handbook pages and differentiated from the plurality of checklists; and including at least one recall step differentiated by at least one distinctive graphic indication.

28. A QRH generated by a processor executing the machine-readable medium of claim 1.

29. A system including the machine-readable medium of claim 1, and a user interface for allowing a user to enter information to be included in the QRH.

30. A machine-readable medium executed by a processor having a memory, the machine-readable medium comprising instructions for causing the processor to generate a quick reference handbook (QRH) for a mobile platform by: organizing the QRH by listing checklists within corresponding schemes including:

Immediate Action;

Systems;

Engine Indication and Crew Alerting System (EICAS) messages; and

Lights; and using differentiating criteria including at least one of shading, graphics, color and bold font for different types of steps that are available for a user to take, to enable the user to quickly visually discriminate between the different types of steps available to be taken.

31. A machine-readable medium executed by a processor having a memory, the machine-readable medium comprising instructions for causing the processor to generate a quick reference handbook (QRH) for a mobile platform by: organizing the QRH by grouping a plurality of checklists within a plurality of corresponding schemes including at least three of the following schemes:

Immediate Action;

Systems;

Engine Indication and Crew Alerting System (EICAS) messages; and

Lights; and using differentiating criteria including at least one of shading, graphics, color and bold font for visually differentiating between decision steps, action steps and navigation steps that are available for a user to take, to enable the user to quickly visually discriminate between the different types of steps available to be taken.

* * * * *